(12) United States Patent
Pacala et al.

(10) Patent No.: US 12,529,770 B2
(45) Date of Patent: Jan. 20, 2026

(54) PROCESSING TIME-SERIES MEASUREMENTS FOR LIDAR ACCURACY

(71) Applicant: Ouster, Inc., San Francisco, CA (US)

(72) Inventors: Angus Pacala, San Francisco, CA (US); Marvin Shu, San Francisco, CA (US)

(73) Assignee: Ouster, Inc., San Francisco, CA (US)

(*) Notice: Subject to any disclaimer, the term of this patent is extended or adjusted under 35 U.S.C. 154(b) by 1128 days.

(21) Appl. No.: 17/451,633

(22) Filed: Oct. 20, 2021

(65) Prior Publication Data
US 2022/0043128 A1    Feb. 10, 2022

Related U.S. Application Data

(63) Continuation of application No. PCT/US2020/055265, filed on Oct. 12, 2020.
(Continued)

(51) Int. Cl.
*G01S 7/48* (2006.01)
*G01S 7/484* (2006.01)
(Continued)

(52) U.S. Cl.
CPC .......... *G01S 7/4865* (2013.01); *G01S 7/4808* (2013.01); *G01S 7/484* (2013.01); *G01S 7/4863* (2013.01);
(Continued)

(58) Field of Classification Search
None
See application file for complete search history.

(56) References Cited

U.S. PATENT DOCUMENTS 5,848,183 A    12/1998   Farrell
6,717,170 B2    4/2004   Woerner
(Continued)

FOREIGN PATENT DOCUMENTS

CN    109887018 A    6/2019
CN    110187359 A    8/2019
(Continued)

OTHER PUBLICATIONS

Application No. PCT/US2020/055265, International Search Report and Written Opinion, Mailed on Jan. 15, 2021, 27 pages.
(Continued)

*Primary Examiner* — Hovhannes Baghdasaryan
(74) *Attorney, Agent, or Firm* — Kilpatrick Townsend & Stockton LLP

(57) ABSTRACT

An optical measurement system may include a light source and corresponding photosensor configured to emit and detect photons reflected from objects in a surrounding environment for optical measurements. An initial peak can be identified as resulting from reflections off a housing of the optical measurement system. This peak can be removed or used to calibrate measurement calculations of the system. Peaks resulting from reflections off surrounding objects can be processed using on-chip filters to identify potential peaks, and the unfiltered data can be passed to an off-chip processor for distance calculations and other measurements. A spatial filtering technique may be used to combine values from histograms for spatially adjacent pixels in a pixel array. This combination can be used to increase the confidence for distance measurements.

19 Claims, 37 Drawing Sheets

Related U.S. Application Data

(60) Provisional application No. 62/913,604, filed on Oct. 10, 2019.

(51) Int. Cl.

| | | |
|---|---|---|
| *G01S 7/4863* | (2020.01) | |
| *G01S 7/4865* | (2020.01) | |
| *G01S 7/497* | (2006.01) | |
| *G01S 7/51* | (2006.01) | |
| *G01S 17/10* | (2020.01) | |
| *G01S 17/89* | (2020.01) | |
| *G01S 7/487* | (2006.01) | |
| *G01S 17/931* | (2020.01) | |

(52) U.S. Cl.
CPC ............... *G01S 7/497* (2013.01); *G01S 7/51* (2013.01); *G01S 17/10* (2013.01); *G01S 17/89* (2013.01); *G01S 7/4876* (2013.01); *G01S 17/931* (2020.01)

(56) References Cited

U.S. PATENT DOCUMENTS

| | | |
|---|---|---|
| 8,471,838 B2 | 6/2013 | Yamamoto et al. |
| 10,436,903 B2 | 10/2019 | Matsukawa |
| 10,775,488 B2 * | 9/2020 | Bradley ............... G01S 7/4815 |
| 11,221,410 B2 | 1/2022 | Ikuta et al. |
| 11,609,308 B2 | 3/2023 | Ueno et al. |
| 11,686,843 B2 | 6/2023 | Ueno et al. |
| 2009/0190007 A1 | 7/2009 | Oggier et al. |
| 2009/0321628 A1 | 12/2009 | Bateman et al. |
| 2011/0123112 A1 | 5/2011 | Zhang |
| 2011/0255759 A1 | 10/2011 | Nishimura et al. |
| 2014/0340570 A1 | 11/2014 | Meyers et al. |
| 2015/0015868 A1 | 1/2015 | Jachman et al. |
| 2016/0033644 A1 | 2/2016 | Moore |
| 2016/0150144 A1 | 5/2016 | Yoon |
| 2018/0259625 A1 | 9/2018 | Gnecchi et al. |
| 2018/0259645 A1 | 9/2018 | Shu et al. |
| 2018/0299552 A1 | 10/2018 | Shu et al. |
| 2018/0364360 A1 | 12/2018 | Zellinger et al. |
| 2019/0258251 A1 | 8/2019 | Ditty et al. |
| 2020/0233066 A1 | 7/2020 | Kulesh et al. |
| 2021/0025980 A1 | 1/2021 | Ohki |

FOREIGN PATENT DOCUMENTS

| | | |
|---|---|---|
| CN | 110187360 A | 8/2019 |
| EP | 3370079 | 9/2018 |
| EP | 3370080 A1 | 9/2018 |
| EP | 3460509 A1 | 3/2019 |
| EP | 3990946 A1 | 5/2022 |
| JP | 2002098763 A | 4/2002 |
| JP | 2002328166 A | 11/2002 |
| JP | 2018013370 A | 1/2018 |
| WO | 2018211762 A1 | 11/2018 |
| WO | 2019057897 A1 | 3/2019 |
| WO | 2021026241 A1 | 2/2021 |

OTHER PUBLICATIONS

JP2022-521490, "Office Action", Jul. 11, 2024, 9 pages.
EP20874503.4, "Extended European Search Report", Mar. 15, 2023, 10 pages.
CN202080067525.0, "Office Action", Aug. 30, 2024, 74 pages.
CN202080067525.0, "Office Action", Mar. 31, 2025, 22 pages.
KR1020227007383, "Office Action" May 23, 2025, 18 pages.
U.S. Appl. No. 17/451,634, "Non-Final Office Action", May 7, 2025, 14 pages.
U.S. Appl. No. 17/451,634, "Non-Final Office Action", Aug. 22, 2025, 16 pages.
Camplani et al., "Efficient Spatio-temporal Hole Filling Strategy for Kinect Depth Maps", Proceedings vol. 8290, Three-dimensional Image Processing (3dip) and Applications Ii; 82900e, Jan. 30, 2012, 10 pages.

\* cited by examiner

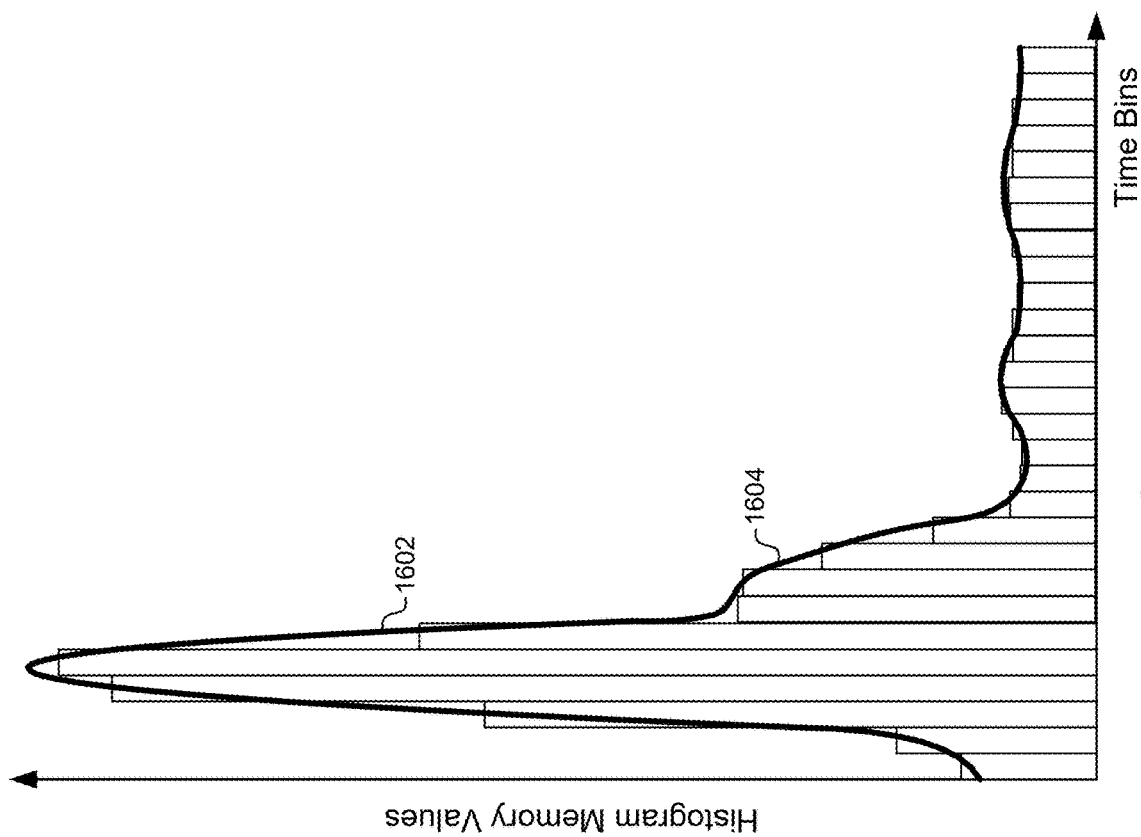
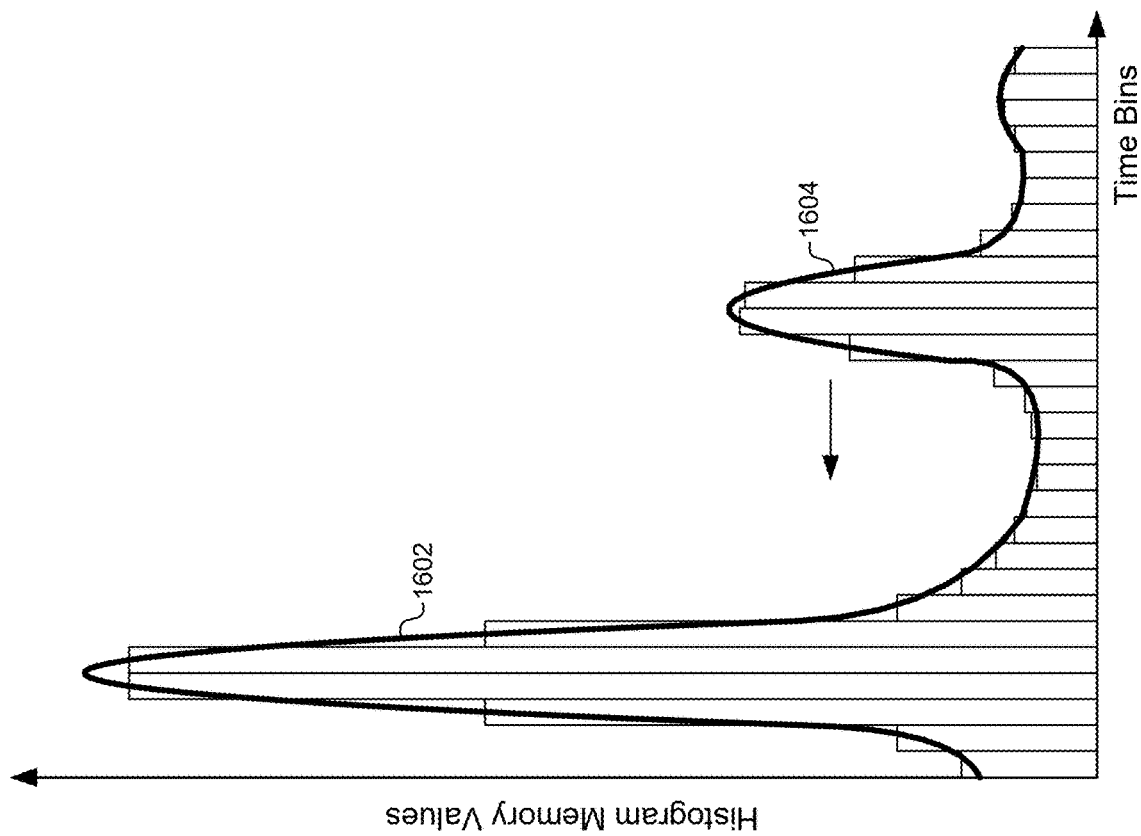
FIG. 16A
FIG. 16B

PROCESSING TIME-SERIES MEASUREMENTS FOR LIDAR ACCURACY

CROSS-REFERENCES TO RELATED APPLICATIONS

This application is a continuation of International Application No. PCT/US2020/055265 filed Oct. 12, 2020, entitled "PROCESSING TIME-SERIES MEASUREMENTS FOR LIDAR ACCURACY" which claims the benefit of U.S. Provisional Patent Application No. 62/913,604, filed on Oct. 10, 2019, entitled "PROCESSING TIME-SERIES MEASUREMENTS FOR LIDAR ACCURACY." The disclosures of these applications are incorporated herein by reference.

BACKGROUND

Light Detection And Ranging (LIDAR) systems are used for object detection and ranging, e.g., for vehicles such as cars, trucks, boats, etc. LIDAR systems also have uses in mobile applications (e.g., for face recognition), home entertainment (e.g., to capture gesture capture for video game input), and augmented reality. A LIDAR system measures the distance to an object by irradiating a landscape with pulses from a laser, and then measuring the time for photons to travel to an object and return after reflection, as measured by a receiver of the LIDAR system. A detected signal is analyzed to detect the presence of reflected signal pulses among background light. A distance to an object can be determined based on a time-of-flight from transmission of a pulse to reception of a corresponding reflected pulse.

It can be difficult to provide robust distance accuracy down to a few centimeters in all conditions, particularly at an economical cost for the LIDAR system. Promising new detector technologies, like single photon avalanche diodes (SPADs), are attractive but have significant drawbacks when used to measure time-of-flight and other signal characteristics due to their limited dynamic range, particularly over a broad range of ambient conditions and target distances. Additionally, because of their sensitivity to even a small number of photons, SPADs can be very susceptible to ambient levels of background noise light.

BRIEF SUMMARY

In some embodiments, an optical measurement system may include a housing of the optical measurement system and a light source configured to transmit one or more pulse trains over one or more time intervals as part of an optical measurement, where each of the one or more first time intervals may include one of the one or more pulse trains. The system may also include a photosensor configured to detect photons from the one or more pulse trains that are reflected off of a housing of the optical measurement system, and to detect photons from the one or more pulse trains that are reflected off of objects in an environment surrounding the optical measurement system. The system may additionally include a plurality of registers configured to accumulate photon counts from the photosensor received during the one or more time intervals. Each of the one or more time intervals may be subdivided into a plurality of time bins. Each of the plurality of registers may be configured to accumulate photon counts received during a corresponding one of the plurality of time bins in each of the one or more time intervals to represent a histogram of photon counts received during the one or more time intervals. The system may further include a circuit configured to identify an initial peak in the histogram of photon counts. The initial peak may represent the photons reflected from the housing of the optical measurement system.

In any embodiments, any or all of the following features may be included in any combination and without limitation. The circuit may be configured to identify the initial peak by identifying a predetermined number of registers in the plurality of registers that occur first in the plurality of registers. The circuit may be configured to identify the initial peak by identifying one or more registers in the plurality of registers storing a highest number of photon counts. The circuit may be configured to identify the initial peak by identifying registers in the plurality of registers with time bins that correspond to a distance between the light source and the housing of the optical measurement system. The circuit may be further configured to identify a subset of the plurality of registers that represents the initial peak. The subset of the plurality of registers may be identified by selecting a predetermined number of registers around a register storing a maximum value of the initial peak. The subset of the plurality of registers may be identified by selecting registers around a register storing a maximum value of the initial peak that store values that are within a predetermined percentage of the maximum value. The circuit may be further configured to estimate a distance between the light source and the housing of the optical measurement system based on a location of the initial peak in the plurality of registers. The circuit may be further configured to calibrate distance measurements using the distance estimated between the light source and the housing. The system may also include a processor configured to receive additional peaks in the histogram stored in the plurality of registers to calculate distances to objects in the surrounding environment corresponding to the additional peaks, where the initial peak may be excluded from the additional peaks received by the processor. The processor may be implemented in an integrated circuit that is separate and distinct from an integrated circuit in which the plurality of registers is implemented.

In some embodiments, a method of detecting a peak reflected from a housing in an optical measurement system may include transmitting one or more pulse trains over one or more time intervals as part of an optical measurement. Each of the one or more first time intervals may include one of the one or more pulse trains. The method may also include detecting photons from the one or more pulse trains that are reflected off of the housing of the optical measurement system, and detecting photons from the one or more pulse trains that are reflected off of objects in an environment surrounding the optical measurement system. The method may additionally include accumulating counts of the photons received during the one or more time intervals into a plurality of registers. Each of the one or more time intervals may be subdivided into a plurality of time bins, each of the plurality of registers accumulates photon counts received during a corresponding one of the plurality of time bins in each of the one or more time intervals to represent a histogram of photon counts received during the one or more time intervals. The method may further include identifying an initial peak in the histogram of photon counts. The initial peak may represent the photons reflected from the housing of the optical measurement system.

In any embodiments, any or all of the following features may be included in any combination and without limitation. The method may also include identifying a second initial peak as part of a second optical measurement; and comparing the second initial peak the initial peak. The method may also include characterizing a change in transparency of a window in a housing of the optical measurement system based on comparing the second initial peak to the initial peak. The method may additionally include identifying a plurality of initial peaks detected by a plurality of different photosensors in the optical measurement system; and determining a level of transparency for corresponding sections of a window in a housing of the optical measurement system in front of each of the plurality of photosensors based on the plurality of initial peaks. The method may also include comparing a maximum value of the initial peak to a threshold; and determining whether a blockage is located external to the optical measurement system based on comparing the maximum value of the initial peak to the threshold. The method may additionally include identifying a plurality of initial peaks over a plurality of measurements; and storing a baseline initial peak based on a combination of the plurality of initial peaks over the plurality of measurements for comparison to future optical measurements. The method may also include subtracting the baseline initial peak from the plurality of registers. A second peak may at least partially overlap with the initial peak, and subtracting the baseline initial peak may cause the second peak to be detectable by a peak detection circuit. The second peak may correspond to an object in environment surrounding the optical measurement system that is within two feet of the optical measurement system.

In some embodiments, an optical measurement system may include a light source configured to transmit one or more pulse trains over one or more time intervals as part of an optical measurement. Each of the one or more time intervals may include one of the one or more pulse trains. The system may also include a photosensor configured to detect photons from the one or more pulse trains that are reflected from an object in an environment surrounding the optical measurement system. The system may additionally include a plurality of registers configured to accumulate photon counts from the photosensor received during the one or more time intervals to represent an unfiltered histogram of photon counts received during the one or more time intervals. The system may further include a filter circuit configured to provide a filtered histogram of the photon counts from the plurality of registers. The system may also include a peak detection circuit configured to detect a location of a peak in the filtered histogram, and identify, using the location of the peak in the filtered histogram, locations in the plurality of registers storing an unfiltered representation of the peak.

In any embodiments, any or all of the following features may be included in any combination and without limitation. The system may also include a processor configured to receive the unfiltered representation of the peak and calculate a distance to the object in the environment surrounding the optical measurement system using the unfiltered representation of the peak. The filter circuit may be configured to provide the filtered histogram by applying a matched filter that corresponds to the one or more pulse trains. A pulse train in the one or more pulse trains may include a plurality of square pulses. The filter circuit may be configured to low-pass filter the unfiltered histogram. The system may also include a second plurality of registers that stores the filtered histogram. The filtered histogram may be generated on a single pass through the plurality of registers. The peak may be detected during the single pass through the plurality of registers such that the filtered histogram is not stored in its entirety. The peak detection circuit may be configured to detect the location of the peak by detecting increasing values followed by decreasing values in the plurality of registers. The processor may be implemented on an integrated circuit (IC) that is separate and distinct from an IC on which the plurality of registers is implemented. The light source and the photosensor may form a pixel in a plurality of pixels in the optical measurement system.

In some embodiments, a method of analyzing filtered and unfiltered data in an optical measurement system may include transmitting one or more pulse trains over one or more first time intervals as part of an optical measurement. Each of the one or more first time intervals may include one of the one or more pulse trains. The method may also include detecting photons from the one or more pulse trains that are reflected off an object in an environment surrounding the optical measurement system; populating a plurality of registers using the photons to represent an unfiltered histogram of photon counts received during the one or more first time intervals; filtering the unfiltered histogram in the plurality of registers to provide a filtered histogram of the photons from the plurality of registers; detecting a location of a peak in the filtered histogram; identifying, using the location of the peak in the filtered histogram, locations in the plurality of registers storing an unfiltered representation of the peak; and sending the unfiltered representation of the peak to a processor to calculate a distance to the object in the environment surrounding the optical measurement system using the unfiltered representation of the peak.

In any embodiments, any or all of the following features may be included in any combination and without limitation. Sending the unfiltered representation of the peak may include sending information identifying histogram time bins represented in the plurality of registers that store the unfiltered representation of the peak. Filtering the unfiltered histogram in the plurality of registers may include applying convolving the unfiltered histogram with at least one square filter having a plurality of identical values. The plurality of identical values may include a sequence of binary "1" values and/or a sequence of "−1" values. Filtering the unfiltered histogram in the plurality of registers may include convolving the unfiltered histogram with at least one sequence comprising a non-zero value followed by a plurality of zero values. The at least one sequence may include a single binary "1" value or a single binary "−1" followed by a plurality of "0" values. The method may also include sending a filtered representation of the peak to the processor in addition to sending the unfiltered representation of the peak. The location of the peak in the filtered histogram may be detected as a single peak in the filtered histogram; and the unfiltered representation of the peak may include at least two peaks in the unfiltered histogram. One of the at least two peaks in the unfiltered histogram may represent a peak resulting from a reflection of the one or more pulse trains off a housing or window of the optical measurement system. The photons may be detected using a plurality of photodetectors in a photosensor.

In some embodiments, an optical measurement system may include a plurality of light sources configured to emit one or more pulse trains over one or more time intervals as part of an optical measurement. The system may also include a plurality of photosensors configured to detect reflected photons from the one or more pulse trains emitted from corresponding light sources in the plurality of light sources. The plurality of photosensors may include a first photosensor and one or more other photosensors that are spatially adjacent to the first photosensor. The system may additionally include a plurality of memory blocks configured to accumulate photon counts of the photons received during the one or more time intervals by corresponding photosensors in the plurality of photosensors to represent a plurality of histograms of photon counts. The plurality of histograms may include a first histogram corresponding to the first photosensor and one or more histograms corresponding to the one or more other photosensors. The system may further include a circuit configured to combine information from the first histogram with information from the one or more other histograms to generate a distance measurement for the first photosensor.

In any embodiments, any or all of the following features may be included in any combination and without limitation. The one or more photosensors may be physically adjacent to the first photosensor in an array of photosensors. The array of photosensors may include a solid-state array of photosensors. The one or more photosensors may include eight photosensors that are orthogonally adjacent or diagonally adjacent to the first photosensor. The one or more photosensors need not be physically adjacent to the first photosensor in an array of photosensors, but the one or more photosensors may be positioned to receive photons from physical areas that are adjacent to a physical area from which photons are received by the first photosensor. The plurality of photosensors may be arranged in an array of photosensors that rotates around a central axis of the optical measurement system. The information from the first histogram may include a first distance measurement calculated based on the first histogram; the information from the one or more histograms may include one or more other distance measurements calculated based on the one or more other histograms; and the distance measurement may include a combination of the first distance measurement with the one or more other distance measurements. The first distance measurement may be below a detection limit of the optical measurement system before combining the first distance measurement with the plurality other of distance measurements. The distance measurement may be above the detection limit of the optical measurement system after combining the first distance measurement with the plurality of other distance measurements. The detection limit may represent a minimum number of photons received by a corresponding photosensor. The circuit to combine the information from the first histogram with the information from the one or more histograms may include a processor implemented on an integrated circuit that is different from an integrated circuit on which the plurality of memory blocks is implemented. The circuit and the plurality memory blocks may be implemented on a same integrated circuit.

In some embodiments, a method of using spatially adjacent pixel information in an optical measurement system may include transmitting one or more pulse trains over one or more first time intervals as part of an optical measurement; and detecting, using a plurality of photosensors, reflected photons from the one or more pulse trains. The plurality of photosensors may include a first photosensor and one or more photosensors that are spatially adjacent to the first photosensor. The method may also include accumulating photons counts received during the one or more time intervals by the plurality of photosensors to represent a plurality of histograms of photon counts. The plurality of histograms may include a first histogram corresponding to the first photosensor and one or more histograms corresponding to the one or more other photosensors. The method may additionally include combining information from the first histogram with information from the one or more histograms to generate a distance measurement for the first photosensor.

In any embodiments, any or all of the following features may be included in any combination and without limitation. The reflected photons received by the first photosensor and received by the one or more photosensors may be reflected from a same object in the surrounding environment. The information from the first histogram may include photon counts in the first histogram; the information from the one or more histograms may include photon counts in the one or more histograms; and the distance measurement may be calculated based on an aggregation of the photon counts in the first histogram with the photon counts in the one or more histograms. The information from the first histogram may include first one or more peaks in the first histogram; the information from the one or more histograms may include second one or more peaks in the one or more histograms; and the distance measurement may be calculated based on a combination of the first one or more peaks and the second one or more peaks. The distance measurement may be calculated based on a summation of the first one or more peaks and the second one or more peaks. The distance measurement may be calculated based on a Gaussian combination of the first one or more peaks and the second one or more peaks. The distance measurement may be calculated based on a convolution of the first one or more peaks and the second one or more peaks. The distance measurement may be calculated based on a weighted combination of the first one or more peaks and the second one or more peaks.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 16A illustrates a histogram memory with an initial peak resulting from housing reflections and a second peak resulting from reflections from an object in the surrounding environment, according to some embodiments.

FIG. 16B illustrates the problems with near-range peak detection without compensating for reflections off the housing, according to some embodiments.

TERMS

Figure 1B:
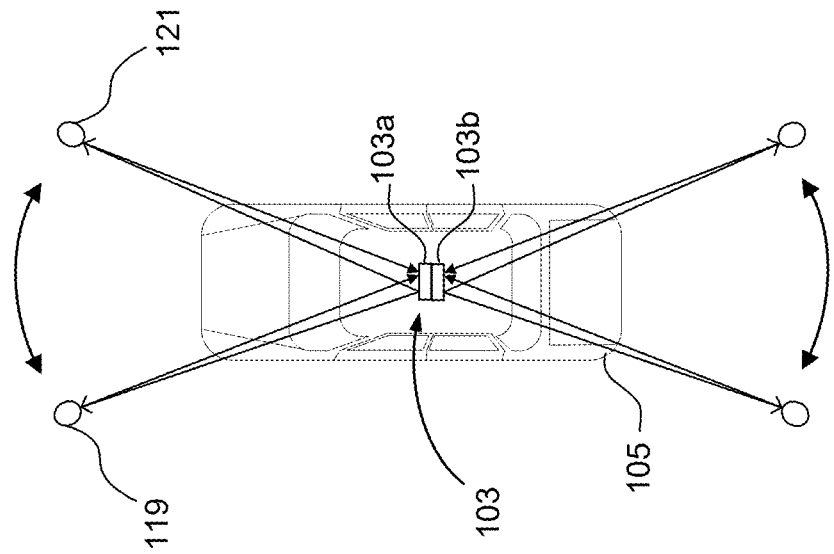
FIGS. 1A and 1B show automotive light ranging devices, also referred to herein as LIDAR systems, according to some embodiments.

The term "ranging," particularly when used in the context of methods and devices for measuring an environment or assisting with vehicle operations, may refer to determining a distance or a distance vector from one location or position to another location or position. "Light ranging" may refer to a type of ranging method that makes use of electromagnetic waves to perform ranging methods or functions. Accordingly, a "light ranging device" may refer to a device for performing light ranging methods or functions. "Lidar" or "LIDAR" may refer to a type of light ranging method that measures a distance to a target by illuminating the target with a pulsed laser light, and thereafter measure the reflected pulses with a sensor. Accordingly, a "lidar device" or "lidar system" may refer to a type of light ranging device for performing lidar methods or functions. A "light ranging system" may refer to a system comprising at least one light ranging device, e.g., a lidar device. The system may further comprise one or more other devices or components in various arrangements.

A "pulse train" may refer to one or more pulses that are transmitted together. The emission and detection of a pulse train may be referred to as a "shot." A shot can occur over a "detection time interval" (or "detection interval").

A "measurement" may include N multiple pulse trains that are emitted and detected over N shots, each lasting a detection time interval. An entire measurement can be over a measurement time interval (or just "measurement interval"), which may equal the N detection interval of a measurement or be longer, e.g., when pauses occur between detection intervals.

A "photosensor" or "photosensitive element" can convert light into an electrical signal. A photosensor may include a plurality of "photodetectors," e.g., single-photon avalanche diodes (SPADs). A photosensor can correspond to a particular pixel of resolution in a ranging measurement.

A "histogram" may refer to any data structure representing a series of values over time, as discretized over time bins. A histogram can have a value assigned to each time bin. For example, a histogram can store a counter of a number of photodetectors that fired during a particular time bin in each of one or more detection intervals. As another example, a histogram can correspond to the digitization of an analog signal at different times. A histogram can include signal (e.g., pulses) and noise. Thus, a histogram can be considered a combination of signal and noise as a photon time series or photon flux. A raw/digitized histogram (or accumulated photon time series) can contain the signal and the noise as digitized in memory without filtering. A "filtered histogram" may refer to the output after the raw histogram is passed through a filter.

An emitted signal/pulse may refer to the "nominal," "ideal," or "template" pulse or pulse train that is not distorted. A reflected signal/pulse may refer to the reflected laser pulse from an object and may be distorted. A digitized signal/pulse (or raw signal) may refer to the digitized result from the detection of one or more pulse trains of a detection interval as stored in memory, and thus may be equivalent to a portion of a histogram. A detected signal/pulse may refer to the location in memory that the signal was detected. A detected pulse train may refer to the actual pulse train found by a matched filter. An anticipated signal profile may refer to a shape of a digitized signal resulting from a particular emitted signal that has a particular distortion in the reflected signal.

DETAILED DESCRIPTION

The present disclosure relates generally to the field of object detection and ranging, and more particularly to the use of time-of-flight optical receiver systems for applications such as real-time three-dimensional mapping and object detection, tracking and/or classification. Various improvements can be realized with various embodiments of the present invention.

Sections below introduce an illustrative automotive LIDAR system, followed descriptions of example techniques to detect signals by a light ranging system, and then different embodiments are described in more details.

I. Illustrative Automotive Lidar System

Figure 1A:
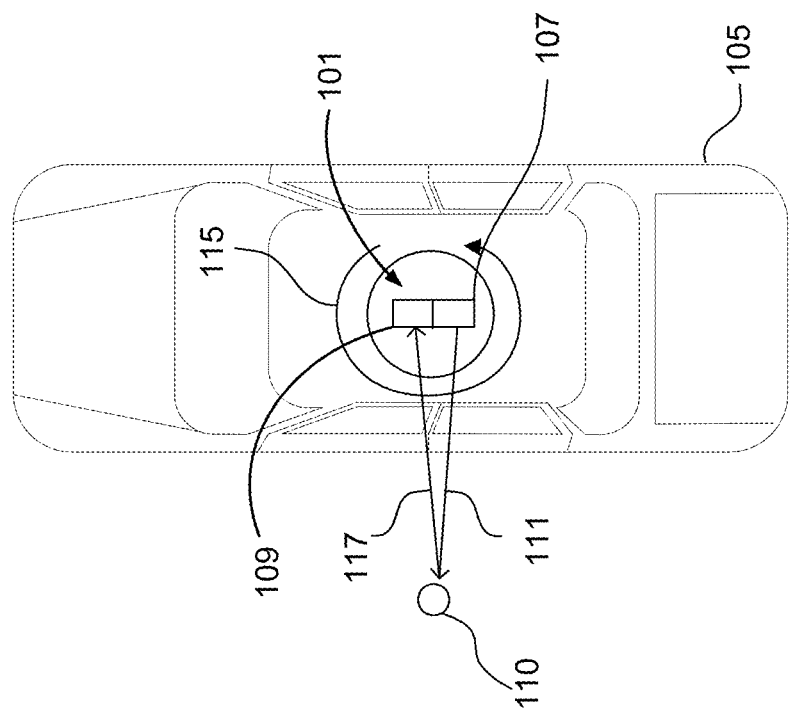

FIGS. 1A-1B show automotive light ranging devices, also referred to herein as LIDAR systems, according to some embodiments. The automotive application for the LIDAR systems is chosen here merely for the sake of illustration and the sensors described herein may be employed in other types of vehicles, e.g., boats, aircraft, trains, etc., as well as in a variety of other applications where 3D depth images are useful, such as medical imaging, mobile phones, augmented reality, geodesy, geomatics, archaeology, geography, geology, geomorphology, seismology, forestry, atmospheric physics, laser guidance, airborne laser swath mapping (ALSM), and laser altimetry. According to some embodiments, a LIDAR system, e.g., scanning LIDAR system 101 and/or solid state LIDAR system 103, can be mounted on the roof of a vehicle 105 as shown in FIGS. 1A and 1B.

The scanning LIDAR system 101 shown in FIG. 1A can employ a scanning architecture, where the orientation of the LIDAR light source 107 and/or detector circuitry 109 can be scanned around one or more fields of view 110 within an external field or scene that is external to the vehicle 105. In the case of the scanning architecture, the emitted light 111 can be scanned over the surrounding environment as shown. For example, the output beam(s) of one or more light sources (such as infrared or near-infrared pulsed IR lasers, not shown) located in the LIDAR system 101, can be scanned, e.g., rotated, to illuminate a scene around the vehicle. In some embodiments, the scanning, represented by rotation arrow 115, can be implemented by mechanical means, e.g., by mounting the light emitters to a rotating column or platform. In some embodiments, the scanning can be implemented through other mechanical means such as through the use of galvanometers. Chip-based steering techniques can also be employed, e.g., by using microchips that employ one or more MEMS based reflectors, e.g., such as a digital micromirror (DMD) device, a digital light processing (DLP) device, and the like. In some embodiments, the scanning can be effectuated through non-mechanical means, e.g., by using electronic signals to steer one or more optical phased arrays.

For a stationary architecture, like solid state LIDAR system 103 shown in FIG. 1B, one or more solid state LIDAR subsystems (e.g., 103a and 103b) can be mounted to the vehicle 105. Each solid state LIDAR unit can face a different direction (possibly with partially and/or non-overlapping fields of views between units) so as to capture a composite field of view that is larger than each unit is capable of capturing on its own.

In either the scanning or stationary architectures, objects within the scene can reflect portions of the light pulses that are emitted from the LIDAR light sources. One or more reflected portions then travel back to the LIDAR system and can be detected by the detector circuitry. For example, reflected portion 117 can be detected by detector circuitry 109. The detector circuitry can be disposed in the same housing as the emitters. Aspects of the scanning system and stationary system are not mutually exclusive and thus can be used in combination. For example, the individual LIDAR subsystems 103a and 103b in FIG. 1B can employ steerable emitters such as an optical phased array or whole the composite unit may rotate through mechanical means thereby scanning the entire scene in front of the LIDAR system, e.g., from field of view 119 to field of view 121.

Figure 2:
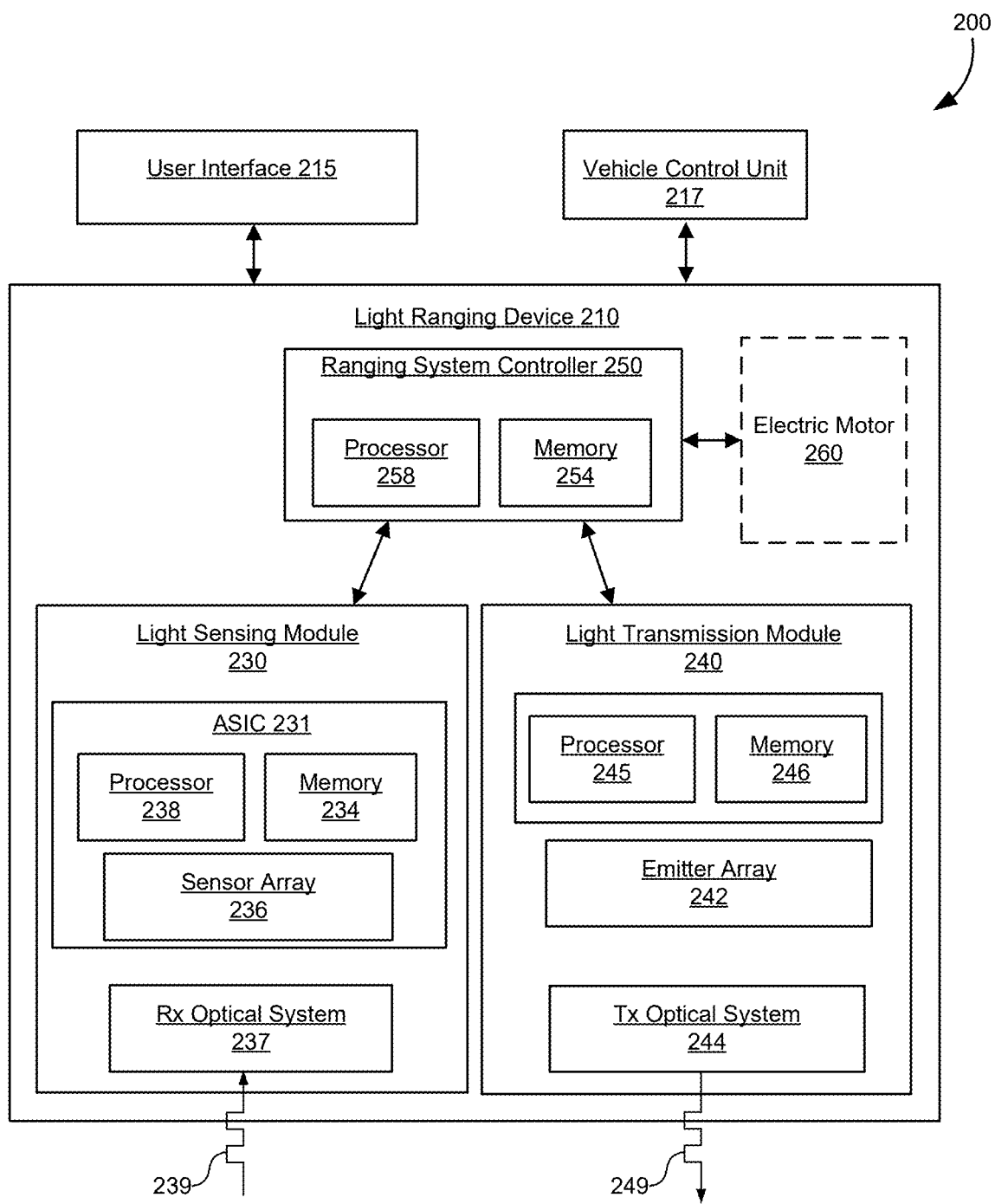
FIG. 2 shows a block diagram of an exemplary LIDAR device for implementing various embodiments.

FIG. 2 illustrates a more detailed block diagram of a rotating LIDAR system 200 according to some embodiments. More specifically, FIG. 2 optionally illustrates a rotating LIDAR system that can employ a rotary actuator on a rotating circuit board, which can receives power and data (as well as transmit) from a stationary circuit board.

LIDAR system 200 can interact with one or more instantiations of user interface 215. The different instantiations of user interface 215 can vary and may include, e.g., a computer system with a monitor, keyboard, mouse, CPU and memory; a touch-screen in an automobile; a handheld device with a touch-screen; or any other appropriate user interface. The user interface 215 may be local to the object upon which the LIDAR system 200 is mounted but can also be a remotely operated system. For example, commands and data to/from the LIDAR system 200 can be routed through a cellular network (LTE, etc.), a personal area network (Bluetooth, Zigbee, etc.), a local area network (WiFi, IR, etc.), or a wide area network such as the Internet.

The user interface 215 of hardware and software can present the LIDAR data from the device to the user but can also allow a user to control the LIDAR system 200 with one or more commands. Example commands can include commands that activate or deactivate the LIDAR system, specify photo-detector exposure level, bias, sampling duration and other operational parameters (e.g., emitted pulse patterns and signal processing), specify light emitters parameters such as brightness. In addition, commands can allow the user to select the method for displaying results. The user interface can display LIDAR system results which can include, e.g., a single frame snapshot image, a constantly updated video image, and/or a display of other light measurements for some or all pixels. In some embodiments, user interface 215 can track distances (proximity) of objects from the vehicle, and potentially provide alerts to a driver or provide such tracking information for analytics of a driver's performance.

In some embodiments, the LIDAR system can communicate with a vehicle control unit 217 and one or more parameters associated with control of a vehicle can be modified based on the received LIDAR data. For example, in a fully autonomous vehicle, the LIDAR system can provide a real time 3D image of the environment surrounding the car to aid in navigation. In other cases, the LIDAR system can be employed as part of an advanced driver-assistance system (ADAS) or as part of a safety system that, e.g., can provide 3D image data to any number of different systems, e.g., adaptive cruise control, automatic parking, driver drowsiness monitoring, blind spot monitoring, collision avoidance systems, etc. When a vehicle control unit 217 is communicably coupled to light ranging device 210, alerts can be provided to a driver or tracking of a proximity of an object can be tracked.

The LIDAR system 200 shown in FIG. 2 includes the light ranging device 210. The light ranging device 210 includes a ranging system controller 250, a light transmission (Tx) module 240 and a light sensing (Rx) module 230. Ranging data can be generated by the light ranging device by transmitting one or more light pulses 249 from the light transmission module 240 to objects in a field of view surrounding the light ranging device. Reflected portions 239 of the transmitted light are then detected by the light sensing module 230 after some delay time. Based on the delay time, the distance to the reflecting surface can be determined. Other ranging methods can be employed as well, e.g., continuous wave, Doppler, and the like.

The Tx module 240 includes an emitter array 242, which can be a one-dimensional or two-dimensional array of emitters, and a Tx optical system 244, which when taken together can form an array of micro-optic emitter channels. Emitter array 242 or the individual emitters are examples of laser sources. The Tx module 240 further includes processor 245 and memory 246. In some embodiments, a pulse coding technique can be used, e.g., Barker codes and the like. In such cases, memory 246 can store pulse-codes that indicate when light should be transmitted. In one embodiment the pulse-codes are stored as a sequence of integers stored in memory.

The Rx module 230 can include sensor array 236, which can be, e.g., a one-dimensional or two-dimensional array of photosensors. Each photosensor or photosensitive element (also referred to as a sensor) can include a collection of photodetectors, e.g., APDs or the like, or a sensor can be a single photon detector (e.g., an SPAD). Like the Tx module 240, Rx module 230 includes an Rx optical system 237. The Rx optical system 237 and sensor array 236 taken together can form an array of micro-optic receiver channels. Each micro-optic receiver channel measures light that corresponds to an image pixel in a distinct field of view of the surrounding volume. Each sensor (e.g., a collection of SPADs) of sensor array 236 can correspond to a particular emitter of emitter array 242, e.g., as a result of a geometrical configuration of light sensing module 230 and light transmission module 240.

In one embodiment, the sensor array 236 of the Rx module 230 is fabricated as part of a monolithic device on a single substrate (using, e.g., CMOS technology) that includes both an array of photon detectors and an ASIC 231 for signal processing the raw histograms from the individual photon detectors (or groups of detectors) in the array. As an example of signal processing, for each photon detector or grouping of photon detectors, memory 234 (e.g., SRAM) of the ASIC 231 can accumulate counts of detected photons over successive time bins, and these time bins taken together can be used to recreate a time series of the reflected light pulse (i.e., a count of photons vs. time). This time-series of aggregated photon counts is referred to herein as an intensity histogram (or just histogram). The ASIC 231 can implement matched filters and peak detection processing to identify return signals in time. In addition, the ASIC 231 can accomplish certain signal processing techniques (e.g., by processor 238), such as multi-profile matched filtering to help recover a photon time series that is less susceptible to pulse shape distortion that can occur due to SPAD saturation and quenching. In some embodiments, all or parts of such filtering can be performed by processor 258, which may be embodied in an FPGA.

In some embodiments, the Rx optical system 237 can also be part of the same monolithic structure as the ASIC, with separate substrate layers for each receiver channel layer. For example, an aperture layer, collimating lens layer, an optical filter layer and a photo-detector layer can be stacked and bonded at the wafer level before dicing. The aperture layer can be formed by laying a non-transparent substrate on top of a transparent substrate or by coating a transparent substrate with an opaque film. In yet other embodiments, one or more components of the Rx module 230 may be external to the monolithic structure. For example, the aperture layer may be implemented as a separate metal sheet with pinholes.

In some embodiments, the photon time series output from the ASIC are sent to the ranging system controller 250 for further processing, e.g., the data can be encoded by one or more encoders of the ranging system controller 250 and then sent as data packets to user interface 215. The ranging system controller 250 can be realized in multiple ways including, e.g., by using a programmable logic device such an FPGA, as an ASIC or part of an ASIC, using a processor 258 with memory 254, and some combination of the above. The ranging system controller 250 can cooperate with a stationary base controller or operate independently of the base controller (via pre-programed instructions) to control the light sensing module 230 by sending commands that include start and stop light detection and adjust photo-detector parameters. Similarly, the ranging system controller 250 can control the light transmission module 240 by sending commands, or relaying commands from the base controller, that include start and stop light emission controls and controls that can adjust other light-emitter parameters (e.g., pulse codes). In some embodiments, the ranging system controller 250 has one or more wired interfaces or connectors for exchanging data with the light sensing module 230 and with the light transmission module 240. In other embodiments, the ranging system controller 250 communicates with the light sensing module 230 and light transmission module 240 over a wireless interconnect such as an optical communication link.

The electric motor 260 may be an optional component needed when system components, e.g., the Tx module 240 and or Rx module 230, need to rotate. The system controller 250 controls the electric motor 260 and can start rotation, stop rotation and vary the rotation speed.

II. Detection of Reflected Pulses

The photosensors can be arranged in a variety of ways for detecting reflected pulses. For example, the photosensors can be arranged in an array, and each photosensor can include an array of photodetectors (e.g., SPADs). Different patterns of pulses (pulse trains) transmitted during a detection interval are also described below.

A. Time-of-Flight Measurements and Detectors

Figure 3:
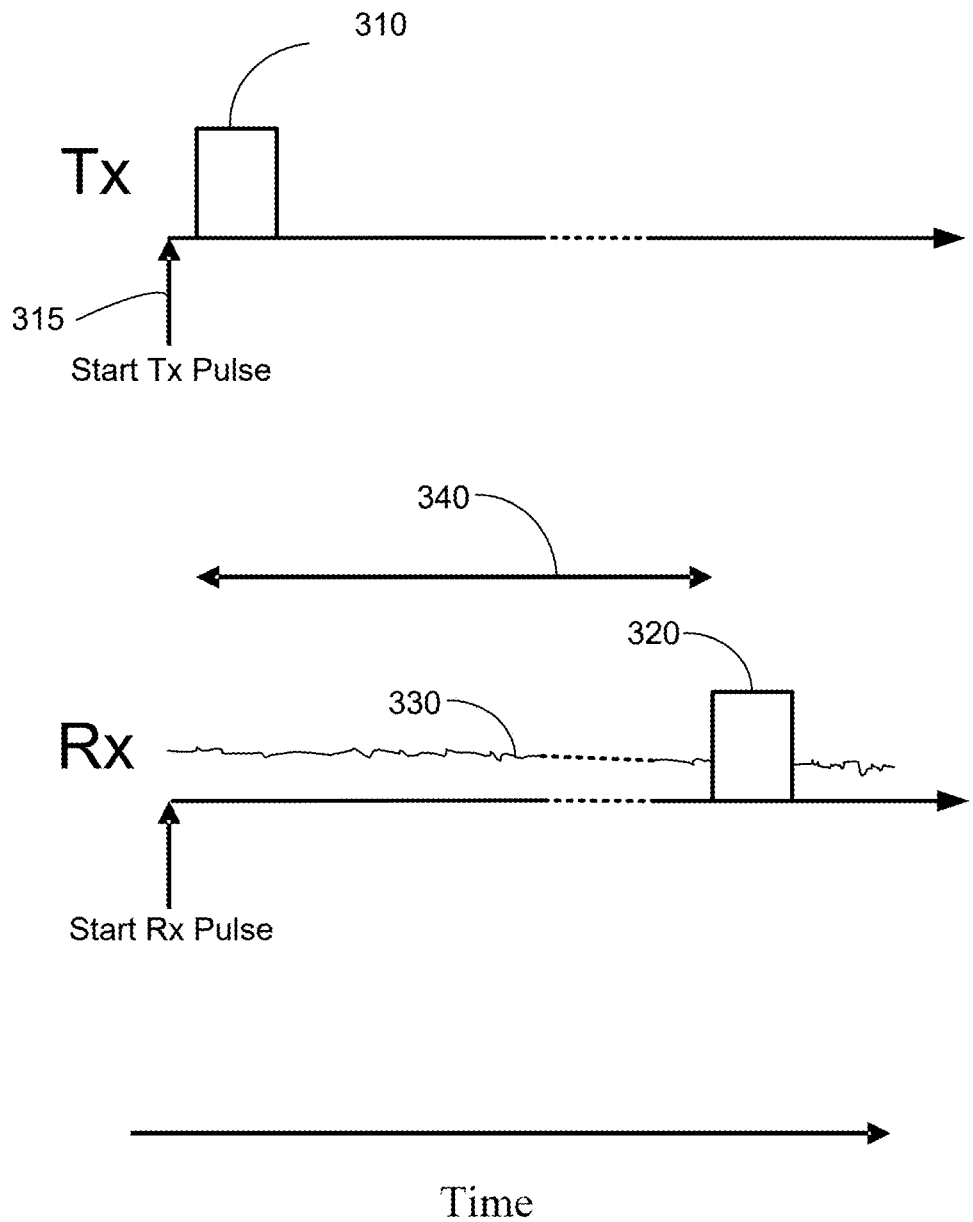
FIG. 3 illustrates the operation of a typical LIDAR system that may be improved by embodiments.

FIG. 3 illustrates the operation of a typical LIDAR system that may be improved by some embodiments. A laser generates a light pulse 310 of short duration. The horizontal axis represents time and the vertical axis represents power. An example laser pulse duration, characterized by the full-width half maximum (FWHM), is a few nanoseconds, with the peak power of a single emitter being around a few watts. Embodiments that use side emitter lasers or fiber lasers may have much higher peak powers, while embodiments with small diameter VCSELs could have peak powers in the tens of milliwatts to hundreds of milliwatts.

A start time 315 for the transmission of the pulse does not need to coincide with the leading edge of the pulse. As shown, the leading edge of light pulse 310 may be after the start time 315. One may want the leading edge to differ in situations where different patterns of pulses are transmitted at different times, e.g., for coded pulses.

An optical receiver system can start detecting received light at the same time as the laser is started, i.e., at the start time. In other embodiments, the optical receiver system can start at a later time, which is at a known time after the start time for the pulse. The optical receiver system detects background light 330 initially and after some time detects the laser pulse reflection 320. The optical receiver system can compare the detected light intensity against a threshold to identify the laser pulse reflection 320. The threshold can distinguish the background light 330 from light corresponding to the laser pulse reflection 320.

The time-of-flight 340 is the time difference between the pulse being sent and the pulse being received. The time difference can be measured by subtracting the transmission time of the pulse (e.g., as measured relative to the start time) from a received time of the laser pulse reflection 320 (e.g., also measured relative to the start time). The distance to the target can be determined as half the product of the time-of-flight and the speed of light. Pulses from the laser device reflect from objects in the scene at different times and the pixel array detects the pulses of radiation reflection.

B. Detection of Objects Using Array Lasers and Array of Photosensors

Figure 4:
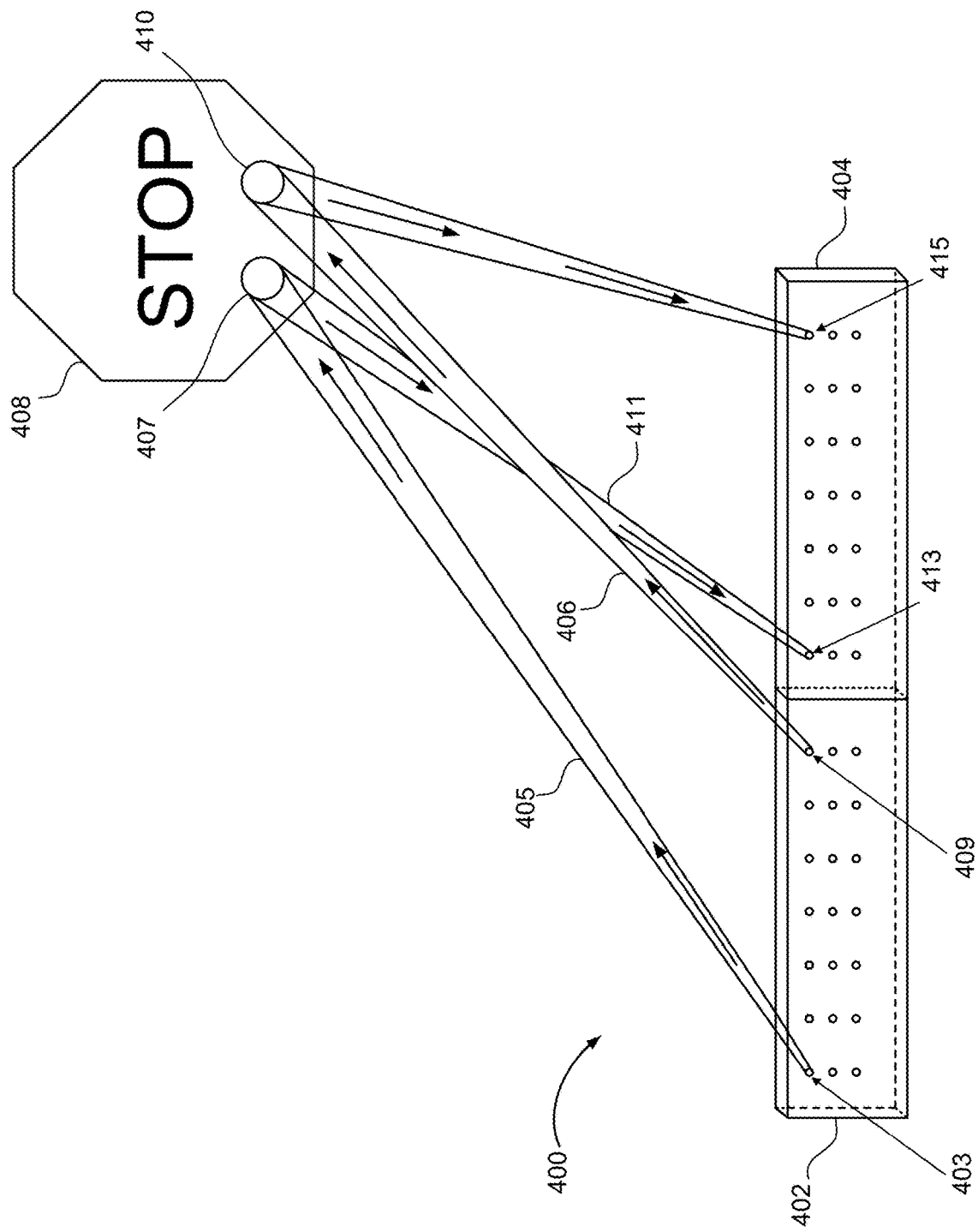
FIG. 4 shows an illustrative example of the light transmission and detection process for a light ranging system according to some embodiments.

FIG. 4 shows an illustrative example of the light transmission and detection process for a light ranging system, according to some embodiments. FIG. 4 shows a light ranging system (e.g., solid state or and/or scanning) collecting three-dimensional distance data of a volume or scene that surrounds the system. FIG. 4 is an idealized drawing to highlight relationships between emitters and sensors, and thus other components are not shown.

Light ranging system 400 includes a light emitter array 402 and a light sensor array 404. The light emitter array 402 includes an array of light emitters, e.g., an array of VCSELs and the like, such as emitter 403 and emitter 409. Light sensor array 404 includes an array of photosensors, e.g., sensors 413 and 415. The photosensors can be pixelated light sensors that employ, for each pixel, a set of discrete photodetectors such as single photon avalanche diodes (SPADs) and the like. However, various embodiments can deploy any type of photon sensors.

Each emitter can be slightly offset from its neighbor and can be configured to transmit light pulses into a different field of view from its neighboring emitters, thereby illuminating a respective field of view associated with only that emitter. For example, emitter 403 emits an illuminating beam 405 (formed from one or more light pulses) into the circular field of view 407 (the size of which is exaggerated for the sake of clarity). Likewise, emitter 409 emits an illuminating beam 406 (also called an emitter channel) into the circular field of view 410. While not shown in FIG. 4 to avoid complication, each emitter emits a corresponding illuminating beam into its corresponding field of view resulting in a 2D array of fields of view being illuminated (21 distinct fields of view in this example).

Each field of view that is illuminated by an emitter can be thought of as a pixel or spot in the corresponding 3D image that is produced from the ranging data. Each emitter channel can be distinct to each emitter and be non-overlapping with other emitter channels, i.e., there is a one-to-one mapping between the set of emitters and the set of non-overlapping fields or view. Thus, in the example of FIG. 4, the system can sample 21 distinct points in the 3D space. A denser sampling of points can be achieved by having a denser array of emitters or by scanning angular position of the emitter beams over time such that one emitter can sample several points in space. As described above, scanning can be accomplished by rotating the entire emitter/sensor assembly.

Each sensor can be slightly offset from its neighbor and, like the emitters described above, each sensor can see a different field of view of the scene in front of the sensor. Furthermore, each sensor's field of view substantially coincides with, e.g., overlaps with and is the same size as a respective emitter channel's field of view.

In FIG. 4, the distance between corresponding emitter-sensor channels is exaggerated relative to the distance to objects in the field of view. In practice, the distance to the objects in the field of few is much greater than the distance between corresponding emitter-sensor channels and thus the path of light from the emitter to the object is approximately parallel to the path of the reflected light back from the object to the sensor (i.e., it is almost "back reflected"). Accordingly, there is a range of distances in front of the system 400 over which the fields of view of individual sensors and emitters are overlapped.

Because the fields of view of the emitters are overlapped with the fields of view of their respective sensors, each sensor channel ideally can detect the reflected illumination beam that originates from its respective emitter channel with ideally no cross-talk, i.e., no reflected light from other illuminating beams is detected. Thus, each photosensor can correspond to a respective light source. For example, emitter 403 emits an illuminating beam 405 into the circular field of view 407 and some of the illuminating beam reflects from the object 408. Ideally, a reflected beam 411 is detected by sensor 413 only. Thus, emitter 403 and sensor 413 share the same field of view, e.g., field of view 407, and form an emitter-sensor pair. Likewise, emitter 409 and sensor 415 form an emitter-sensor pair, sharing field of view 410. While the emitter-sensor pairs are shown in FIG. 4 as being in the same relative locations in their respective array, any emitter can be paired with any sensor depending on the design of the optics used in the system.

During a ranging measurement, the reflected light from the different fields of view distributed around the volume surrounding the LIDAR system is collected by the various sensors and processed, resulting in range information for any objects in each respective field of view. As described above, a time-of-flight technique can be used in which the light emitters emit precisely timed pulses, and the reflections of the pulses are detected by the respective sensors after some elapsed time. The elapsed time between emission and detection and the known speed of light is then used to compute the distance to the reflecting surface. In some embodiments, additional information can be obtained by the sensor to determine other properties of the reflecting surface in addition to the range. For example, the Doppler shift of a pulse can be measured by the sensor and used to compute the relative velocity between the sensor and the reflecting surface. The pulse strength can be used to estimate the target reflectivity, and the pulse shape can be used to determine if the target is a hard or diffuse material.

In some embodiments, the LIDAR system can be composed of a relatively large 2D array of emitter and sensor channels and operate as a solid state LIDAR, i.e., it can obtain frames of range data without the need to scan the orientation of the emitters and/or sensors. In other embodiments, the emitters and sensors can be scanned, e.g., rotated about an axis, to ensure that the fields of view of the sets of emitters and sensors sample a full 360 degree region (or some useful fraction of the 360 degree region) of the surrounding volume. The range data collected from the scanning system, e.g., over some predefined time period, can then be post-processed into one or more frames of data that can then be further processed into one or more depth images or 3D point clouds. The depth images and/or 3D point clouds can be further processed into map tiles for use in 3D mapping and navigation applications.

C. Multiple Photodetectors in Each Photosensor

Figure 5:
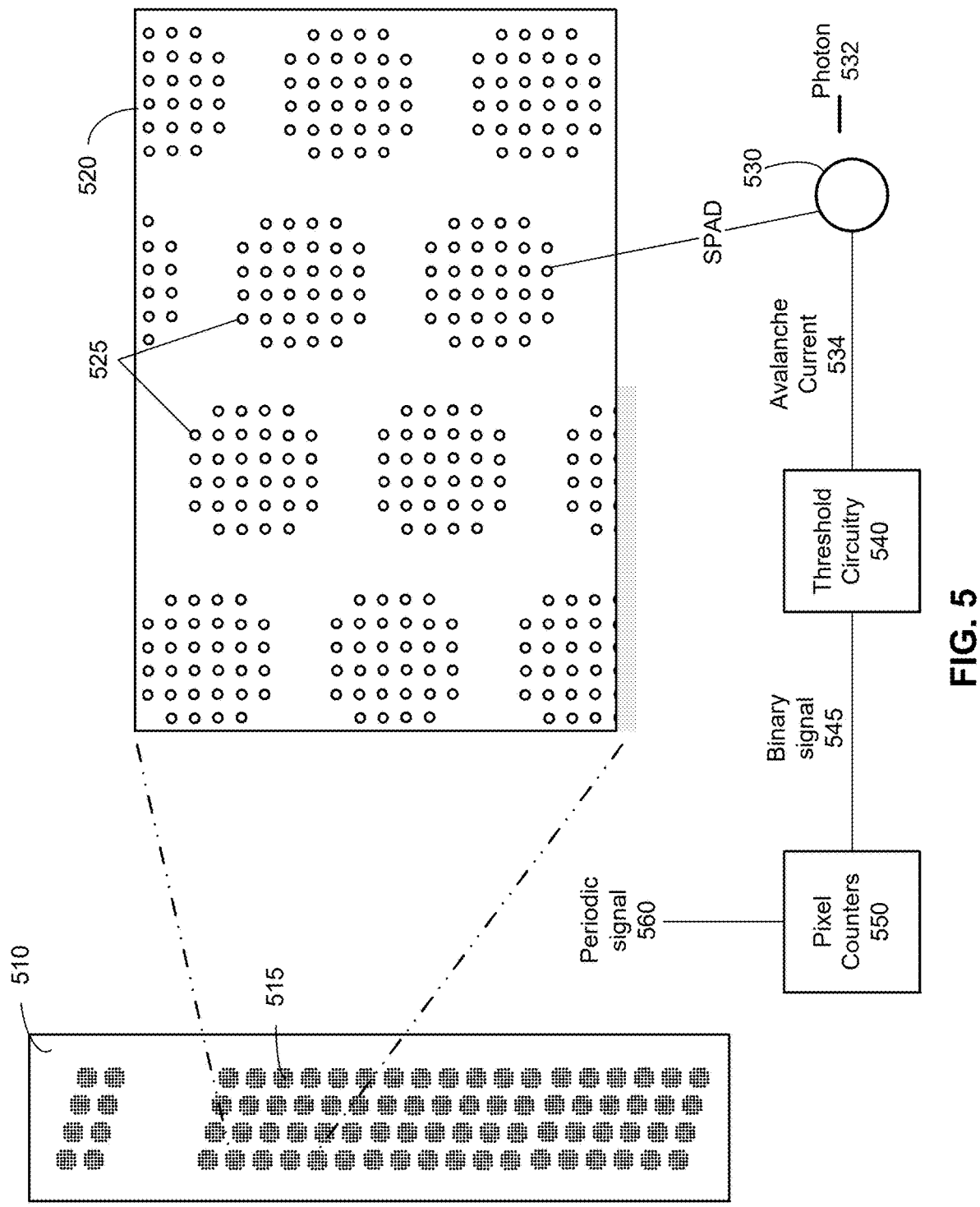
FIG. 5 shows various stages of a sensor array and associated electronics according to embodiments of the present invention.

FIG. 5 shows various stages of a sensor array and associated electronics according to embodiments of the present invention. Array 510 shows photosensors 515 that each correspond to a different pixel. Array 510 can be a staggered array. In this specific example, array 510 is 18×4 photosensors. Array 510 can be used to achieve a high resolution (e.g. 72×1024) as the implementation is amenable to sweeping.

Array 520 shows a magnified view of a portion of array 510. As can be seen, each photosensor 515 is composed of a plurality of photodetectors 525. Signals from the photodetectors of a pixel collectively contribute to a measurement for that pixel.

In some embodiments, each pixel has a multitude of single-photon avalanche diode (SPAD) units that increase the dynamic range of the pixel itself. Each SPAD can have an analog front end circuit for biasing, quenching, and recharging. SPADs are normally biased with a biased voltage above the breakdown voltage. A suitable circuit senses the leading edge of the avalanche current, generates a standard output pulse synchronous with the avalanche build-up, quenches the avalanche by lowering the bias down below the breakdown voltage, and restore the photodiode to the operative level.

The SPADs may be positioned so as to maximize the fill factor in their local area, or a microlens array may be used, which allows for high optical fill factors at the pixel level. Accordingly, an imager pixel can includes an array of SPADs to increase the efficiency of the pixel detector. A diffuser may be used to spreads rays passed through an aperture and collimated by a microlens. The can diffuser serves to spread the collimated rays in a way that all the SPADs belonging to the same pixel receive some radiation.

FIG. 5 further shows a particular photodetector 530 (e.g., a SPAD) that detects a photon 532. In response to the detection, photodetector 530 produces an avalanche current 534 of charge carriers (electrons or holes). Threshold circuitry 540 conditions the avalanche current 534 by comparing it to a threshold. When a photon is detected and photodetector 530 is functioning properly, the avalanche current 534 rises above the comparator threshold and threshold circuitry 540 produces a temporally accurate binary signal 545 indicating the accurate time of the SPAD current avalanche, which is in turn an accurate measurement of the photon arrival. The correlation of the current avalanche to the photon arrival can occur with a resolution of nanoseconds, thereby providing high timing resolution. The rising edge of binary signal 545 can be latched by pixel counters 550.

Binary signal 545, avalanche current 534, and pixel counters 550 are examples of data values that can be provided by a photosensor composed of one or more SPADs. The data values can determined from respective signals from each of the plurality of photodetectors. Each of the respective signals can be compared to a threshold to determine whether a corresponding photodetector triggered. Avalanche current 534 is an example of an analog signal, and thus the respective signals can be analog signals.

Pixel counters 550 can use binary signal 545 to count the number of photodetectors for a given pixel that have been triggered by one or more photons during a particular time bin (e.g., a time window of 1, 2, 3, etc. ns) as controlled by periodic signal 560. Pixel counters 550 can store counters for each of a plurality of time bins for a given measurement. The value of the counter for each time bind can start at zero and be incremented based on binary signal 545 indicating a detection of a photon. The counter can increment when any photodetector of the pixel provide such a signal.

Periodic signal 560 can be produced by a phase-locked loop (PLL) or delay-locked loop (DLL) or any other method of producing a clock signal. The coordination of periodic signal 560 and pixel counter 550 can act as a time-to-digital converter (TDC), which is a device for recognizing events and providing a digital representation of the time they occurred. For example, a TDC can output the time of arrival for each detected photon or optical pulse. The measure time can be an elapsed time between two events (e.g., start time and detected photon or optical pulse) rather than an absolute time. Periodic signal 560 can be a relatively fast clock that switches between a bank of memory comprising pixel counter 550. Each register in memory can correspond to one histogram bin, and the clock can switch between them at the sampling interval. Accordingly, a binary value indicating a triggering can be sent to the histogram circuitry when the respective signal is greater than the threshold. The histogram circuitry can aggregate binary values across the plurality of photodetectors to determine a number of photodetectors that triggered during a particular time bin.

The time bins can be measured relative to a start signal, e.g., at start time 315 of FIG. 3. Thus, the counters for time bins right after the start signal may have low values corresponding to a background signal, e.g., background light 330. A last time bin can correspond to an end of a detection time interval (also called a shot) for a given pulse train, which is further described in the next section. The number of cycles of periodic signal 560 since a start time can act as a timestamp for when a rising edge of avalanche current 534 indicates a detected photon. The timestamp corresponds to the time bin for a particular counter in pixel counters 550. Such an operation is different from a simple analog-to-digital converter (ADC) following a photodiode (e.g., as for an avalanche photodiode (APD)). Each of the counters of the time bins can correspond to a histogram, which is described in more detail below. Therefore, while the APD is a linear amplifier for the input optical signal with limited gain, the SPAD is a trigger device that provides a binary output of yes/no for a triggering event occurring in a time window.

D. Pulse Trains

Ranging may also be accomplished by using a pulse train, defined as containing one or more pulses. Within a pulse train, the number of pulses, the widths of the pulses, and the time duration between pulses (collectively referred to as a pulse pattern) can be chosen based on a number of factors, some of which includes:

1—Maximum laser duty cycle—The duty cycle is the fraction of time the laser is on. For a pulsed laser this could be determined by the FWHM as explained above and the number of pulses emitted during a given period.

2—Eye safety limits—This is determined by maximum amount of radiation a device can emit without damaging the eyes of a bystander who happens to be looking in the direction of the LIDAR system.

3—Power consumption—This is the power that the emitter consumes for illuminating the scene.

For example, the spacing between pulses in a pulse train can be on the order of single digits or 10s of nanoseconds.

Multiple pulse trains can be emitted during the time span of one measurement. Each pulse train can correspond to a different time interval, e.g., a subsequent pulse train is not emitted until an expiration of the time limit for detecting reflected pulses of a previous pulse train.

For a given emitter or laser device, the time between the emissions of pulse trains determines the maximum detectable range. For example, if pulse train A is emitted at time $t_0=0$ ns, and pulse train B is emitted at time $t_1=1000$ ns, then one must not assign reflected pulse trains detected after $t_1$ to pulse train A, as they are much more likely to be reflections from pulse train B. Thus, the time between pulse trains and the speed of light define a maximum bound on the range of the system given in the following equation.

$$R_{max} = c \times (t_1 - t_0)/2$$

The time between shots (emission and detection of pulse trains) can be on the order of 1 μs to allow enough time for the entire pulse train to travel to a distant object approximately 150 meters away and then back.

III. Histogram Signals from Photodetectors

One mode of operation of a LIDAR system is time-correlated single photon counting (TCSPC), which is based on counting single photons in a periodic signal. This technique works well for low levels of periodic radiation which is suitable in a LIDAR system. This time correlated counting may be controlled by periodic signal 560 of FIG. 5 and may use time bins, as discussed for FIG. 5.

The frequency of the periodic signal can specify a time resolution within which data values of a signal are measured. For example, one measured value can be obtained for each photosensor per cycle of the periodic signal. In some embodiments, the measurement value can be the number of photodetectors that the triggered during that cycle. The time period of the periodic signal corresponds to time bin, with each cycle being a different time bin.

Figure 6:
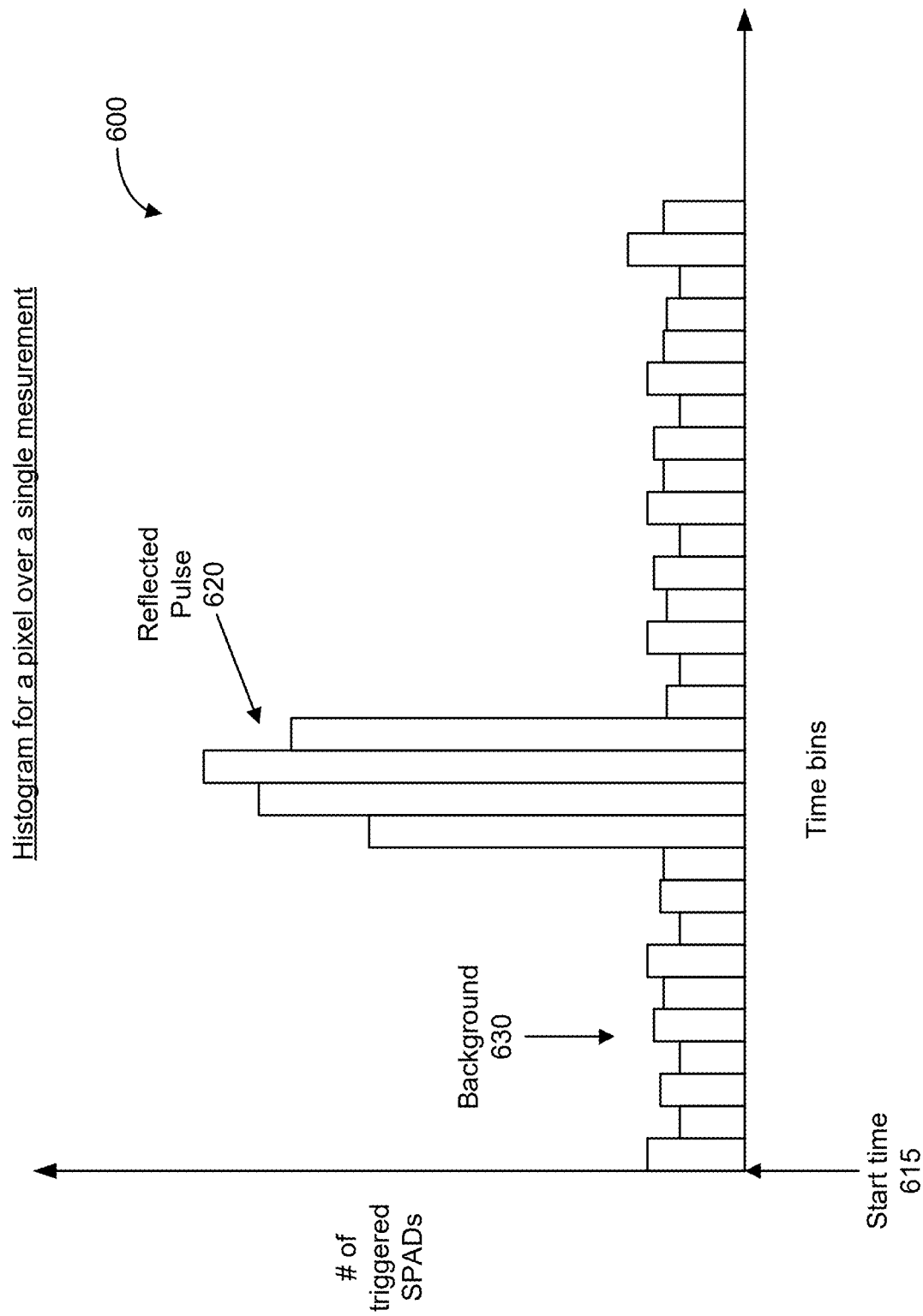
FIG. 6 shows a histogram according to embodiments of the present invention.

FIG. 6 shows a histogram 600 according to embodiments of the present invention. The horizontal axis corresponds to time bins as measured relative to start time 615. As described above, start time 615 can correspond to a start time for the pulse train. Any offsets between rising edges of the first pulse of a pulse train and the start time for either or both of a pulse train and a detection time interval can be accounted for wherein determining the received time to be used for the time-of-flight measurement. The vertical axis corresponds to the number of triggered SPADs. In certain embodiments, the vertical axis may correspond to an output of an ADC that follows an APD. For example, APDs can exhibit traditional saturation effects, such as a constant maximum signal rather than the dead-time based effects of SPADs. Some effects can occur for both SPADs and APDs, e.g., pulse smearing of very oblique surfaces may occur for both SPADs and APDs.

The counter for each of the time bins corresponds to a different bar in histogram 600. The counters at the early time bins are relatively low and correspond to background noise 630. At some point, a reflected pulse 620 is detected. The corresponding counters are much larger, and may be above a threshold that discriminate between background and a detected pulse. The reflected pulse 620 (after digitizing) is shown corresponding to four time bins, which might result from a laser pulse of a similar width, e.g., a 4 ns pulse when time bins are each 1 ns. But, as described in more detail below, the number of time bins can vary, e.g., based on properties of a particular object in an angle of incidence of the laser pulse.

The temporal location of the time bins corresponding to reflected pulse 620 can be used to determine the received time, e.g., relative to start time 615. As described in more detail below, matched filters can be used to identify a pulse pattern, thereby effectively increasing the signal-to-noise ratio, but also to more accurately determine the received time. In some embodiments, the accuracy of determining a received time can be less than the time resolution of a single time bin. For instance, for a time bin of 1 ns, that resolution would correspond to about 15 cm. However, it can be desirable to have an accuracy of only a few centimeters.

Accordingly, a detected photon can result in a particular time bin of the histogram being incremented based on its time of arrival relative to a start signal, e.g., as indicated by start time 615. The start signal can be periodic such that multiple pulse trains are sent during a measurement. Each start signal can be synchronized to a laser pulse train, with multiple start signals causing multiple pulse trains to be transmitted over multiple detection intervals. Thus, a time bin (e.g., from 200 to 201 ns after the start signal) would occur for each detection interval. The histogram can accumulate the counts, with the count of a particular time bin corresponding to a sum of the measured data values all occurring in that particular time bin across multiple shots. When the detected photons are histogrammed based on such a technique, it results in a return signal with a signal to noise ratio greater than from a single pulse train by the square root of the number of shots taken.

Figure 7:
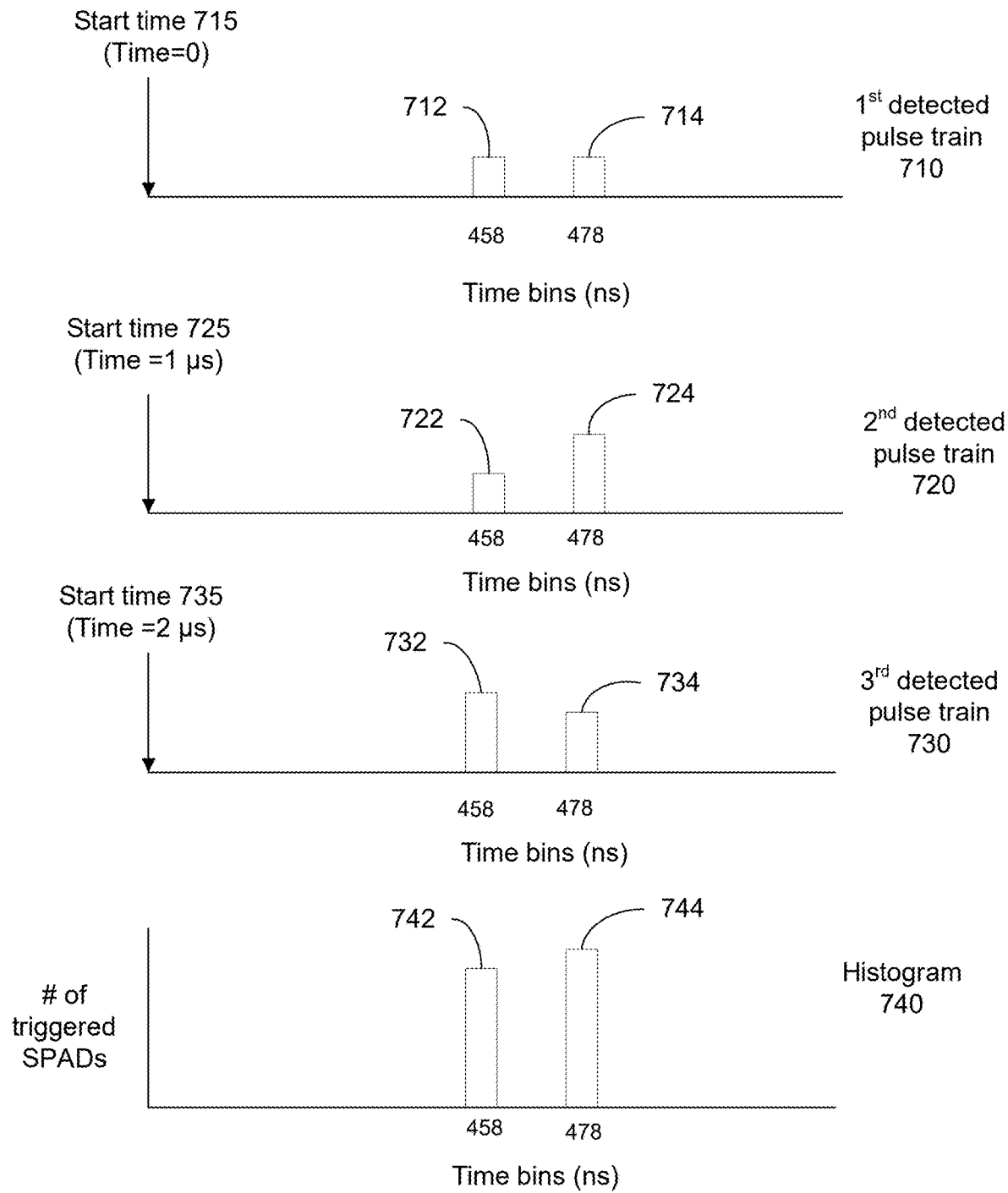
FIG. 7 shows the accumulation of a histogram over multiple pulse trains for a selected pixel according to embodiments of the present invention.

FIG. 7 shows the accumulation of a histogram over multiple pulse trains for a selected pixel according to embodiments of the present invention. FIG. 7 shows three detected pulse trains 710, 720 and 730. Each detected pulse train corresponds to a transmitted pulse train that has a same pattern of two pulses separated by a same amount of time. Thus, each detected pulse train has a same pulse pattern, as shown by two time bins having an appreciable value. Counters for other time bins are not shown for ease of illustration, although the other time bins may have relatively low non-zero values.

In the first detected pulse train 710, the counters for time bins 712 and 714 are the same. This can result from a same number of photodetectors detecting a photon during the two time bins. Or, in other embodiments, approximately the same number of photons being detected during the two time bins. In other embodiments, more than one consecutive time bin can have a consecutive non-zero value; but for ease of illustration, individual nonzero time bins have been shown.

Time bins 712 and 714 respectively occur 458 ns and 478 ns after start time 715. The displayed counters for the other detected pulse trains occur at the same time bins relative to their respective start times. In this example, start time 715 is identified as occurring at time 0, but the actual time is arbitrary. The first detection interval for the first detected pulse train can be 1 μs. Thus, the number of time bins measured from start time 715 can be 1,000. After, this first detection interval ends, a new pulse train can be transmitted and detected. The start and end of the different time bins can be controlled by a clock signal, which can be part circuitry that acts as a time-to-digital converter (TDC), e.g., as is described in FIG. 5.

For the second detected pulse train 720, the start time 725 is at 1 μs, e.g., at which the second pulse train can be emitted. Such a separate detection interval can occur so that any pulses transmitted at the beginning of the first detection interval would have already been detected, and thus not cause confusion for pulses detected in the second time interval. For example, if there is not extra time between shots, then the circuitry could confuse a retroreflective stop sign at 200 m with a much less reflective object at 50 m (assuming a shot period of about 1 μs). The two detection time intervals for pulse trains 710 and 720 can be the same length and have the same relationship to the respective start time. Time bins 722 and 724 occur at the same relative times of 458 ns and 478 ns as time bin 712 and 714. Thus, when the accumulation step occurs, the corresponding counters can be added. For instance, the counter values at time bin 712 and 722 can be added together.

For the third detected pulse train 730, the start time 735 is at 2 μs, e.g., in which the third pulse train can be emitted. Time bin 732 and 734 also occur at 458 ns and 478 ns relative to its respective start time 735. The counters at different time bins may have different values even though the emitted pulses have a same power, e.g., due to the stochastic nature of the scattering process of light pulses off of objects.

Histogram 740 shows an accumulation of the counters from three detected pulse trains at time bins 742 and 744, which also correspond to 458 ns and 478 ns. Histogram 740 could have less number of time bins that are measured during the respective detection intervals, e.g., as a result of dropping time bins in the beginning or the end, or that have values less than a threshold. In some implementations, about 10-30 time bins can have appreciable values, depending on the pattern for a pulse train.

As examples, the number of pulse trains emitted during a measurement to create a single histogram can be around 1-40 (e.g., 24), but can also be much higher, e.g., 50, 100, or 500. Once a measurement is completed, the counters for the histogram can be reset, and a set of pulse trains can be emitted to perform a new measurement. In various embodiments and depending on the number of detection intervals in the respective duration, measurements can be performed every 25, 50, 100, or 500 μs. In some embodiments, measurement intervals can overlap, e.g., so a given histogram corresponds to a particular sliding window of pulse trains. In such an example, memory can exist for storing multiple histograms, each corresponding to a different time window. Any weights applied to the detected pulses can be the same for each histogram, or such weights could be independently controlled.

IV. Histogram Data Path

Figure 8:
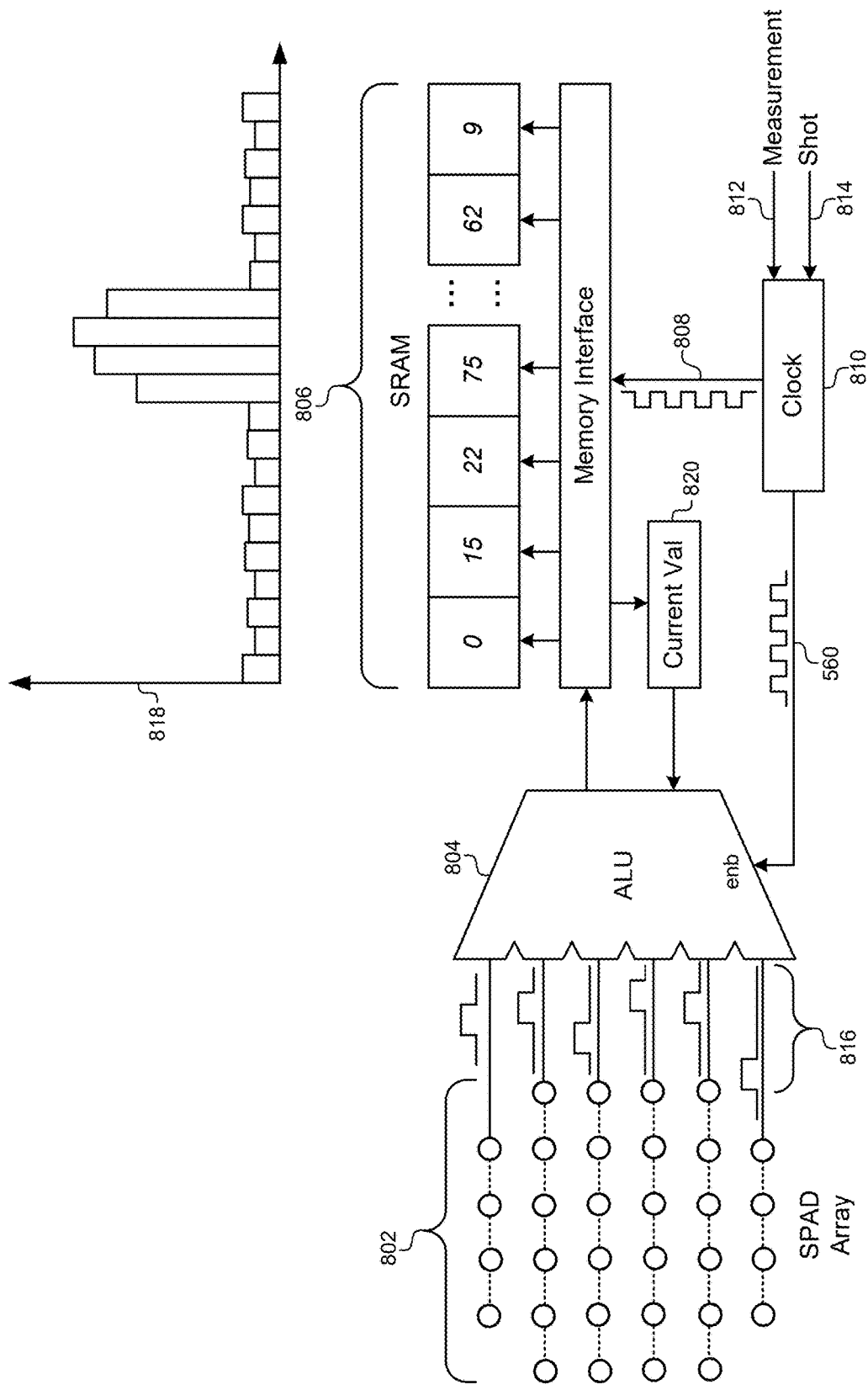
FIG. 8 shows a circuit for receiving photons and generating a set of signals that are stored in a memory representing histogram, according to some embodiments.

FIG. 8 shows a circuit for receiving photons and generating a set of signals that are stored in a memory representing histogram, according to some embodiments. As described above in relation to FIG. 5, an array of photosensors may be used to receive reflected pulses and background photons from ambient light in an optical measurement system. A single photosensor 802 may include a plurality of photodetectors. Each photodetector may be implemented by a SPAD or other light-sensitive sensor, and the photodetectors may be arranged in a grid pattern for the photosensor 802 as illustrated in FIG. 8. A filter may be used for each of the photosensors to block light outside of a range centered around the light source of the LIDAR system from being received by the photosensor. However, even with this filter, some ambient light at or near the emitted wavelength of the light source may pass through the filter. This may result in photons from ambient light as well as photons emitted from the LIDAR light source being be received by the photosensor.

Each photodetector in the photosensor 802 may include analog front-end circuitry for generating an output signal indicating when photons are received by the photodetectors. For example, referring back to FIG. 5, the avalanche current 534 from a SPAD may trigger the threshold circuitry 540 to generate the output binary signal 545. Turning back to FIG. 8, each photodetector in the photosensor 802 may generate its own signal corresponding to received photons. Thus, the photosensor 802 may generate a set of signals 816 corresponding to the number of photodetectors in the photosensor 802. The photosensor 802 may also be referred to as a "pixel" or a "pixel sensor," as it may correspond to a single pixel of information when displayed or analyzed in later stages of the optical measurement system. When signals are generated in response to received photons (e.g., transitioning from a logical "0" to a logical "1"), this may be referred to as a "positive" signal.

An arithmetic logic unit (ALU) 804 may be used to implement the functionality of the pixel counter 550 from FIG. 5. Specifically, the ALU 804 may receive the set of signals 816 from the individual photodetectors of the photosensor 802 and aggregate a number of these signals that each indicate the detection of a photon. The ALU 804 may include a combinational digital electronic circuit that performs arithmetic and/or other bitwise operations on the set of signals 816. For example, the ALU 804 may receive each of the set of signals 816 as a binary signal (i.e., a "0" or a "1") as an input or operand to the ALU 804. By aggregating or adding inputs together, the ALU 804 may count a number positive signals in the set of signals 816 that indicate that photons have been received within a particular time bin. For example, by adding each of the signals indicating a "1" signal level, the output of the ALU 804 may indicate the number of signals in the set of signals 816 that are associated with photodetectors that in turn received photons during the time bin.

The ALU 804 is designed specifically to receive at least a number of inputs that correspond to the number of photodetectors in the photosensor 802. In the example of FIG. 8, the ALU 804 may be configured to receive 32 parallel inputs that are a single bit wide. Internally, the ALU 804 may be implemented with digital logic gates to form a ripple-carry adder, a carry-lookahead adder, a carry-save adder, and/or any other type of adder that can aggregate a relatively large number of inputs with low propagation time. The output of the ALU 804 may be referred to as a "total signal count" and may be represented as an n-bit binary number output from the ALU 804 or from a stage of the ALU 804.

As described above, the output of the ALU 804 may characterize the total number of photons received by the photosensor 802 during a particular time bin. Each time the ALU 804 completes an aggregation operation, the total signal count can be added to a corresponding memory location in a memory 806 representing histogram 818. In some embodiments, the memory 806 may be implemented using an SRAM. Thus, over the course of multiple shots (with each shot including a pulse train) the total signal count from the ALU 804 can be aggregated with an existing value in a corresponding memory location in the memory 806. A single measurement may be comprised of a plurality of shots that populate the memory 806 to generate the histogram 818 of values in the time bins that can be used to detect reflected signals, background noise, peaks, and/or other signals of interest.

The ALU 804 may also perform a second aggregation operation that adds the total signal count to an existing value in a memory location of the memory 806. Recall from FIG. 7 that with each shot, a new total signal count may be added to an existing value in the corresponding time bin of the memory 806. In this manner, the histogram 818 can be gradually constructed in the memory 806 over a number of shots. When the total signal count is generated by the ALU 814, a current value 820 of a corresponding memory location for that time bin can be retrieved from the memory 806. The current value 820 can be provided as an operand to the ALU 804, which can be combined with the total signal count from the set of signals 816. In some embodiments, the ALU 804 can be composed of a first stage and a second stage, where the first stage calculates the total signal count from the photosensor 802, and the second stage combines the total signal count with the current value 820 from that time bin's memory location in the memory 806. In some embodiments, the aggregation of the set of signals 816 and the aggregation of total signal count and the current value 820 may be carried out as a single operation. Thus, even though these two operations may functionally be described as separate "aggregations," they may in fact be performed together using a combination of parallel and sequential circuitry in the ALU 804.

As described above in relation to FIG. 5, the ALU 804 may receive a periodic signal 560 that triggers the aggregation operation(s). The periodic signal 560 may be generated using any of the techniques described above. The periodic signal 560 may define the length of each time bin. In some embodiments, the periodic signal 560 and the corresponding time bins can be measured relative to a start signal as illustrated in FIG. 3. Each cycle of the periodic signal 560 can cause aggregation operations to execute in the ALU 804 and may cause the memory address of the memory 860 increment to the next time bin. For example, a rising edge of the periodic signal 560 may cause the ALU 804 to produce a result that aggregates the total signal count and the current value 820 together. A corresponding periodic signal 808 may also be sent to a memory interface circuit that increments an address to a memory location of a current time bin such that each cycle also moves to the next time bin in the memory 806.

A clock circuit 810 may be used to generate the periodic signal 560 based on inputs that define shots and measurements for the optical measurement system. For example, a shot input 814 may correspond to the start signal illustrated in FIG. 3. The shot input 814 may reset the address for the memory 806 to a beginning memory location corresponding with a first time bin of the histogram 818. The shot input 814 may also cause the clock circuit 810 to begin generating the periodic signal 560 for the ALU 804 and/or the periodic signal 808 that increments the address for the memory 806.

Additionally, the clock circuit 810 may receive a measurement input 812 that defines the beginning/end of a measurement. A measurement may be comprised of a plurality of shots that incrementally build the histogram 818. The measurement signal 812 may be used to reset the values in the memory 806 such that the histogram can start over for each new measurement.

The memory 806 may include a plurality of registers that accumulate photon counts from photodetectors. By accumulating photon counts in respective registers corresponding to time bins, the registers in the memory 806 can store photon counts based on arrival times of the photons. For example, photons arriving in a first time bin can be stored in a first register in the memory 806, photons arriving in a second time bin can be stored in a second register in the memory 806, and so forth. Each "shot" may include one traversal through each of the registers in the memory 806 corresponding to a time bin for that photosensor. The shot signal 814 may be referred to as an "enable" signal for the plurality of registers in the memory 806 in that the shot signal 814 enables the registers in the memory 806 to store results from the ALU 804 during the current shot.

The periodic signal 560 can be generated such that it is configured to capture the set of signals 816 as they are provided asynchronously from the photosensor 802. For example, the threshold circuitry 540 may be configured to hold the output signal high for a predetermined time interval. The periodic signal 560 may be timed such that it has a period that is less than or equal to the hold time for the threshold circuitry 540. Alternatively, the period of the periodic signal 560 may be a percentage of the hold time for the threshold circuitry 540, such as 90%, 80%, 75%, 70%, 50%, 110%, 120%, 125%, 150%, 200%, and so forth. Some embodiments may use rising-edge detection circuitry as illustrated in FIG. 5 to convert the asynchronous signals from the photodetectors into single clock strobes that use the same clock that runs the ALU 804. This may guarantee that photons are not counted more than once. Other embodiments may alternatively oversample the asynchronous pulses from the photodetectors or use brute-force rising-edge detection.

Figure 9:
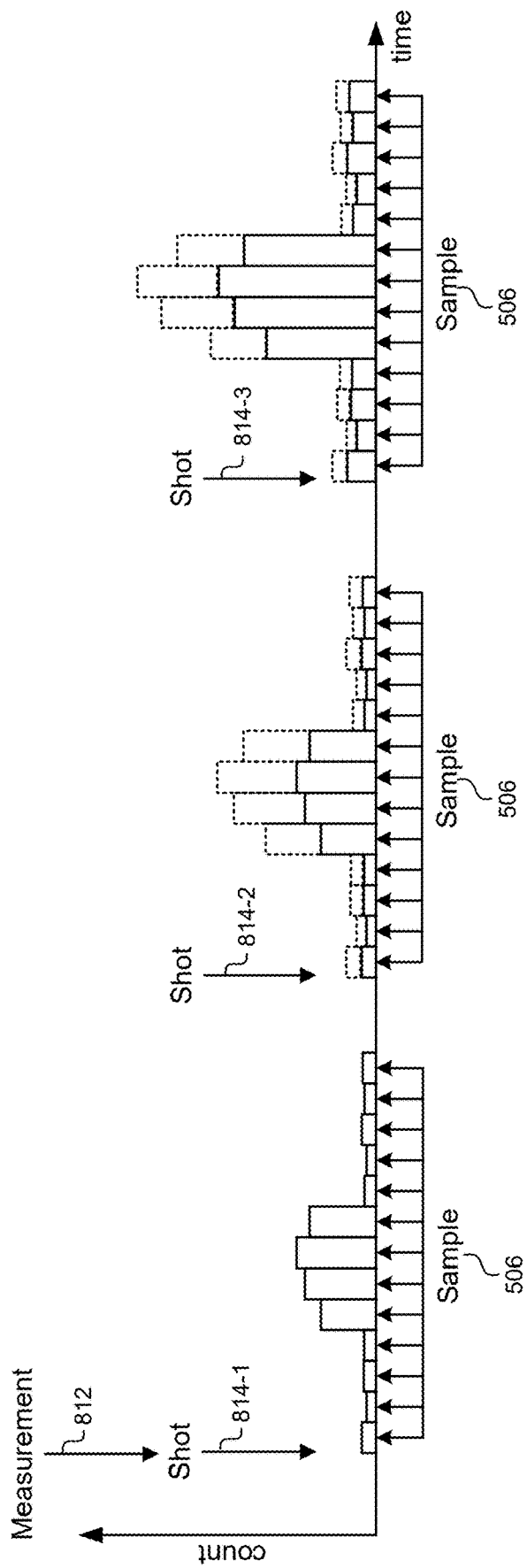
FIG. 9 shows the timing associated with different shots in a measurement, according to some embodiments.

FIG. 9 shows the timing associated with different shots in a measurement, according to some embodiments. The vertical axis represents the total number of photodetector signals measured for a single photosensor. For example, the vertical axis may represent a total photon count. The horizontal axis represents time. When a new optical measurement is started as indicated by the measurement signal 812, a first shot can begin with the receipt of the shot signal 814-1 as a start signal. The periodic signal 506 illustrates how each clocking of the ALU 804 corresponds to a single time bin and corresponding memory location in the memory 806.

With each subsequent shot, the histogram can be constructed in the memory 806 as illustrated in FIG. 9. Each time a shot input 814 is received, the addressing of the memory 806 can be reset such that new total signal count can be added to the existing signal counts. In the example of FIG. 9, there is a non-zero time interval of separation between each shot. For example, the shot started by the shot signal 814-1 ends, and a non-zero time interval elapses before the shot defined by the shot signal 814-2 begins. Alternatively, some embodiments may not have a delay between subsequent shots such that the periodic signal 506 clocks continuously throughout the measurement. Subsequent shot signals 814-2, 814-3 may then define both the end of a previous shot and the beginning of a subsequent shot.

In some embodiments, the timing of the measurement signal 812, the shot signal 814, and the periodic signal 506 that clocks the ALU 804 may all be coordinated and generated relative to each other. Thus, the clocking of the ALU may be triggered by, and dependent on, the start signal for each shot. Additionally the period of the periodic signal 506 may define the length of each time bin associated with each memory location in the histogram.

The data path illustrated in FIG. 8 is primarily configured to build the histogram 818 over a number of shots. However, the histogram may only populated during shots in some embodiments. Any photons received between shots would not be aggregated by the ALU 804 in a time bin and would not be stored in the memory 806. Additionally, after each measurement is complete and before a subsequent measurement begins, the contents of the memory 806 may be reset. Therefore, photons received before and/or after a current measurement may not be saved or readily available. Furthermore, no total count of all photons received in the histogram is readily available in the histogram data path, and no total count of all photons received during a measurement cycle is available if there are non-zero intervals between shots when the histogram is disabled. To record received photons in a continuous manner that is not reliant on the shot/measurement timing, a second parallel data path may be used in addition to the histogram data path illustrated in FIG. 8.

V. Identifying Early Reflections from the System Housing

The examples above have illustrated single pulses or multiple pulses as part of a pulse train that are transmitted from a light source, reflected off of objects in the surrounding environment, and then detected by a photosensor. These reflections are recorded in a histogram memory and form "peaks" in the histogram after a number of repeated shots in a measurement. The locations of these peaks can then be used to determine a distance between the optical measurement system and objects in the surrounding environment. However, these examples are not meant to be limiting. In addition to the intended peaks caused by the pulse train reflecting off objects of interest in the surrounding environment, the histogram memory may also include other peaks resulting from more immediate, unintended reflections of the pulse train, as well as peaks that do not necessarily result from the pulse train at all. For example, additional peaks may correspond to external light sources, sunlight, reflections, or other ambient light phenomena in the surrounding environment. In these cases, instead of only detecting a single peak, the optical measurement system may detect multiple peaks that may consequently be present in the histogram memory. In addition to extraneous peaks resulting from external light sources, an initial peak may result from a reflection of the pulse train off of an internal housing of the optical measurement system.

Figure 10:
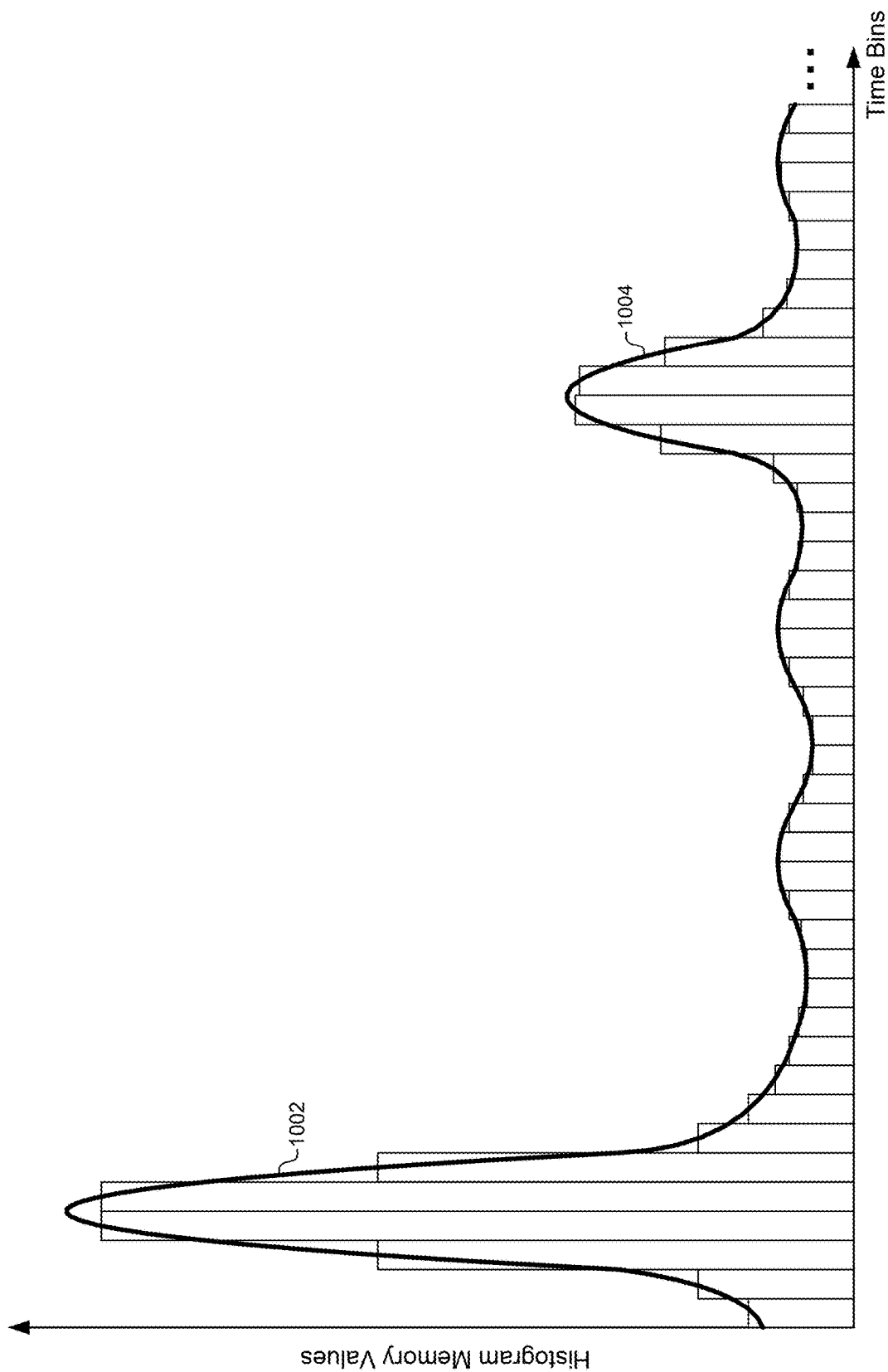
FIG. 10 illustrates a representation of the histogram memory that includes a peak resulting from reflections off of the housing of the optical measurement system.

FIG. 10 illustrates a representation of the histogram memory that includes a peak 1002 resulting from reflections off of the housing of the optical measurement system. When the light source generates one or more pulses for the emitted pulse train, these pulses may pass through a window or other transmissive material in the housing of the optical measurement system. However, some of the light emitted by the light source may reflect off of the window of the housing back towards the photosensors instead of passing entirely through the window. Additionally, some of the light emitted by the light source may reflect off of an internal surface of the housing itself. For example, some incidental light may be reflected off portions of the housing around the transmissive window or off other internal materials of the optical measurement system. Portions of the light reflected off the housing of the optical measurement system may be received by the photosensors, and stored in the histogram memory just as reflected pulses would be detected and stored from objects of interest in the surrounding environment.

In FIG. 10, the peak 1002 resulting from the early reflection of the emitted pulse trains off of the optical measurement system housing may be stored in an initial set of registers in the histogram memory. Because the reflections occurs shortly after the pulse train is emitted from the light source of the optical measurement system, the photon count from these early reflections may be stored in the first registers in the histogram memory for the measurement. For example, FIG. 10 illustrates the peak 1002 corresponding to the early reflections from the system housing being stored within the first nine registers of the histogram memory. However, this example is not meant to be limiting. The number and location of the time bins representing the reflections from the system housing may depend on the strength of the light pulse, the distance between the housing and the light source, the distance between the housing and the photodetector, and/or other characteristics of the physical design of the optical measurement system. Methods for determining the location of the peak 1002 resulting from reflections from the system housing are discussed in greater detail below.

As photon counts are received for the rest of the optical measurement, additional peaks may also be detected that result from photon reflections off of objects of interest in the surrounding environment. For example, peak 1004 in FIG. 10 may be received later in the measurement after being reflected off of an external object within range of the optical measurement system. Typically, these objects of interest in the surrounding environment will be far enough away from the optical measurement system that the resulting peak 1004 may be easily distinguished from peak 1002 reflected off the system housing. Some embodiments may ignore or remove the peak 1002 from the histogram memory and/or from any calculations performed on the histogram memory to calculate distances to the external object corresponding to peak 1004. For example, some embodiments may mask off an initial set of histogram registers that are likely to include a large peak 1002 from the housing reflection. Some embodiments may insert a delay between when the pulse train is emitted by the light source and when the photosensor begins accumulating photon counts into the histogram memory to avoid recording the peak 1002 from the housing reflection. Because peak 1002 occurs so early in the measurement compared to when peak 1004 is received, peak 1002 may often be disregarded when performing distance calculations using peak 1004.

However, some embodiments may receive and store the peak 1002 resulting from housing reflections in the histogram memory, and then proceed to use the peak to improve near-range performance of the optical measurement systems. These improvements may include calibrating the optical measurement system, characterizing the opacity of the window of the optical measurement system, detecting blockages of the optical measurement system, improving near-range performance of the optical measurement system, and so forth. Each of these various improvements that may be realized by first identifying the peak 1002 resulting from housing reflections are described in greater detail below.

Figure 11:
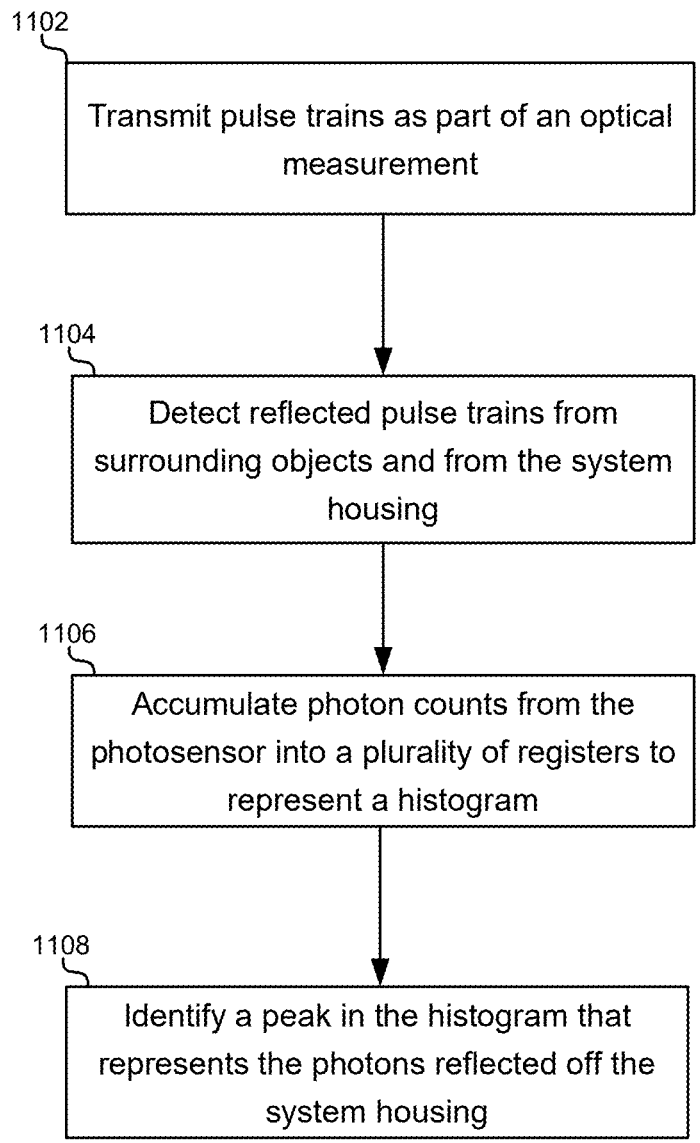
FIG. 11 illustrates a flowchart of a method for using an optical measurement system to detect a peak resulting from early reflections off a system housing.

FIG. 11 illustrates a flowchart of a method for using an optical measurement system to detect a peak resulting from early reflections off a system housing. This method may be used to transmit/receive pulses and identify specific locations in the histogram memory that correspond to the peak from the housing reflections. The following sections in this disclosure describe different ways in which the identified peak may be used to improve the performance of the optical measurement system. The method below describes a process for a single photosensor in the optical measurement system. However, as described above, the optical measurement system may include many photosensors, and this method may be carried out for each photosensor in the optical measurement system At step 1102, the method may include transmitting one or more pulse trains from a light source over one or more first time intervals as a part of an optical measurement. Each of the one or more first time intervals may represent a "shot" that is repeated multiple times in the measurement. Each of the first time intervals may include one or more pulse trains that are encoded and transmitted by the light sources such that the pulse trains can be recognized as they are reflected off of objects in the surrounding environment. Each of the time intervals may be subdivided into a plurality of time bins such that each of the time bins represents a bin in a histogram of received photon counts during the optical measurement. An example of how a single measurement may include multiple shots subdivided into time bins that aggregate photon counts is described above in relation to FIG. 9.

At step 1104, the method may also include detecting photons from the one or more pulse trains using a photosensor. As described in detail above, the photosensor may include a plurality of photodetectors, such as a plurality of SPADs. The photosensor may receive reflected light as well as ambient background noise received from the surrounding environment. The reflected light received by the photosensor may include light reflected off of objects of interest in the surrounding environment. For example, these objects of interest may be at least 30 cm away from the photosensor, and may represent surrounding vehicles, buildings, pedestrians, and/or any other object that may be encountered around the optical measurement system during use. These objects of interest may be distinguished from objects that are part of the optical measurement system itself, such as a housing. Reflected light received by the photosensor may also include light reflected off of the housing or other parts of the optical measurement system. These reflections may include primary reflections directly off the window or housing of the optical measurement system, as well as secondary reflections that are reflected around an interior of the optical measurement system. The photosensor may also be coupled to threshold detection circuitry and/or to arithmetic logic circuitry that accumulates photon counts. This combination may be referred to above as a "pixel." FIG. 5 illustrates an example of how photon counts may be received from photosensors and counted using threshold circuitry and pixel counters (e.g., arithmetic logic circuits).

At step 1106, the method may also include accumulating photon counts from the photosensor into a plurality of registers to represent a histogram of photon counts received during the current measurement. These photon counts may be accumulated in a plurality of registers in a memory block corresponding to the photosensor. The plurality of registers may be implemented using the registers in an SRAM of a histogram data path as described above in FIGS. 8-9. Each of the time intervals may be subdivided into a plurality of first time bins for the histogram. Corresponding time bins in each of the one or more time intervals may be accumulated in single registers in the plurality of registers. Each of the time intervals may represent a shot, and together the one or more time intervals may represent a measurement for the optical measurement system. Each of the time intervals may be defined by a start signal or shot signal that resets the memory representing the histogram back to the first register in the histogram. The received photons that are reflected from the housing of the optical measurement system may be stored in the histogram memory in the same manner as the other received photons reflected off of surrounding objects outside of the optical measurement system.

At step 1108, the method may additionally include identifying a peak in the histogram that represents the photons reflected off of the system housing. Detecting this peak may be performed using a number of different techniques, depending on the particular embodiment. In some embodiments, a pass may be made through the histogram memory to identify a first peak occurring in time. The system may sequentially access registers in the plurality of registers, starting at the beginning of the optical measurement to identify a peak that occurs first in time. A center of a peak may be identified by identifying values in the histogram with smaller values in time bins on either side. In the example of FIG. 10, the registers representing the fourth and fifth time bins may be identified as a peak because the time bin values in registers on either side of the fourth and fifth registers has significantly smaller values stored therein. In some embodiments, the initial peak may be identified by identifying registers in the plurality of registers during the highest number of photon counts. These embodiments may assume that the initial peak may have a higher intensity than other peaks. Some embodiments may also identify the initial peak by identifying registers in the plurality of registers that correspond to a distance between the light source and the housing of the optical measurement system. For example, when this distance is known, the distance per time being may be used to identify registers that may receive a peak reflected from the housing. Some embodiments may identify an initial peak by identifying a predetermined number of registers in the plurality of registers that occur first. For example, based on initial calibrations and known distances between the photosensor and the housing, some embodiments may identify the first 15 time bins as storing the initial peak.

Identifying the peak in the histogram may involve locating window of time bins that occurs around the center of the peak. This process may involve expanding outwards from the peak location to determine a range of registers in the histogram memory that include the entire peak. As illustrated in FIG. 10, the photons resulting from reflections off the system housing may be received over a plurality of time bins rather than being isolated to a single time bin. Therefore, some embodiments may identify surrounding time bins that should also be designated as representing the reflected peak from the system housing. For example, some embodiments may identify a predetermined number of time bins around the maximum value that may be designated as a peak. For example, a predetermined number of time bins, such as 3 time bins, 5 time bins, 9 time bins, 15 time bins, 17 time bins, and so forth, maybe identified and centered around the maximum value to represent the whole peak. Some embodiments may identify surrounding time bins with values within a percentage of the maximum value in the peak register. This may result in a variable number of time bins that may be used to represent a peak depending on the width of the peak. For example, time bins surrounding the maximum value may be included in the peak when their values are within 25% of the maximum value.

Instead of detecting a variable peak location for each measurement, some embodiments may assume a known location of the optical measurement housing and designate a specific window of registers that are likely to include values from early reflections off the system housing. In the example of FIG. 10, the system may designate the registers corresponding to the second time bin through the sixth time bin as registers storing the peak for the reflections off the system housing. A physical measurement may be made to determine the distance between the light source and the housing and the distance between the housing and the photosensor. This distance may then be used in conjunction with the speed of light to determine where in the histogram memory the reflections from the system housing are likely to occur.

It should be appreciated that the specific steps illustrated in FIG. 11 provide particular methods of identifying a peak representing reflections off the system housing, according to various embodiments. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

VI. Using the Housing Reflections to Improve Measurements

After identifying the location of a pulse representing reflections off the system housing, the location and/or peak values of that reflection may be used to improve the optical measurement system or characterize the optical measurement system in a number of different ways. This may include calibrating a known distance for us in additional distance measurements by the optical measurement system, characterizing the transparency of the window on the optical measurement system, detecting blockages or other obstacles that impede the field-of-view of the optical measurement system, and/or other similar improvements.

A. Calibrations Using the Housing Reflection

Figure 12A:
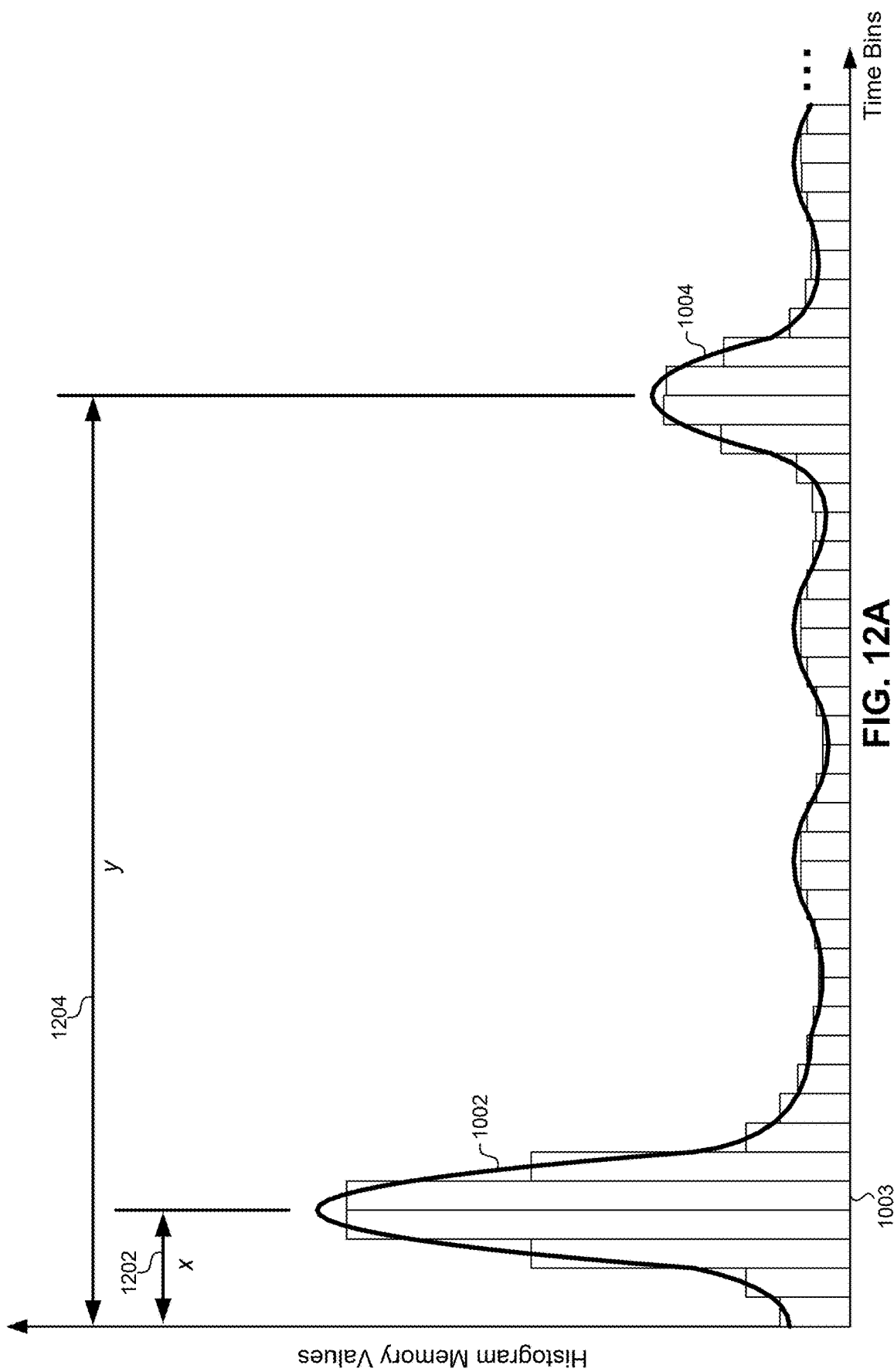
FIG. 12 illustrates the contents of a histogram memory that may be used to calibrate distance measurements for the optical measurement system, according to some embodiments.
Figure 12B:
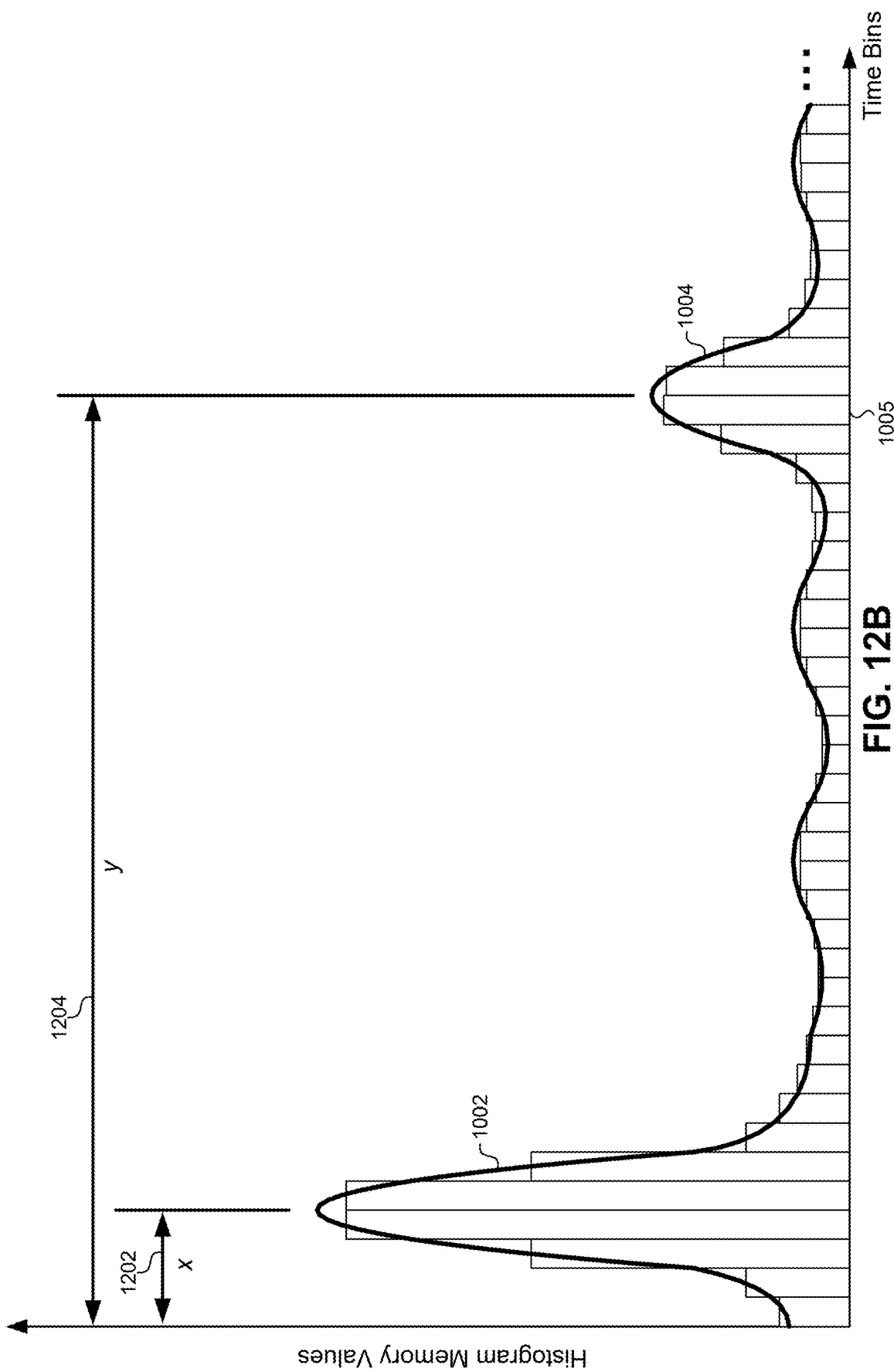

FIG. 12A illustrates the contents of a histogram memory that may be used to calibrate distance measurements for the optical measurement system, according to some embodiments. FIG. 12B illustrates the contents of a histogram memory with a calibrated time window, according to some embodiments. As described above, the histogram may include a peak 1002 that corresponds to a reflection off the housing of the optical measurement system. The histogram may also include a peak 1004 resulting from photon reflections off of an object of interest in the surrounding environment. Typically, a center location of peak 1004 may be identified and used to calculate a distance between the optical measurement system and the object from which peak 1004 was reflected. This distance calculation may use the speed of light along with a known time interval for each of the time bins represented by the histogram registers. For example, for a system operating at 500 MHZ, the resulting time bins (e.g., the time bin 1003) may represent approximately 2 ns of received photon counts. The distance for peak 1004 may be calculated using the number of time bins (e.g., 32) multiplied by the time for each time bin (e.g., 2 ns) multiplied by the speed of light.

However, distance calculations may be inaccurate if any of the values assumed above are not precise or vary between different optical measurement systems. For example, the actual time represented by each time interval may not be exactly as predicted based on an assumed clock cycle. Therefore, it may be useful for some systems to perform a self-calibration process that can be used to accurately determine different constants used by the distance calculations.

Some embodiments may use the location of the peak 1002 representing the housing reflections to calibrate values for the other distance calculations of the optical measurement system. The distance between the light source and the housing of the optical measurement system may be precisely known based on a manufacturing process of the optical measurement system. Similarly, the distance between the housing of the system and the photosensor may also be precisely known. These distances may be used in conjunction with peak 1002 to determine the precise values of constants used in the distance calculations, such as the time represented by each time bin and/or any offsets in the system. These constants may be part of a transformation function that receives a time of a peak and provides an accurate distance measurement. Such a transformation may be constant (e.g., uniform delay), a linear transformation (e.g., later time bins offset more/less than earlier time bins by an amount proportional to the time bin number), or a non-linear transformation.

In the example of FIG. 12, the location of peak 1002 may be determined using any of the techniques described above. The location of peak 1002 may be used to determine a number of time bins 1202 between the beginning of the measurement and the center of the peak from the housing. The known distances between the light source, housing, and photosensor described above may be divided by the speed of light to determine a total time between when the light was emitted from the light source and when peak 1002 occurred in the histogram memory. This value may then be divided by the number of time bins 1202 in order to calculate the precise amount of time represented by each time bin. Note that this procedure assumes that the histogram memory begins accumulating photon counts in registers when the light is emitted from the light source. If this is not the case, then any delay between the emission of the light from the light source and the beginning of the accumulation cycle by the histogram memory can be subtracted from the time estimation.

The precise values of constants, such as the time represented by each time bin, may then be used to calculate distances for other peaks in the measurement. In the example of FIG. 12B, the distance between the optical measurement system and the object represented by peak 1004 may be calculated as described above, but instead of using time values assumed from a clock cycle (such as the time bin 1003), the system may instead calculate the distance to the object using the calibrated values (e.g., the time bin) 1005 calculated using peak 1002. For example, a distance (D) between the light source, the housing, and the photosensor may be precisely known (as discussed above). The number of time bins ($B_n$) may similarly be known (e.g., including the time bin 1003). The calibrated value or bin width ($B_w$) for the time bins (e.g., the time bin 1005) may therefore be calculated as $B_w = D/(B_n \cdot C)$.

Using the calibrated values from the peak reflected from the housing of the optical measurement system can thus be used to generate more accurate distance measurements.

These techniques may overcome problems resulting from process variations and sensor drift over time. These techniques may also be used to detect movement of the system housing relative to the light source and/or photosensors. For example, if the location of peak 1002 changes over the lifecycle of the optical measurement system, this may indicate movement of the housing relative to the rest of the system.

B. Characterizing Window Transparency

In addition to calibrating values to be used in distance calculations, identifying the location of a reflection off the system housing may also be used to characterize various aspects of the optical measurement system during operation. Generally, the peak reflected off the housing of the system may be larger than peaks received from objects of interest in the surrounding environment. The size of this initial peak may be due to the proximity of the housing relative to the photosensors. Because the photosensors are so close to the reflection, the intensity of the reflected light may be relatively large. However, assuming that the size of the reflected peak is within the saturation limit of the histogram memory, certain measurements may be made based on the magnitude of the peak reflected off the housing to characterize portions of the housing itself.

Figure 13B:
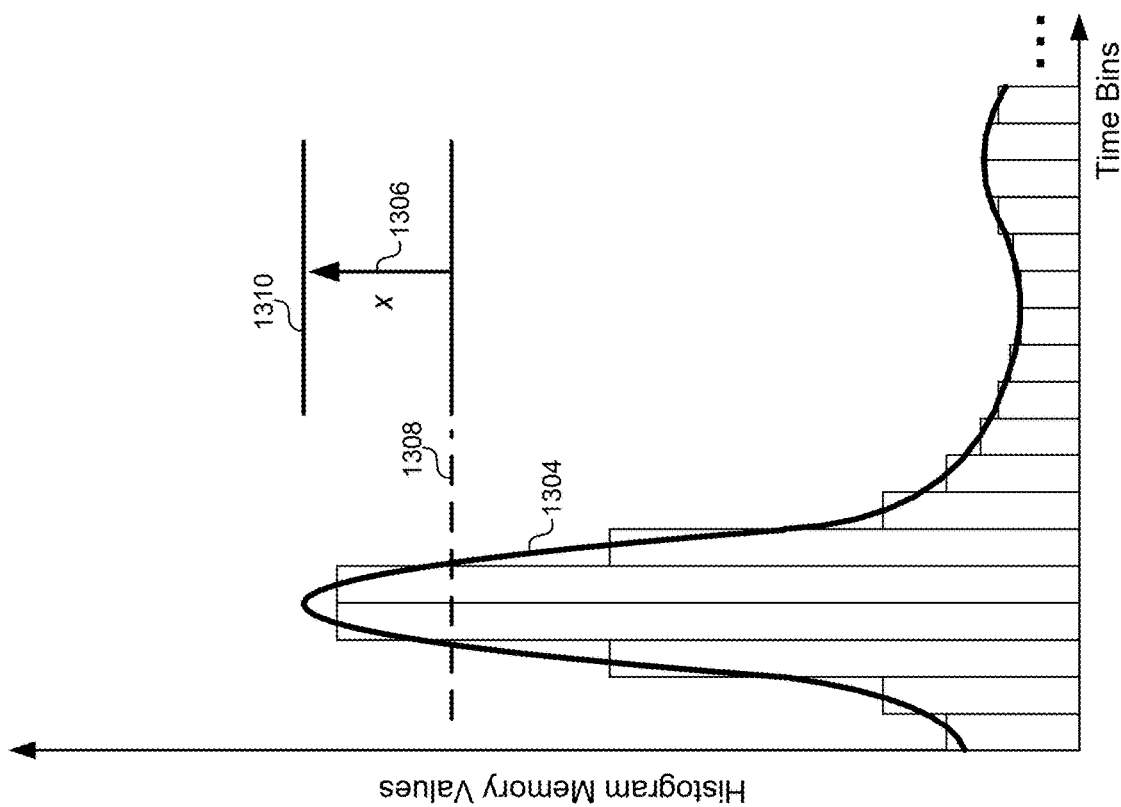
FIG. 13B illustrates a change in the magnitude of a peak reflected off the housing, according to some embodiments.
Figure 13A:
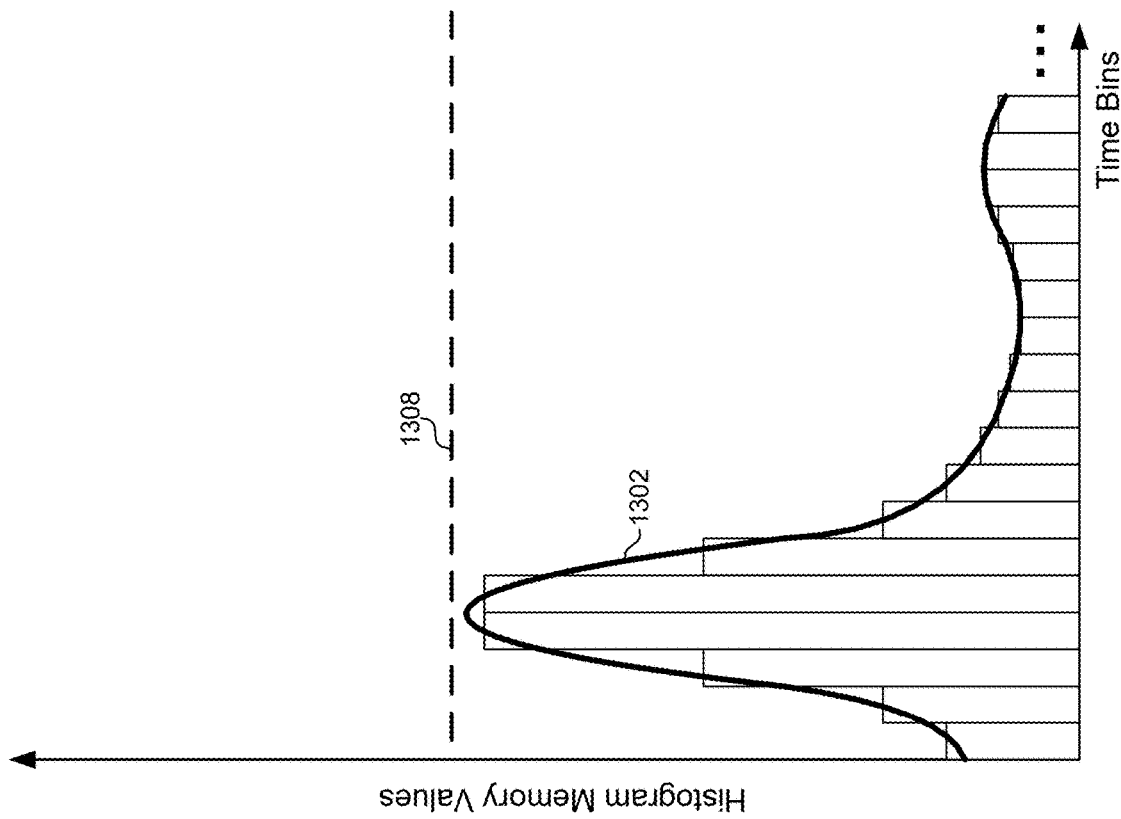
FIG. 13A illustrates a portion of the histogram memory that receives an initial peak corresponding to reflections off the system housing, according to some embodiments.

FIG. 13A illustrates a portion of the histogram memory that receives an initial peak 1302 corresponding to reflections off the system housing, according to some embodiments. Peak 1302 may have an initial magnitude 1308. This magnitude may characterize a transparency of a window on the housing of the optical measurement system. As described above, the housing may include a window through which light may be transmitted from the light sources, and through which reflected light may be received by the photosensors. Assuming that the transparency of the rest of the housing is substantially opaque, the magnitude 1308 of peak 1302 may be used to characterize the transparency of the window itself. For example, a baseline transparency may be characterized during an initial portion of the lifecycle of the optical measurement system by recording the average magnitude 1308 of the housing reflections. This value may be stored over time and used to detect changes in the transparency of the window.

Many practical applications of the optical measurement system may include uses in an open environment where the optical measurement system may be exposed to pollution, rain, snow, and/or other environmental elements that may damage, obscure, and/or otherwise affect the transparency of the window on the housing of the optical measurement system. For example, when the optical measurement system is installed in an automotive application, the system may be located on the top of a vehicle. The system may also be located on areas around the periphery of the vehicle, such as on the bumpers or sides of the vehicle. In these locations, the optical measurement system may be subjected to weather elements, rocks and debris, exhaust or fog, and/or other effects that may affect the transparency of the window. For example, rocks from the road may hit the optical measurement system, scratching or otherwise damaging the window. Humid environments may cause moisture to temporarily build up on the window. Rain or snow may accumulate on the outside of the window. Dirt, pollution, or grime from the roadway may build up on the exterior of the window. Many other adverse conditions in an automobile environment may also affect the window of the optical measurement system.

Each of these different environmental effects may cause the transparency of the window to change. For example, as dirt or scratches build up on the window, less light may be transmitted through the window. Consequently, more light may be reflected off of the window back to photosensors. Therefore, considering the window to be part of the housing of the optical measurement system, the techniques described above for monitoring the magnitude of the peak reflected off the housing of the optical measurement system over time may also be used to track differences in the transparency of the window over time. It may be assumed that the transparency of the rest of the housing remains constant (e.g., the housing is completely opaque). Therefore, any changes to the magnitude of the peak reflected off the housing may be attributed to changes in the transparency of the window itself.

FIG. 13B illustrates a change in the magnitude of a peak 1304 reflected off the housing, according to some embodiments. Peak 1304 may be recorded from the same optical measurement system that recorded peak 1302 in FIG. 13A, but peak 1304 may be recorded later in the lifecycle of the optical measurement system. For example, peak 1304 may be recorded after months of use in an automotive application. When comparing a magnitude 1310 of peak 1304 with a magnitude 1308 of peak 1302, FIG. 13B illustrates how the magnitude of peak 1304 has increased over time. The increase may be attributed to a change in the transmissive properties of the window on the housing of the optical measurement system.

As described above, the magnitude 1308 of the initial peak 1302 may be recorded as a baseline measurement when the window of the housing is clean. This initial value may be stored over time and used as a baseline for comparisons with future peak magnitudes to track the transparency of the window over time. For example, some embodiments may track a difference 1306 between the initial magnitude 1308 and the current magnitude 1310 of the peaks 1302, 1304 over time. As the difference 1306 increases, various outputs may be provided by the optical measurement system. For example, some embodiments may provide an output that triggers a warning or message to a user or to an automobile system indicating that the window is dirty ("please clean the window on your LIDAR system"). Some embodiments may automatically trigger systems on the vehicle to clean the optical measurement system, such as systems that spray cleaner on the optical measurement system.

Figure 14:
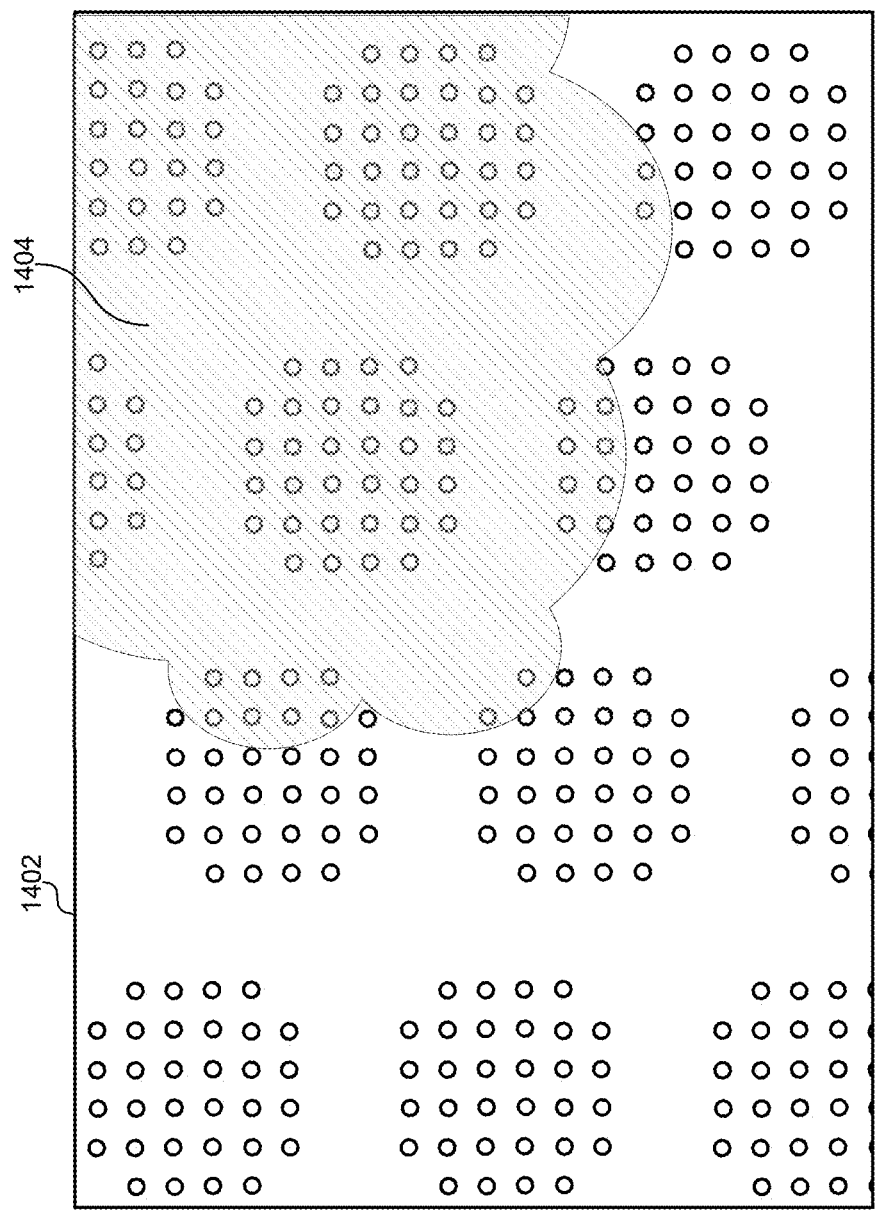
FIG. 14 illustrates a portion of an array of photosensors that may be partially obscured by contamination of the window, according to some embodiments.

FIG. 14 illustrates a portion of an array of photosensors 1402 that may be partially obscured by contamination of the window, according to some embodiments. As described above, these methods for detecting a reflected pulse from the housing of the optical measurement system may be performed for each photosensor in the array of photosensors 1402. Therefore, each individual photosensor may generate a baseline magnitude for the reflected peak, as well as a current magnitude of the reflected peak. Each individual photosensor may then report a percentage or degree to which the corresponding portion of the window is obscured. The transparency of each photosensor may be characterized relative to one of the photosensor, or relative to a baseline level of transparency. In this example, a portion 1404 of the window may be covered with a contaminant, such as mud. The individual photosensors that transmit/receive light through the portion 1404 of the window may report an increase in the magnitude of the reflected pulse, while photosensors that are outside of the portion 1404 of the window may continue to report a steady magnitude of the reflected pulse. This may be used to generate a mapping or characterization of the window. For example, the image of FIG. 14 may be generated and provided to a user interface illustrating a current state of the window. Messages may be generated that characterize the window as dirty, partially obscured, or blocked entirely.

In some embodiments, the optical measurement system may shut down photosensors that are behind the portion 1404 of the window that is dirty or blocked, or for rotating systems, shut down at times the photosensors are behind portion 1404. Because of the intensity of the reflected pulse, the histogram data paths of these photosensors may saturate such that the magnitude of the pulses reflected off the window have a magnitude that is higher than a bit-limit of the histogram data path. Reflections off this portion 1404 the window may also be scattered by the blockage and interfere with the photons received by other nearby photosensors. Because the measurements may be skewed by saturation, scattering, or other effects, the system may take corrective measures, such as causing these photosensors to no longer accumulate a photon count.

C. Detecting Window Blockage

In addition to detecting dirty or partially obscured windows, the first detected peak may also be used to determine whether the optical measurement system is blocked by a foreign object. As described above, many operating environments, such as an automotive environment, may provide situations where the optical measurement system may be subject to adverse conditions. Some of these environments may cause the optical measurement system to become completely blocked from the surrounding environment. For example, a plastic bag may blow onto the optical measurement system. A person may place their hand in front of the optical measurement system. The optical measurement system may be purposely disabled with tape or other objects placed in front of the optical measurement system. In any of these environments, it may be useful to detect when such a blockage occurs and where such blockage may be located.

Figure 15B:
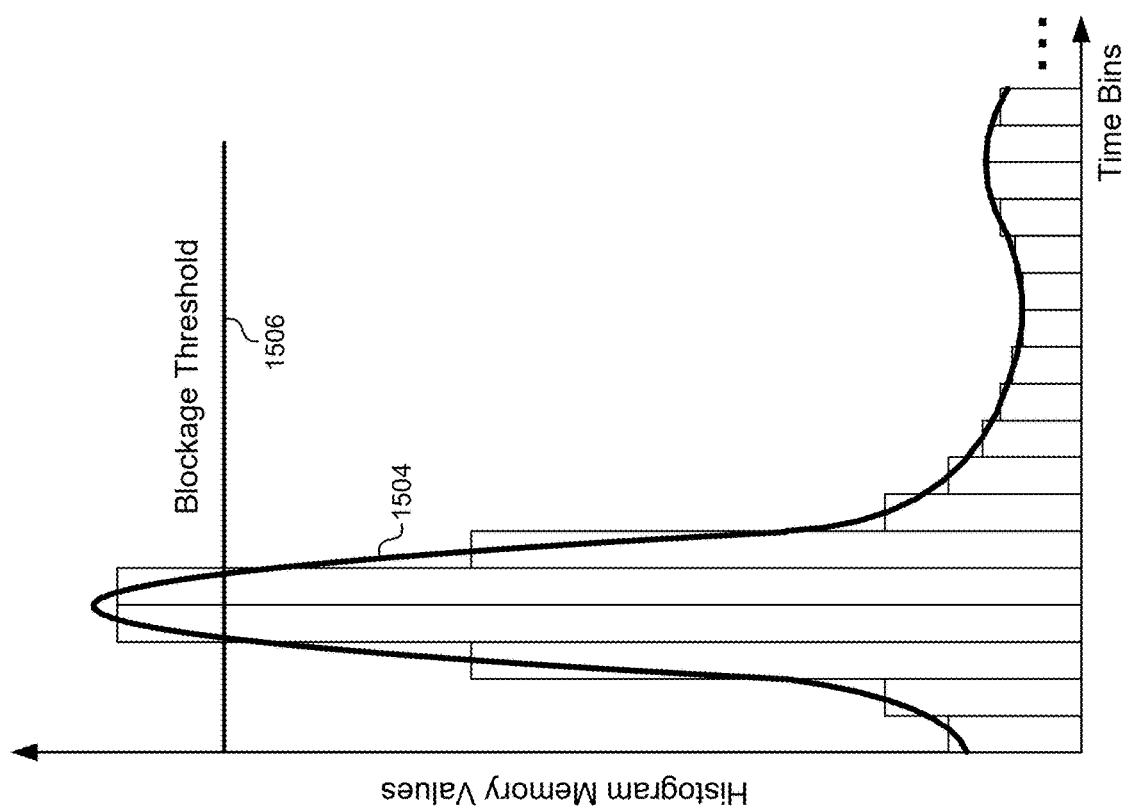
FIG. 15B illustrates an initial peak later in the lifecycle of the optical measurement system when a blockage is present, according to some embodiments.
Figure 15A:
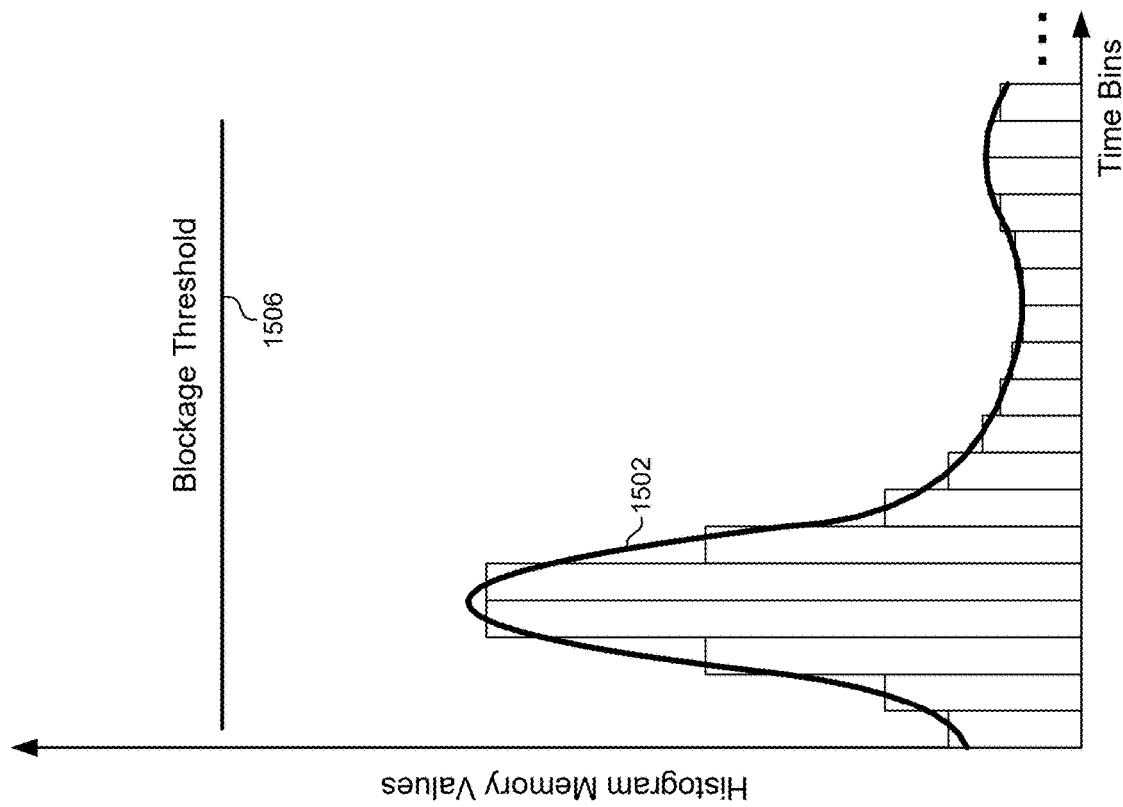
FIG. 15A illustrates an initial peak detected by the optical measurement system relative to a blockage threshold, according to some embodiments.

FIG. 15A illustrates an initial peak 1502 detected by the optical measurement system relative to a blockage threshold 1506, according to some embodiments. The initial peak 1502 may be the result of reflections off of a housing of the optical measurement system as described above. Based on this baseline measurement of the magnitude of the peak 1502, a blockage threshold 1506 may be established that is higher than the magnitude of the peak 1502. The blockage threshold 1506 may represent a magnitude for the peak 1502 that may indicate a blockage in front of the optical measurement system. The blockage threshold 1506 may be set to be a predetermined distance and/or percentage above the magnitude of the initial peak 1502, such that it is only crossed when an object is in front of the optical measurement system.

FIG. 15B illustrates an initial peak 1504 later in the lifecycle of the optical measurement system when a blockage is present, according to some embodiments. When an object is placed in front of the optical measurement system, a large portion of the pulse may be reflected immediately off of the blocking object. In cases where the blocking object is very close to the optical measurement system, the resulting peak resulting from reflections off the blocking object may be merged with other reflections off the housing of the optical measurement system as described above. In this example, the blocking object is close enough to the optical measurement system that the reflections from the housing and reflections from the blocking object are received together, resulting in a peak 1504 that is substantially higher than the peak 1502 resulting only from reflections off the housing.

When a blocking object is sufficiently close to the optical measurement system such that it prevents a substantial portion of the light emitted by the optical measurement system from being reflected off of other objects in the surrounding environment, the system may determine that a blockage has occurred. This determination may be made when the magnitude of the initial peak 1504 meets or exceeds the blockage threshold 1506. As illustrated in FIG. 15B the reflections off the housing and the blocking object may combine to increase the magnitude of the peak 1504 above the threshold 1506. When this occurs, any of the remedial actions described above may be triggered. For example some embodiments may cause a warning to be generated for a user and/or an automotive system. Some embodiments may shut down any photosensors in the array that detect the blockage. Some embodiments may activate other emergency or safety systems indicating that the optical measurement system is no longer providing an accurate depiction of objects in the surrounding environment, and so forth.

VII. Compensating for Housing Reflections

The uses for a peak generated by reflections off the housing of the optical measurement system described above generally improve the performance of the optical measurement system by calibrating the system and compensating for external effects. Some embodiments may alternatively or additionally improve the performance of the optical measurement system by removing the peaks caused by the housing reflections from the histogram memory signals that are analyzed by a peak detection circuit or by an auxiliary processor. These embodiments may remove the initial peak from the housing reflections to improve the near-range accuracy of the optical measurement system.

A. Near-Range Detection

FIG. 16A illustrates a histogram memory with an initial peak 1602 resulting from housing reflections and a second peak 1604 resulting from reflections from an object in the surrounding environment, according to some embodiments. As described above, when the second peak 1604 is sufficiently removed from the initial peak 1602, the distance calculations for the second peak 1604 need not be affected by the presence of the initial peak 1602. For example, when an object is 10 feet away from the optical measurement system, the peak resulting from photons reflected off the object may occur far enough away from the initial peak 1602 in the histogram memory that the shape of the second peak is 1604 is not affected. Generally, the mid-range and far-range accuracy of the optical measurement system need not be affected by the presence of the initial peak 1602 from housing reflections.

However, as the object moves closer to the optical measurement system, the residual effect of the initial peak 1602 may begin to affect the shape of the second peak 1604. For example, as photons begin to be received from reflections off the object, photons scattered off the internal housing of the optical measurement system may still be received by the photosensor. Because additional photon counts from reflected photons may continue to be stored in registers representing the time bins for the second peak 1604, the shape of the second peak 1604 may be skewed. When the shape changes, the peak detection circuitry may identify an inaccurate location of the peak. For example, if the beginning portion of the second peak 1604 is increased due to photons reflected off the housing, the center of the second peak 1604 may shift to the left as detected by the peak detection circuitry.

FIG. 16B illustrates the problems with near-range peak detection without compensating for reflections off the housing, according to some embodiments. In this example, the object in the surrounding environment has moved close enough to the optical measurement system that the second peak 1604 resulting from reflections off the object has begun to merge with the initial peak 1604 resulting from reflections off the housing. As illustrated in FIG. 16B, this has the effect of changing the magnitude and/or shape of the initial peak 1602 and altering or even hiding the presence of the second peak 1604. Because the magnitude of the second peak 1604 will generally be substantially smaller than the magnitude of the initial peak 1602, the shape and/or location of the second peak 1604 may be substantially subsumed by the initial peak 1602 to the point that it may no longer be correctly recognized as a peak by the optical measurement system.

The overall effect of this combination of the initial peak 1602 and the second peak 1604 is to greatly reduce the near-range accuracy of the optical measurement system. Reflections off of objects a few feet from the optical measurement system may be affected by these housing reflections to the point that a "dead zone" may be created in the immediate vicinity of the optical measurement system.

B. Removing the Housing Reflections

In order to compensate for the effect of the reflections off the housing, the optical measurement system may use the baseline measurements for the initial peak as described above. Specifically, the optical measurement system may record a baseline shape and/or location of the initial peak as observed during measurements over time. In addition to using changes to the initial peak to characterize the window of the optical measurement system, the shape and/or location of the baseline measurement of the initial peak may be used to compensate for the reflections off the housing for near-range measurements.

Figure 17A:
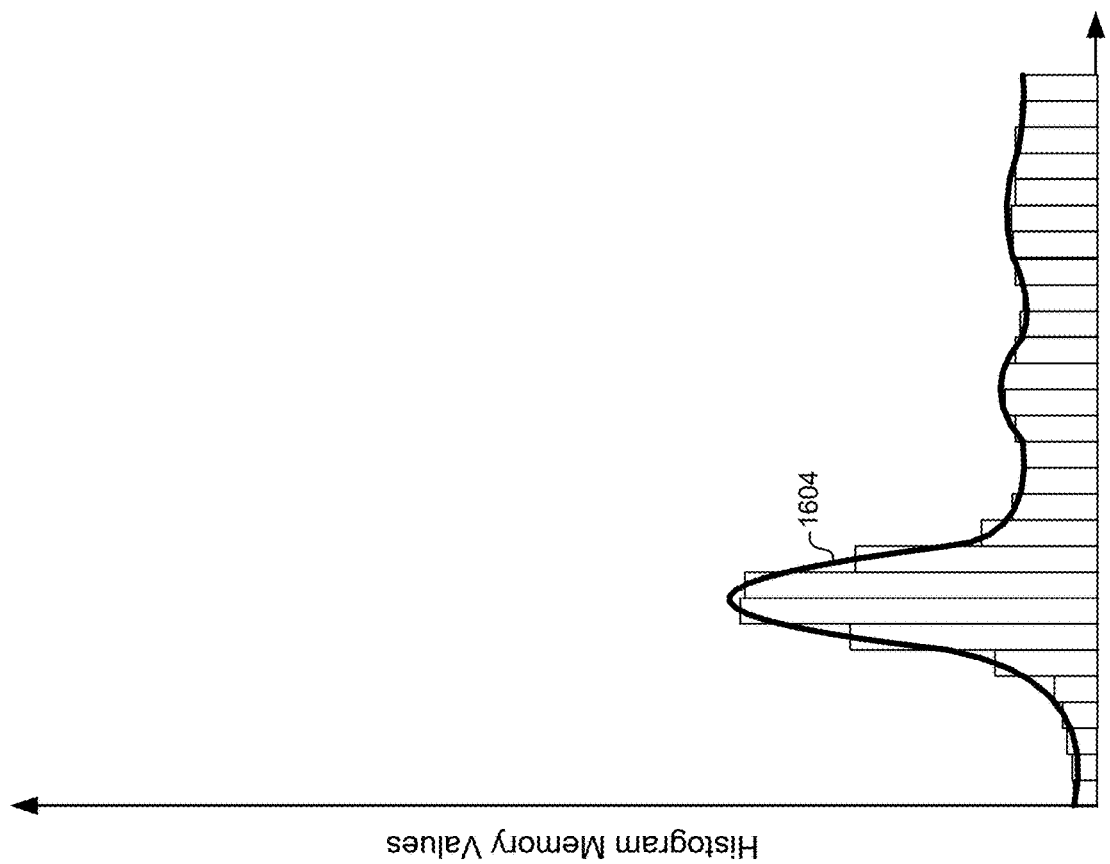
FIG. 17A illustrates the histogram memory from FIG. 16B.

FIG. 17A illustrates the histogram memory from FIG. 16B. Additionally, FIG. 17A also superimposes the values in the registers representing a baseline peak 1702 established in averages of previous measurements. Essentially, the baseline peak 1702 represents the magnitude of the photon count that can be attributed to the reflections off the housing rather than to reflections off nearby objects of interest in the surrounding environment. Because the values of each of these registers in the baseline peak 1702 are known, their values can be removed from the histogram registers of the current measurement.

Figure 17B:
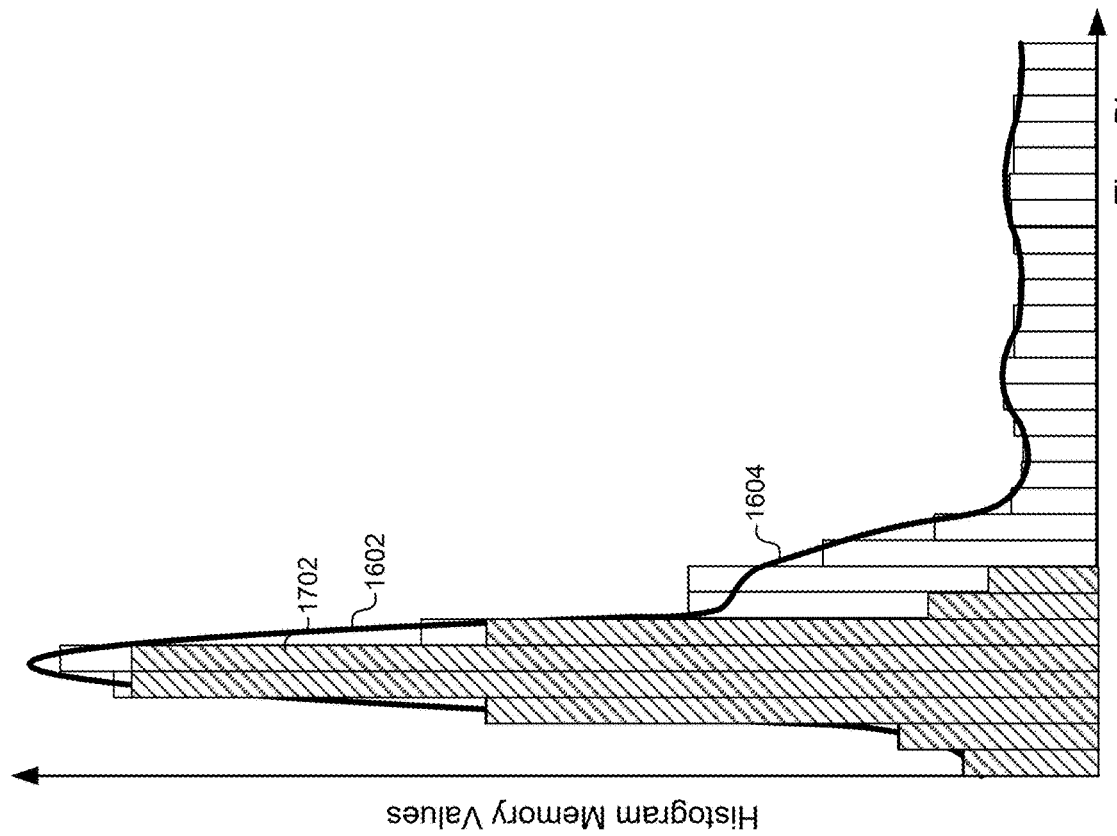
FIG. 17B illustrates the histogram memory from FIG. 16B after the baseline peak has been subtracted from the registers in the histogram memory.

FIG. 17B illustrates the histogram memory from FIG. 16B after the baseline peak 1702 has been subtracted from the registers in the histogram memory. For example, the register values from the baseline peak 1702 may be subtracted from each of the registers in the histogram memory of the current measurement. The resulting contents of the histogram memory show the second peak 1604 resulting from a near-range object in the surrounding environment. Note that the shape of the second peak 1604 may be preserved by removing the effects of the initial peak 1602. This allows the near-range performance and accuracy of the optical measurement system to be greatly increased. Instead of creating a "dead zone" around the optical measurement system, near-range objects can be detected precisely, even when they come very close to the optical measurement system.

Figure 18:
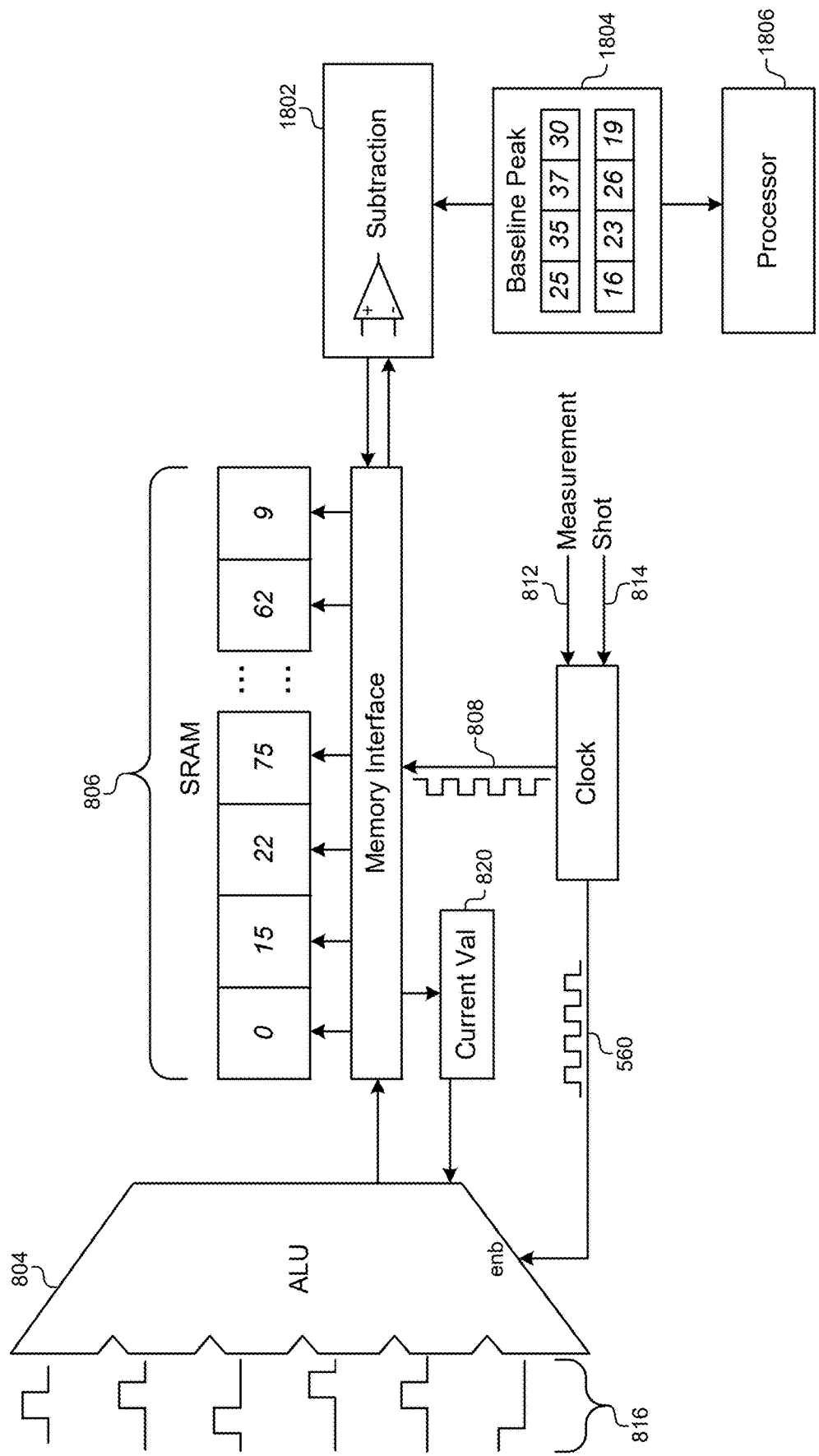
FIG. 18 illustrates a circuit for removing the effects of reflections off the system housing during near-range measurements, according to some embodiments.

FIG. 18 illustrates a circuit for removing the effects of reflections off the system housing during near-range measurements, according to some embodiments. FIG. 18 is similar to FIG. 8, in that it includes an arithmetic logic circuit 804, a histogram memory 806, and various periodic signals that control the timing of the arithmetic logic circuit 804 and histogram memory 806. This basic circuit may be used to generate the histogram in the histogram memory 806 over a plurality of shots defined by a shot or start signal 814 and a measurement signal 812 as described above.

The histogram data path illustrated in FIG. 18 also includes a baseline peak 1804 that stores the values of the histogram registers for the initial peak resulting from reflections off the housing as described above. This baseline peak 1804 may be an average peak value recorded over a plurality of previous measurements. Values for each register location may be averaged over a sliding window of previous measurements to eliminate any outliers, blockages, or other effects that may only temporarily affect the accuracy of the baseline peak 1804. Other mathematical operations may be used to combine a plurality of initial peaks recorded in previous measurements to generate a baseline initial peak, including maintaining a running average, identifying minimum or maximum peaks, using a stepping average finder, and other similar techniques.

The baseline peak 1804 may be provided to a subtraction circuit 1802 such that it may be subtracted from the corresponding registers in the histogram memory 806. For example, the memory interface may provide the first nine register values from the histogram memory 806 to the subtraction circuit 1802 and subtract the corresponding values from the baseline peak 1804 from those register values. The register values may then be returned to the histogram memory 806 such that the histogram memory 806 has the effects of the reflections off the housing removed from the histogram. The subtraction circuit 1802 may be implemented using an arithmetic logic unit (ALU) or digital logic gates implementing the subtraction function.

In some embodiments, the baseline peak 1804 may additionally or alternatively be provided to a processor 1806. Instead of compensating for the reflections off the housing using the subtraction circuit 1802, the baseline peak 1804 may be passed with the raw and/or filtered data in the histogram memory 806 to a processor 1806, which may then remove the baseline peak 1804 from the current measurement. The processor 1806 may be on a same integrated circuit as the rest of the optical measurement system, including the histogram memory 806 and the arithmetic logic circuit 804. Alternatively, the processor 1806 may be located on a separate integrated circuit that is distinct from an integrated circuit implementing the optical measurement system. The processor 1806 may receive filtered and/or raw data from the histogram memory 1806, and then may use a set of instructions to perform operations that remove the effect of the reflections off the system housing as described above.

VIII. Detecting Peaks Using Matched Filters

As described in detail above, the optical measurement system may generate pulse trains that are emitted from a light source and directed into a surrounding environment. The light from these pulse trains may reflect off of objects in the surrounding environment and be received by a corresponding photosensor in the optical measurement system. As photon counts are received by the photosensor, they may be accumulated into registers of a histogram memory (e.g., an SRAM) to form a histogram representation of photons received during an optical measurement. The accumulated photon counts in the histogram memory may represent raw measurement data, which may include reflected photons from the light source as well as photons from background noise in the surrounding environment. Depending on the noise level of the background environment, this raw data in the histogram memory may have a relatively low signal-to-noise ratio (SNR). This level of noise in the histogram may increase the difficulty associated with performing on-chip peak detection. In order to improve the confidence in the on-chip peak detection circuitry, the optical measurement system may apply one or more filters to the raw data in the histogram memory, after which a peak detection algorithm using the filtered data may be performed.

While filtering the data does improve the SNR of the data in the histogram memory, it may also obscure characteristics of the histogram of reflected photons that may be useful for calculating distance measurements, performing statistical analyses of the histogram data, detecting edge cases, detecting near-range objects, distinguishing between adjacent reflected peaks, curve fitting, and so forth. The embodiments described below leverage the benefits of filtering the data in the histogram memory, as well as preserving the additional information provided by the raw data received from the photosensor. The filtered data may be used to perform on-chip peak detection to then identify time windows in the unfiltered histogram memory that may include detected peaks. After the time windows are identified using the filtered data, an integrated circuit in which the histogram memory is implemented may pass time bins containing the unfiltered histogram data during those time windows to an external processor for distance calculations and other analyses of the raw histogram data.

The sections below first describe how the filtering process may use matched filters for single pulse scenarios to detect time windows in the unfiltered data to be passed off-chip. Afterwards, more complex examples are presented using pulse trains that include multi-pulse codes and more complex matched filters. Some filters may be designed to compress the data for these longer pulse codes without sacrificing the shape information of the original data.

A. Far-Range Peak Detection

Figure 19:
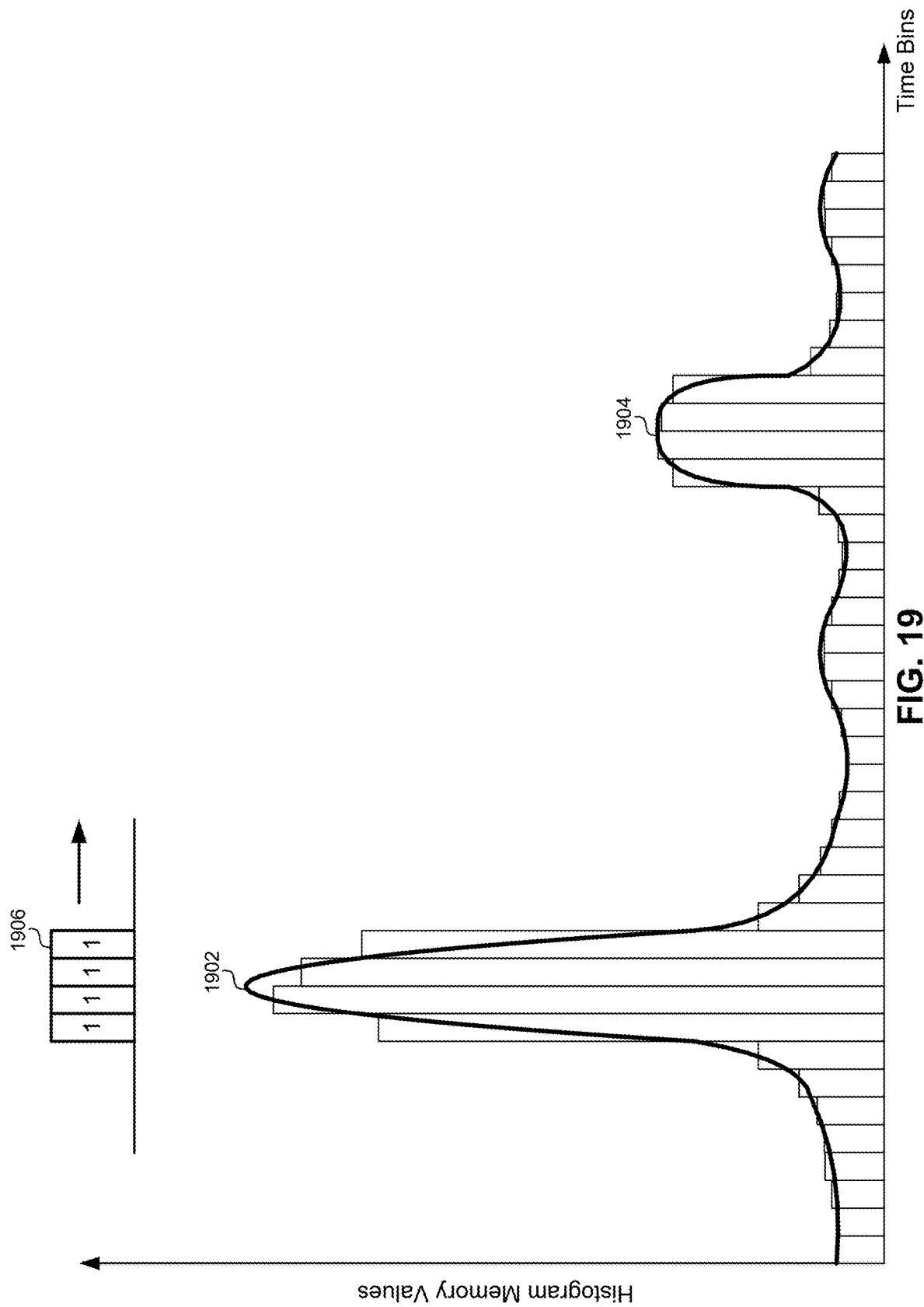
FIG. 19 illustrates the contents of a histogram memory after a single pulse is transmitted and received by the optical measurement system, according to some embodiments.

FIG. 19 illustrates the contents of a histogram memory after a single pulse is transmitted and received by the optical measurement system, according to some embodiments. As described above, the initial time bins in the histogram memory may include photon counts resulting from an initial pulse that is reflected from the housing and/or window of the optical measurement system. As the light source of the optical measurement system emits photons into the surrounding environment, a portion of these photons may be reflected back onto the corresponding photosensor without exiting the housing of the optical measurement system. This early reflection of photons may result in a relatively large peak 1902 stored in the initial time bins of the histogram memory. Some embodiments may process the contents of the histogram memory such that the initial peak 1902 may be distinguished from subsequent peaks that are reflected off of objects in the surrounding environment. For example, some embodiments may ignore peaks above a predetermined intensity threshold that is likely to only be surpassed by the initial peak 1902. Some embodiments may ignore peaks occurring in the initial time bins (e.g., during the first 20 time bins). Some embodiments may average a plurality of signals to estimate a background level of noise that includes the initial peak 1902, and this average signal can be subtracted from measurement signals to effectively remove the initial peak 1902. The initial peak 1902 may therefore be recognized and distinguished from subsequent peaks that represent reflections off of objects of interest in the surrounding environment.

After the initial peak 1902, the histogram memory may later include one or more peaks resulting from photon reflections off of an object in the surrounding environment. For example, peak 1904 may occur subsequent to the initial peak 1902 and may represent photons reflected from an object in the surrounding environment. Note that both peak 1902 and peak 1904 may result from photons emitted as part of the same pulse train; however, peak 1902 may be reflected from the housing/window of the optical measurement system, while peak 1904 may be reflected from an object in the surrounding environment. The shape of the peaks 1902, 1904 may correspond roughly to the shape of the emitted pulse from the optical measurement system. For example, some embodiments may emit pulses having an square shape. As illustrated in FIG. 19, the photon counts received by the histogram memory may have an approximately square shape corresponding to the emitted pulse shape. Background noise, reflection patterns, and other environmental effects may cause the shape of the received peaks 1902, 1904 to vary somewhat from the ideal square shape of the emitted pulse.

As described above, the photon counts in the histogram illustrated in FIG. 19 may include a non-trivial amount of background noise and other effects that may cause difficulty when identifying peaks in the histogram memory. Some embodiments may include on-chip peak detection circuitry that identifies peaks in the histogram memory. Because the overall length and amount of data stored in the histogram memory may be relatively large, this peak detection circuitry can identify time windows in the histogram memory that include identified peaks. The integrated circuit in which the histogram memory is implemented may then pass histogram data from these time windows to an off-chip processor for distance calculations. Transmitting windows of peak data instead of the entire contents of the histogram memory greatly reduces the bandwidth of data that needs to be transmitted between the integrated circuit and the processor. However, these on-chip peak detection algorithms/circuits may perform best when the raw data in the histogram memory is first filtered to increase the SNR.

Some embodiments may use a matched filter to increase the SNR of the raw data in the histogram memory. The shape of the matched filter may correspond to a shape of the initial pulse emitted by the optical measurement system. For example, a matched filter 1906 may be applied to the raw data in the histogram memory having a generally square shape as illustrated in FIG. 19. The filter 1906 may be comprised of a series of constant values, such as a "1" or other numerical values, that may be convolved with the raw, unfiltered histogram data to produce a filtered version of the histogram data. Other filter shapes may be used, e.g., a pattern with one or more 0's between sets of one or more non-zero values (e.g., 1's and −1's). Such a pattern may occur when different shots are assigned different weights, as described in U.S. Patent Publication 2018/0259645, which is incorporated by reference in its entirety.

Figure 20:
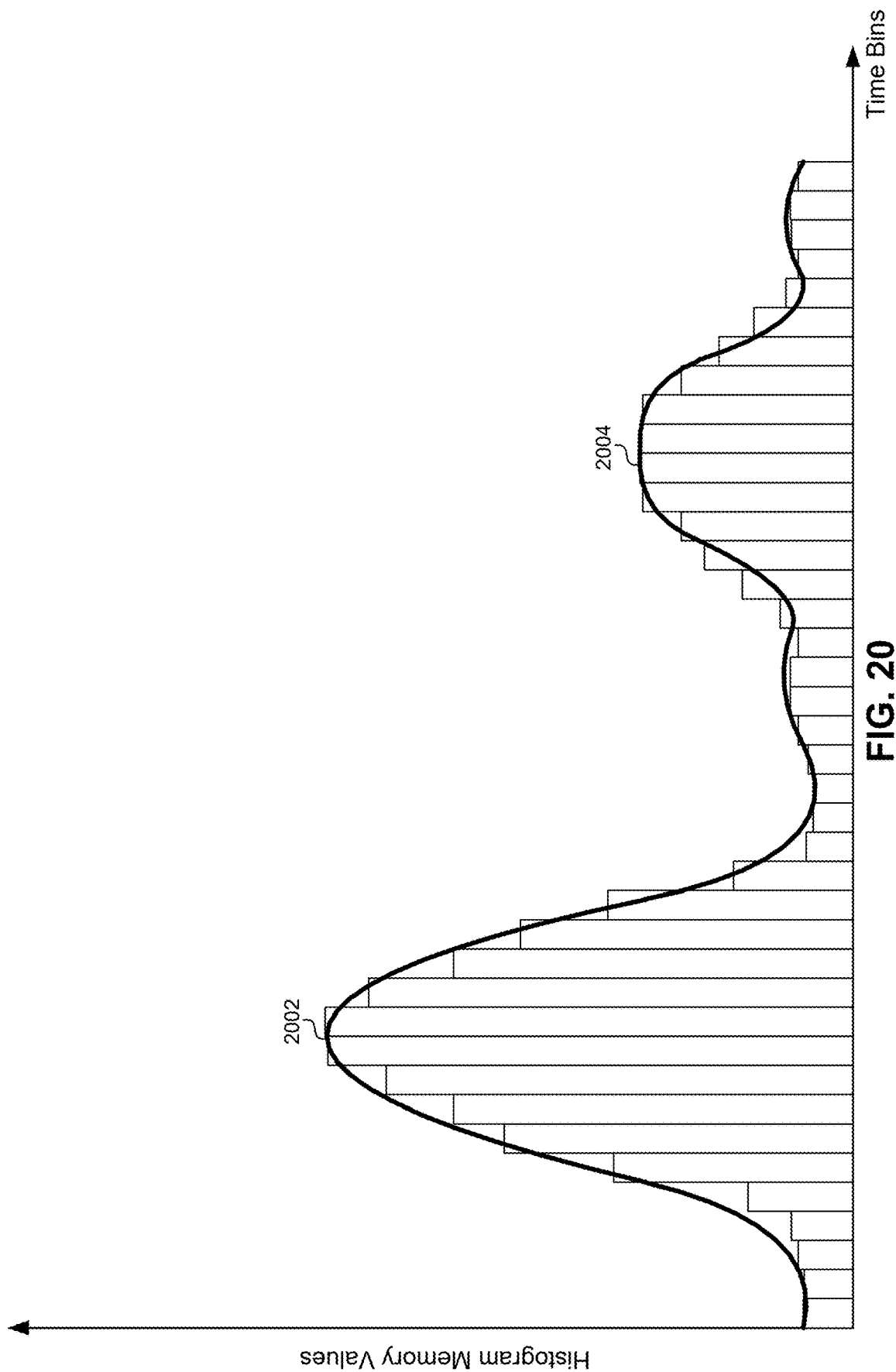
FIG. 20 illustrates a filtered version of the histogram data using the filter from FIG. 19, according to some embodiments.

FIG. 20 illustrates a filtered version of the histogram data using the filter 1906 from FIG. 19, according to some embodiments. Generally, the filter 1906 may act as a low-pass filter that reduces the effect of any background noise in the signal to increase the SNR. The low-pass also has the effect of increasing the width of any reflected peaks in the histogram data. In some embodiments, the width of the matched filter 1906 may be approximately the same as the width of the pulse transmitted from the light source of the optical measurement system. For example, for a pulse that is approximately four time bins wide (e.g., 8 ns), the corresponding matched filter 1906 may also be approximately four time bins wide. This may have the effect of approximately doubling the width of the peak in the filtered histogram data (e.g., eight bins wide).

In FIG. 20, the first peak 2002 may represent a filtered version of the initial peak 1902 in FIG. 19 resulting from reflections off the housing/window of the optical measurement system. Similarly, the second peak 2004 may represent a filtered version of the second peak 1902 in FIG. 19 resulting from reflections off of an object of interest in the surrounding environment. Note the low-pass filter operation of the matched filter 1906 has changed the shape of the peaks 2002, 2004 by increasing the width of the peaks 2002, 2004 and smoothing the overall shape of the peaks 2002, 2004. This may serve to more clearly distinguish the peaks 2002, 2004 from any noise incidentally stored in the histogram memory.

Although the matched filter 1906 may cause the peaks 2002, 2004 to be more easily identified in the filtered histogram data, this filtering operation also distorts the shape of the histogram data. While this results in a higher SNR and a higher confidence level for peak detection, this also removes important information that is may be represented in the unfiltered histogram data. This information may be useful for a processor performing distance calculations, statistical analyses, and other calculations that may be best performed using the detail available in the unfiltered data. Although some embodiments may pass peak 2002 and/or peak 2004 from the filtered histogram data to the processor for distance calculations, some embodiments may use the location of the peaks 2002, 2004 identified in the filtered histogram data to identify corresponding peak locations in the unfiltered histogram data, and then send the unfiltered peaks from the unfiltered histogram data to the processor. This process will be described in greater detail below.

B. Adjacent Peak Detection

In addition to losing signal information through the filtering process described above, some embodiments may also have difficulty distinguishing between adjacent peaks without using the unfiltered histogram data.

Figure 21B:
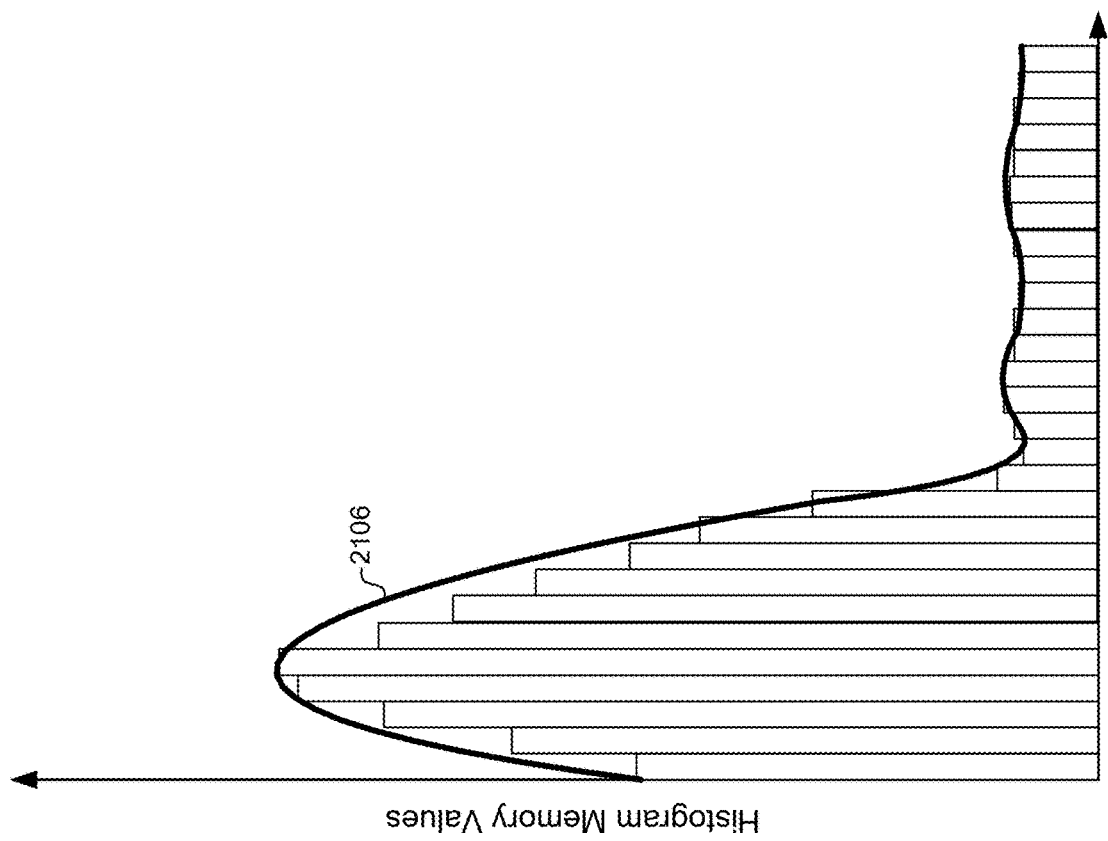
FIG. 21B illustrates the effect that a low-pass filter may have on the unfiltered histogram data from FIG. 21A, according to some embodiments.
Figure 21A:
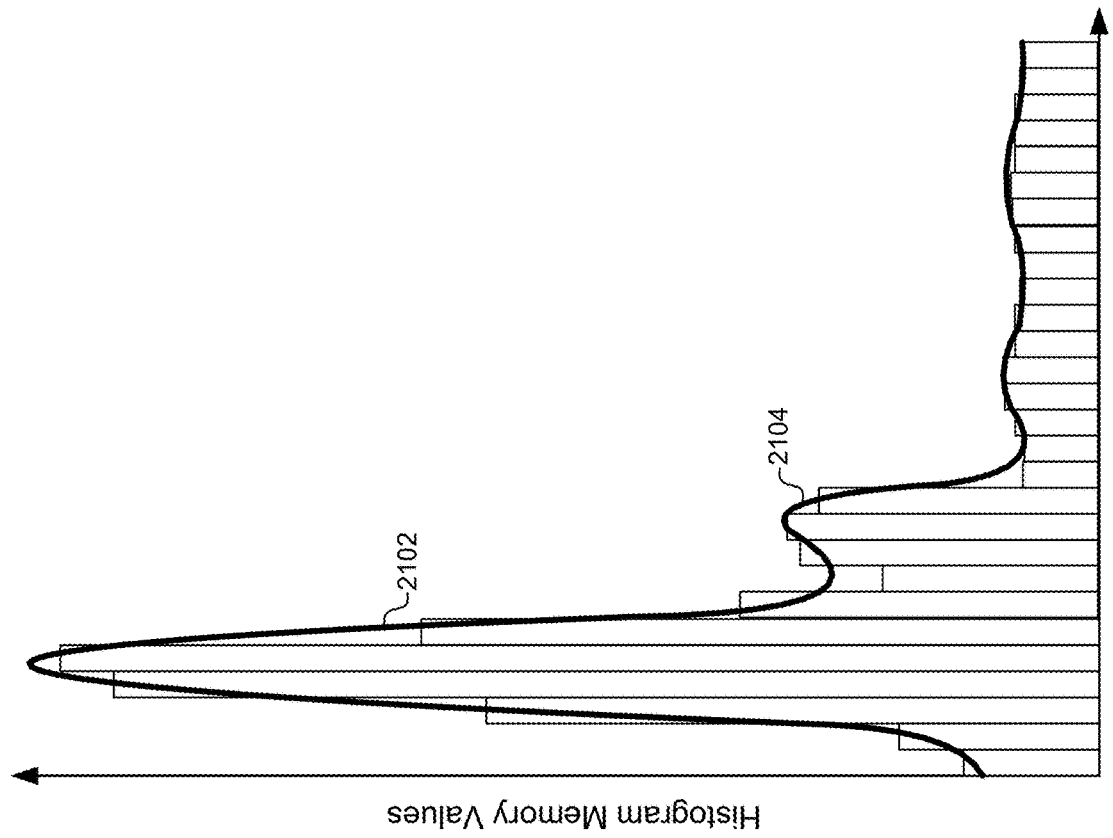
FIG. 21A illustrates an example of two adjacent peaks that are relatively close together in time.

FIG. 21A illustrates an example of two adjacent peaks that are relatively close together in time. The first peak 2102 may correspond to an initial pulse reflection off of the housing/window of the optical measurement system as described above. A second peak 2104 may correspond to an object that is near the optical measurement system. FIG. 21A represents the unfiltered histogram data in the histogram memory after receiving photon counts from these two different reflections. Note that in the unfiltered histogram data, the two peaks 2102, 2104 may be distinguished from each other. Although they are beginning to merge, the first peak 2102 can be distinguished from the second peak 2104 using a peak detection algorithm. For example, one peak detection algorithm may scan through the histogram memory registers and identify time bin patterns that increase and then decrease by a threshold amount. Although the peaks 2102, 2104 are close together in time and at least partially overlap, the second peak 2104 may still be distinguished using this type of peak detection algorithm.

FIG. 21B illustrates the effect that a low-pass filter may have on the unfiltered histogram data from FIG. 21A, according to some embodiments. The low-pass filter may be a matched filter, such as the matched filter 1906 from FIG. 19. The filter may increase the overall width of the first pulse 2102 and smooth any abrupt changes in the histogram data. In doing so, the first peak 2102 may blend together with the time bins of the second peak 2104. FIG. 21B illustrates how these two peaks 2102, 2104 may be enveloped into a single peak 2106 such that the two peaks 2102, 2104 are no longer distinguishable in the filtered histogram data. When the filtered histogram data is analyzed and used to calculate distance measurements, the near-range object in the surrounding environment represented by peak 2104 may be lost in the filtered histogram data. Consequently, the near-range accuracy of the optical measurement system may be affected when the filtered histogram data is used without the unfiltered histogram data.

Although the example above in FIGS. 21A-21B illustrates the problems associated with near-range object detection, the same principles may also apply to objects at any range that are close to each other. For example, peak 2102 and peak 2104 may represent objects in the surrounding environment that are both considerable distance from the optical measurement system (e.g., 15 feet, 20 feet, etc.). However, if both of these objects are very close to each other (e.g., 1 foot, 2 feet, etc.) the resulting peaks in the unfiltered histogram data may be relatively close together. When the histogram data is filtered, these two peaks may be merged together into a single peak, and this may cause the optical measurement system to fail to distinguish between these two objects in the surrounding environment.

IX. Using Filtered Data to Provide Windows in Unfiltered Data

To solve these and other technical problems, some embodiments may filter the histogram data, but may pass the unfiltered data to a processor for distance calculations, statistical analyses, curve interpolation, peak fitting, and so forth. The filtered data may be used to identify the location of the peaks in the histogram; however, instead of only passing a window of time bins including the filtered peak data, these embodiments may alternatively or additionally use location(s) identified in the filtered histogram data to identify corresponding location(s) in the unfiltered histogram data. A window of time bins can then be sent to the processor from the unfiltered histogram data, and the processor can use the unfiltered histogram data to analyze peaks for distance calculations.

A. Locating Windows in Unfiltered Data

Figures 22A, 22B:
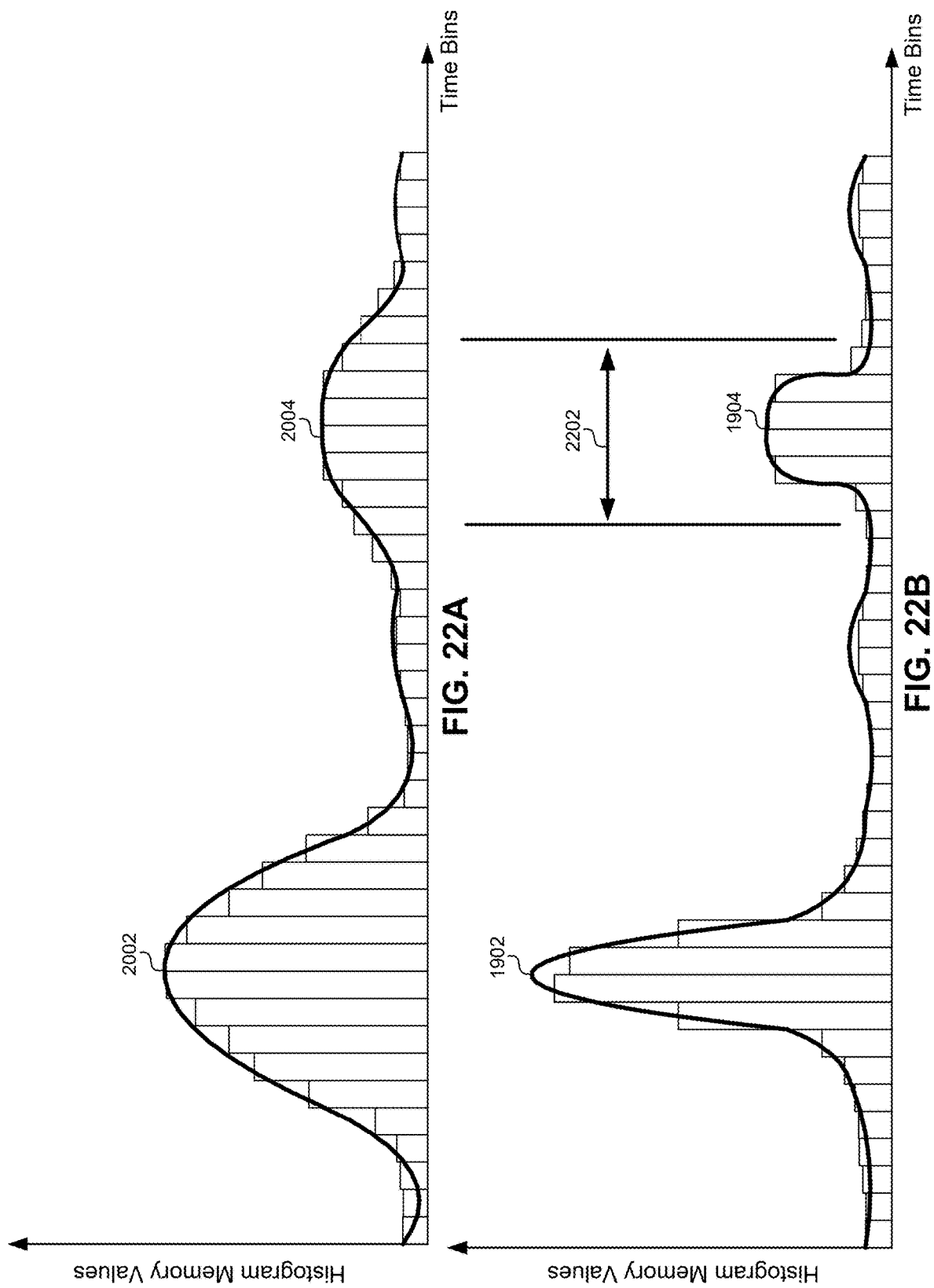
FIGS. 22A-22B illustrate how the filtered data can be used to identify peaks in the unfiltered data, according to some embodiments.

FIGS. 22A-22B illustrate how the filtered data can be used to identify peaks in the unfiltered data, according to some embodiments. The curve in FIG. 22A represents the filtered histogram data from FIG. 20. Similarly, the curve in FIG. 22B illustrates the unfiltered histogram data from FIG. 19. A filter may be applied to the unfiltered histogram data in FIG. 22B to yield the filtered histogram data in FIG. 22A. A peak detection circuit/algorithm may be executed on the filtered histogram data to identify any peaks in the filtered histogram data. As described above, the peak detection algorithm may be executed on the filtered histogram data because the filtered histogram data may have a higher SNR, cleaner curves, fewer transient spikes, and/or may yield overall better results than using the unfiltered histogram data.

The peak detection circuit/algorithm may first identify the first peak 2002. However, as described above, the peak detection circuit may be configured to exclude the first peak 2002 detected in the unfiltered histogram data under the assumption that the first peak 2002 may correspond to an initial reflection of the light pulse off the housing/window of the optical measurement system. The peak detection algorithm may continue scanning through the unfiltered histogram data until the second peak 2004 is detected. Generally, the peak detection circuit/algorithm may identify location of a maximum value of peak 2004. For example, the peak detection circuit/algorithm may identify a time bin with a local maximum around which peak 2004 is centered.

After detecting the center of peak 2004, the peak detection circuit/algorithm may identify surrounding time bins that may be considered part of peak 2004. For example, some embodiments may identify a predetermined number of time bins that are centered around the peak location (e.g., 17 time bins). Some embodiments may identify time bins that are within a threshold amount of the maximum value of the peak (e.g., within 50% of the maximum value). Some embodiments may select a number of time bins centered around the maximum value based on the width of the light pulse emitted by the optical measurement system and the width of the filter. For example, if an emitted light pulse is four time bins wide, and the corresponding matched filter is also four time bins wide the resulting peak in the filtered histogram data may be expected to be at least eight time bins wide. Consequently, the peak detection circuit/algorithm may identify at least eight time bins (e.g., 10 time bins, 12 time bins, etc.) centered around the maximum value of the peak as representing the peak in the unfiltered histogram data.

Some embodiments may pass one or more windows of time bins off-chip to the processor, including the filtered peak data identified as described above. For example, an initial peak, along with three additional peaks corresponding to objects in the surrounding environment may be identified by the algorithm described above. Windows of time bins centered around these peaks may be identified, and the filtered data in those time bins may be sent to the processor for processing. Using the unfiltered data may be acceptable in situations where the filtered data can adequately capture distance information regarding the surrounding environment.

Alternatively or additionally, some embodiments may use the location of the peaks identified in the filtered data to identify windows of time bins in the unfiltered data, and the windows of time bins in the unfiltered data may be passed to the processor for processing. These windows of unfiltered data may be passed in addition to or in the place of the windows of filtered data described above.

To identify a window of unfiltered data in the unfiltered histogram, the optical measurement system may use the location of the maximum value of the peak identified in the filtered histogram data. For example, a location of the maximum value for peak 2004 in the filtered histogram data may be used as the location of the maximum value of the peak 1904 in the unfiltered histogram data. Once this location is identified in the unfiltered histogram data, a window of time bins surrounding the maximum value can be identified using the techniques described above around the corresponding location in the unfiltered data (e.g., a predetermined number of time bins, time bins within a percentage range of the maximum value, etc.). As described above, the number of time bins identified in time bin windows of the filtered histogram data may be based on the width of the emitted light pulse and the width of the applied filter. This may result in a window of time bins that was at least twice the width of the emitted light pulse. However, when identifying a time bin window in the unfiltered histogram data, a fewer number of time bins may be used. Instead of accounting for the way in which the low-pass filter increases the width of the peak 2004, the width of the unfiltered peak 1904 may be smaller. For example, some embodiments may use a number of time bins that is slightly larger than the width of the emitted light pulse (e.g., 2 time bins, 4 time bins, 6 time bins, 8 time bins larger than the emitted light pulse, etc.).

This method of using filtered data to identify time windows in the unfiltered data preserves the benefits of using the unfiltered data while also preserving the benefits of using the filtered data. The higher SNR and smoother peak profiles may allow the on-chip peak detection circuitry to accurately identify peaks in the histogram. This allows the chip on which the histogram memory is implemented to pass only a small subset of the information stored in the histogram memory to the processor for processing. However, by passing unfiltered data in these windows of time bins to the processor, the processor may maintain all the benefits of using the full unfiltered data for processing.

Turning back briefly to FIGS. 21A-21B, the peak 2106 in FIG. 21B may be readily identified by the on-chip peak detection circuit, and the two peaks 2102, 2104 in FIG. 21A may be passed in a time window to the processor using this method described above. The processor can then use various techniques to analyze the data in the unfiltered time window to recognize that the time window includes two peaks 2102, 2104 rather than just a single peak. The processor can also use the unfiltered data to more accurately identify the center of these peaks 2102, 2104 when computing distance calculations.

B. Circuitry for Passing Unfiltered Data Off-Chip

Figure 23:
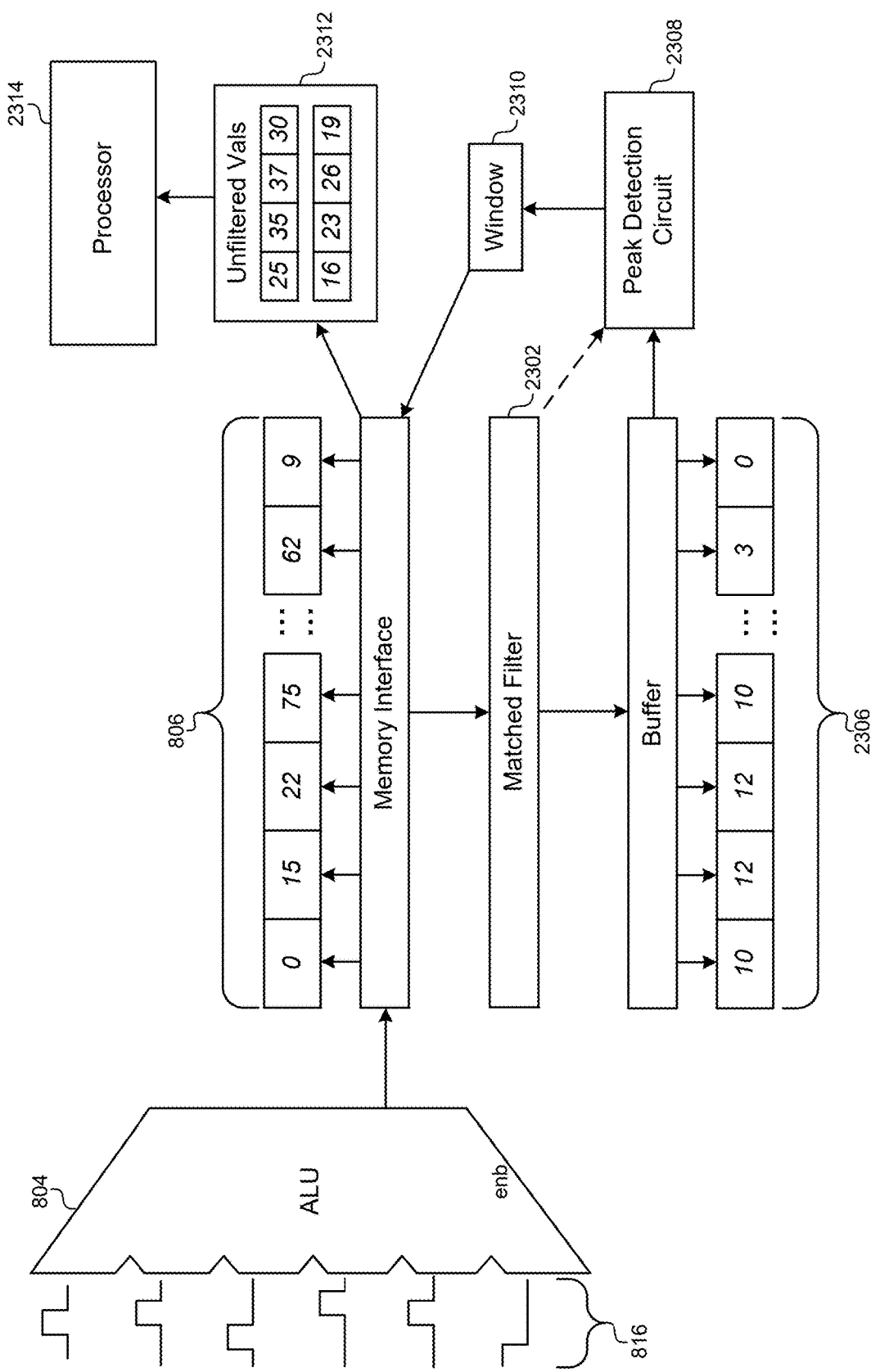
FIG. 23 illustrates a schematic of a circuit for using filtered data to pass unfiltered data to a processor for distance calculations, according to some embodiments.

FIG. 23 illustrates a schematic of a circuit for using filtered data to pass unfiltered data to a processor for distance calculations, according to some embodiments. FIG. 23 is similar to FIG. 8 described above in that it includes an arithmetic logic circuit 804 that receives signals 816 from photodetectors in a photosensor and aggregates those signals into a photon count that is aggregated in a histogram memory 806 over a plurality of shots in an optical measurement. The values stored in histogram memory 806 may represent the unfiltered histogram data described above.

FIG. 23 also includes a filter 2302 that may be applied to the photon counts in the histogram memory 806. The filter 2302 may comprise a matched filter with a shape that corresponds to a shape of the emitted light pulse from the optical measurement system. The filter 2302 may also operate as a low-pass filter to smooth the overall shape of the histogram data. In some embodiments, the filter 2302 can be incrementally applied to time bins in the histogram memory 806. For example, the filter 2302 may be comprised of a sequence of numerical values (e.g., 1 1 1 1) that may be convolved with time bins in the histogram memory 806. In some embodiments, the filtered values may be passed to a peak detection circuit 2308 as they are generated by the filter 2302. The peak detection circuit 2308 can then evaluate filtered values as they are received to detect peaks as they occur in the histogram memory 806. As described above, the peak detection circuit 2308 may operate by identifying peak values in the filtered data characterized by increasing values followed by decreasing values (and vice versa). The peak dissection circuit 2308 can record the location of local maximum values that are identified as the filter 2302 passes through the unfiltered histogram memory 806. This method allows the filtered histogram data to be calculated during a single pass without requiring that the entirety of the filtered histogram data be stored in a separate memory. In cases where the filtered histogram data is passed to a processor 2314 for processing, the peak detection circuit 2308 may store filtered values around the detected peaks as time bin windows as described above.

In some embodiments, the output of the filter 2302 may be stored in a separate buffer 2306. As described above, the separate buffer 2306 may not be necessary in embodiments where the peak detection circuit 2308 operates on the direct outputs of the filter 2302. However, embodiments that store the output of the filter 2302 in a separate buffer 2306 may then simultaneously store both the unfiltered histogram data in the histogram memory 806 and the filtered histogram data in the buffer 2306. The peak detection circuit 2308 may then make a pass through the buffer 2306 to detect peaks in the filtered histogram data. Storing the filtered histogram data in the buffer 2306 allows the peak detection circuit 2308 to make multiple passes through the buffer and employee iterative techniques for identifying peaks in the filtered histogram. For example, each pass through the buffer 2306 may detect a maximum value peak that is different from maximum values detected during previous iterations of the peak detection algorithm.

In some embodiments, the histogram data path depicted in FIG. 23 may operate as a multi-stage pipeline. For example, the first filter 2302 can populate the buffer 2306 using values in the histogram memory 806 after a current measurement is complete. During a subsequent measurement, peak detection circuit 2308 may operate on values stored in the buffer 2306 from the previous measurement. At the same time, the histogram memory 806 may be reset and may begin receiving photon counts from a current measurement. In other embodiments, the peak detection circuit 2308 can identify peaks and send values from the histogram memory 806 before new values from the next measurement are received.

Once the maximum values in the filtered data are identified by the peak detection circuit 2308, one or more time bin windows 2310 may be identified in the unfiltered data in the histogram memory 806. These windows 2310 may be comprised of a plurality of time bins surrounding the maximum values of the peaks identified by the peak detection circuit 2308. The windows 2310 may be populated with data from the histogram memory 806 as unfiltered values 2312. These unfiltered values 2312 may then be passed to a processor 2314 for processing, such as distance calculations, curve fitting, and so forth. In some embodiments, bin identifiers may be passed to the processor 2314 along with, or in the place of, the photon counts in the bins themselves.

The processor 2314 may be implemented on an integrated circuit that is separate and distinct from an integrated circuit on which the histogram memory 806 is implemented. In some embodiments, a first integrated circuit, such as an application-specific integrated circuit (ASIC) may be fabricated that includes the arithmetic logic circuit 804 and the histogram memory 806. The ASIC may also include the peak detection circuit 2308 and the optional buffer 2306 when it is part of the design. Thus, when referring to operations that are performed "on-chip," these operations may be performed on the first integrated circuit.

Some embodiments may also include a second integrated circuit comprising the processor 2314. The processor 2314 may include a microcontroller, a microprocessor, a field programmable gate array (FPGA) implementing a processor core, an ASIC implementing a processor core, and/or the like. The unfiltered values 2312 may be transmitted through printed leads on a circuit board between the first integrated circuit and the second integrated circuit comprising the processor 2314.

In the example of FIG. 23, only the unfiltered values 2312 from the histogram memory 806 are shown as being passed to the processor 2314. However, other embodiments may also pass filtered data to the processor 2314. In some embodiments, the filtered data need not be passed to the processor 2314 because the processor 2314 can instead re-execute the filter 2302 on the unfiltered data to achieve similar results. In these embodiments, reducing the bandwidth of information passed between the first integrated circuit and the second integrated circuit may be more important than ensuring that the number of processing operations performed by the processor 2314 are minimized.

X. Filtering Multi-Pulse Codes

The embodiments described above use single-pulse codes as a simplified example of how filtered data can be used to identify and pass unfiltered data to a processor. However, these techniques described above are equally applicable to more complex multi-pulse codes. A multi-pulse code may include a pulse train or a plurality of pulses that are sent as part of a single shot during a measurement. These pulse codes may be duplicated during each shot during the measurement. Using multi-pulse codes provides a more distinct pattern for detection purposes, and this can minimize false positives and other false peaks that may result from ambient noise rather than photons reflected off of objects of interest in the surrounding environment. The examples below illustrate how these techniques may be used with multi-pulse codes to send unfiltered data to the processor.

A. Low-Pass Summation Filter

Figure 24:
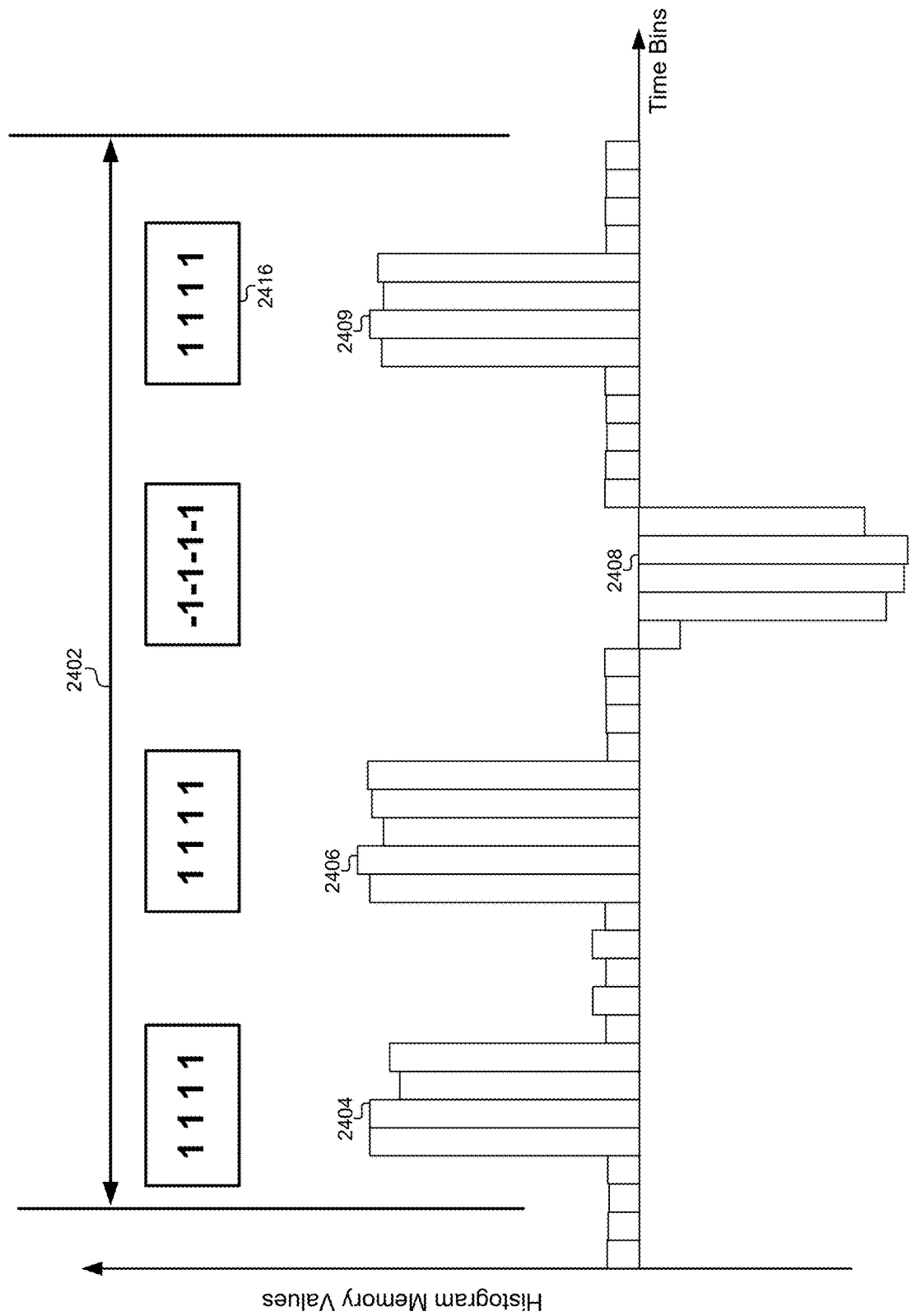
FIG. 24 illustrates a portion of a histogram memory after receiving reflected photons from a multi-pulse code, according to some embodiments.

FIG. 24 illustrates a portion of a histogram memory after receiving reflected photons from a multi-pulse code, according to some embodiments. Multi-pulse codes may be significantly longer than single-pulse codes, and therefore the filtering operation may be even more important to correctly identify peaks in the data set that characterize the reflection pattern from an object in the surrounding environment. FIG. 24 illustrates a multi-pulse code having the following format:

1 1 1 1 0 0 0 0 1 1 1 1 0 0 0 0 −1 −1 −1 −1 0 0 0 0 1 1
1 1 0 0 0 0

This specific pulse code may be constructed from multiple shots from the light source of the optical measurement system during each shot in a measurement. For example, a first shot may include pulses with the positive "1" peaks in FIG. 24. When those peaks are received by the photosensor, they can be given a positive weight and added to the histogram memory time bins. A second shot may include pulses with the negative "−1" peak illustrated in FIG. 24. When this peak is received by the photosensor, it can be given a negative weight and added to the histogram memory time bins. The combination of these two shots types may be combined to generate positive and negative peaks in the histogram memory as illustrated in FIG. 24. Because of the length of the overall pulse code, the time bin window 2402 in the histogram memory that includes the entire pulse code may be significantly longer than the time bin windows described above. For example, the multi-pulse code may take up to approximately 200 time bins in the histogram memory.

When the multi-pulse code is received as reflected photons in the histogram memory, this may be represented as positive/negative peaks in the photon counts. In the example of FIG. 24, the multi-pulse code may result in peaks 2404, 2406, 2408, 2409 in the histogram memory. The histogram memory can then be processed with a matched filter 2416 that is based on the shape of the multi-pulse code transmitted from the light source of the optical measurement system.

Figure 25:
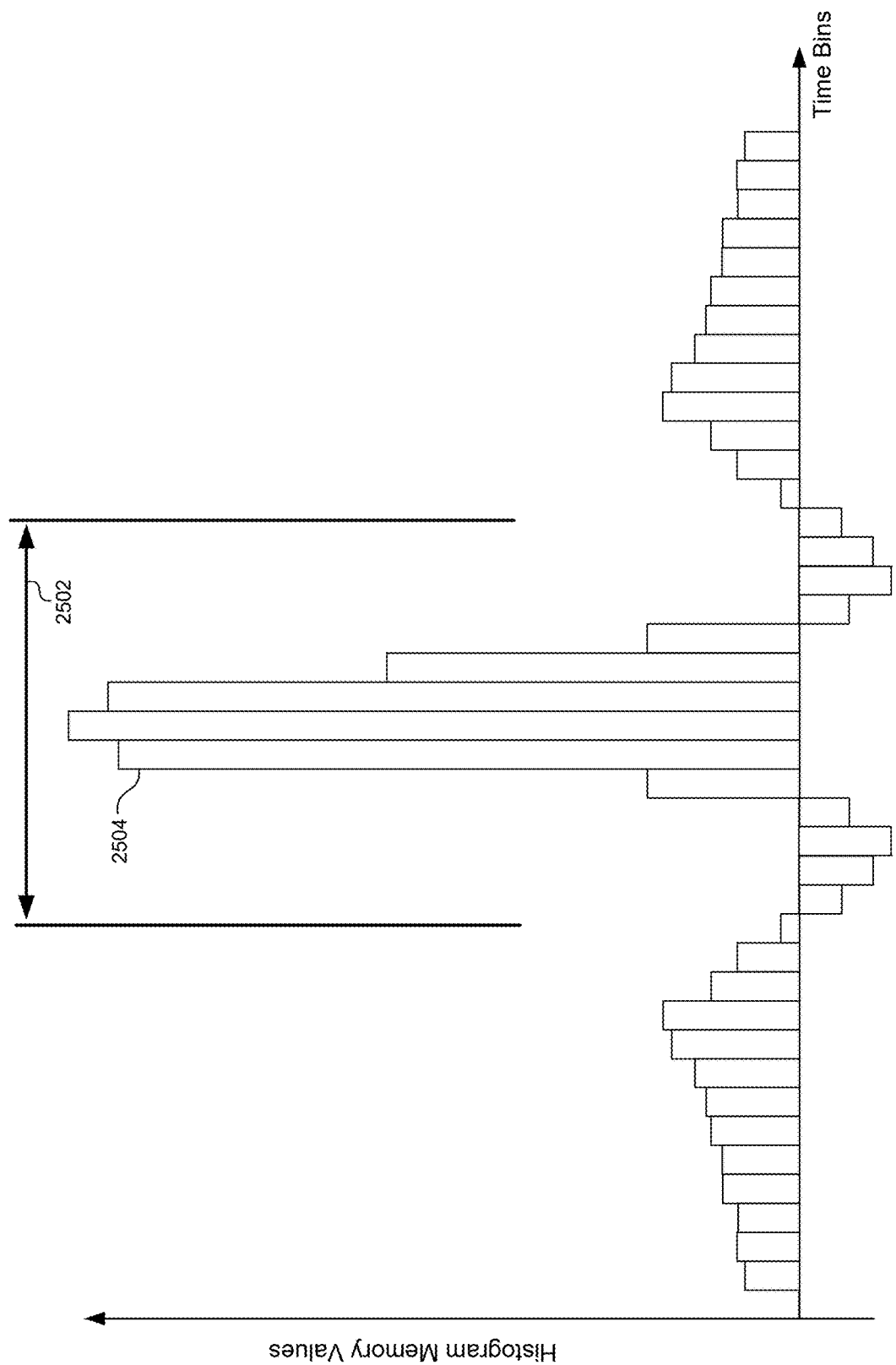
FIG. 25 illustrates a filtered version of the peaks received from a multi-pulse code, according to some embodiments.

FIG. 25 illustrates a filtered version of the peaks received from a multi-pulse code, according to some embodiments.

When convolving the matched filter 2416 with the peaks 2404, 2406, 2408, 2409 in the histogram memory, the resulting filtered version of the histogram data may include a large peak 2504 rather than a plurality of individual peaks. A window of time bins 2502 may be designated around the filtered peak in the filtered data, and this peak 2504 may be identified by the peak detection circuitry as described above.

Using the techniques described above, the location of the peak 2504 in the filtered data can be used to identify the time bin window 2402 in the unfiltered data of FIG. 24. The unfiltered peaks 2404, 2406, 2408, 2409 may then be passed to the processor for processing in the time bin window 2402. As described above for other embodiments, the filtered data in FIG. 23 may also be passed to the processor in addition to the unfiltered data.

B. Compression Filters

Figure 26:
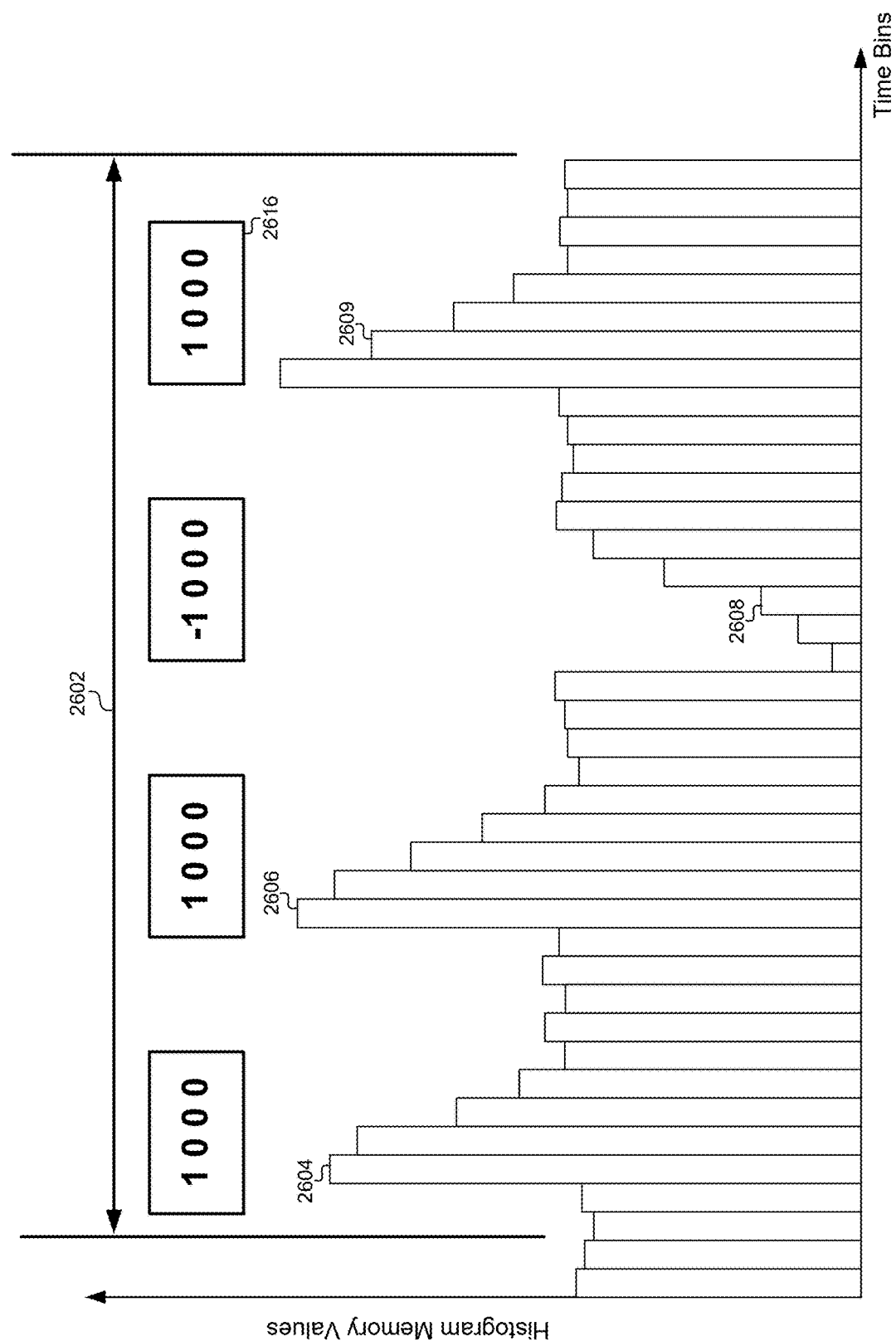
FIG. 26 illustrates a filter that uses only a single binary designator, according to some embodiments.

FIG. 26 illustrates a filter that uses only a single binary designator, according to some embodiments. The matched filter 2416 in FIG. 24 uses the same binary designator for each value in the filter. For example, the sequence "1 1 1 1" was used in the filter 2416 to correspond to the first peak in the multi-pulse code. However, using this uniform sequence of values in the filter 2416 creates a low-pass effect on the filtered data. As described above, this changes the shape of the filtered data such that many characteristics of the unfiltered data are lost in the filtered data.

In the example of FIG. 26, the reflected peaks 2604, 2606, 2608, 2609 in the unfiltered histogram data may not have the same precise square shape as the multi-pulse code transmitted from the light source of the optical measurement system. For example, the photodetectors may exhibit a "pile up" effect where photons received at the beginning of the peak reflection may create an avalanche effect, after which it may take some time for the photodetectors to reset. This causes the peaks to have the shape illustrated in FIG. 26, such that the peaks 2604, 2606, 2608, 2609 have more of a pointed or sloped shape instead of the ideal square shape illustrated in the other examples above.

In order to preserve this shape in the filtered data, some embodiments may use a single binary designator that may still sum peaks 2604, 2606, 2608, 2609 into a single peak without also implementing the low-pass filter operation. The filter 2616 may use only a single value or designator at the beginning of each pulse instead of a uniform set of values throughout the duration of each pulse. In the example of FIG. 26, the filter 2616 may have the following values:

1 0 0 0 0 0 0 0 1 0 0 0 0 0 0 0 –1 0 0 0 0 0 0 0 1 0 0 0 0 0 0 0

This filter may generate a peak similar to the peak illustrated in FIG. 25, however the general shape of the peak will appear more like the shape of the peaks 2604, 2606, 2608, 2609 in the unfiltered data. Therefore, the filtered data may more accurately preserve the shape of the peaks illustrated in FIG. 26. Some embodiments may then pass the filtered data that preserves the shape of the peak to the processor for processing.

In some embodiments, both the filters illustrated in FIG. 24 and FIG. 26 may be operated in tandem at the same time. For example, the unfiltered data may be processed using filter 2416 and filter 2616 to generate two filtered versions of the data. Since the first portion of each filter may use the same arithmetic operations, the circuitry can be shared between the two filters as they are run in parallel. For example, the first stage of the summation step for each of these filters can be shared. Some embodiments may then use the low-pass-filtered version of the histogram data to identify the peak, then pass to the processor the compressed version of the histogram data that does not lose its shape due to the low-pass filter.

Note that the example filters 2416, 2616 described above for multi-pulse codes use single bits as designators in the filter taps. However, this is done merely by way of example in this disclosure. The actual values for each filter may include multi-bit values, such as 10-bit values rather than single bits. As described above, these values can be convolved and calculated as a sliding window to detect the resulting peak in the filtered data.

XI. Method for Providing Unfiltered Data

Figure 27:
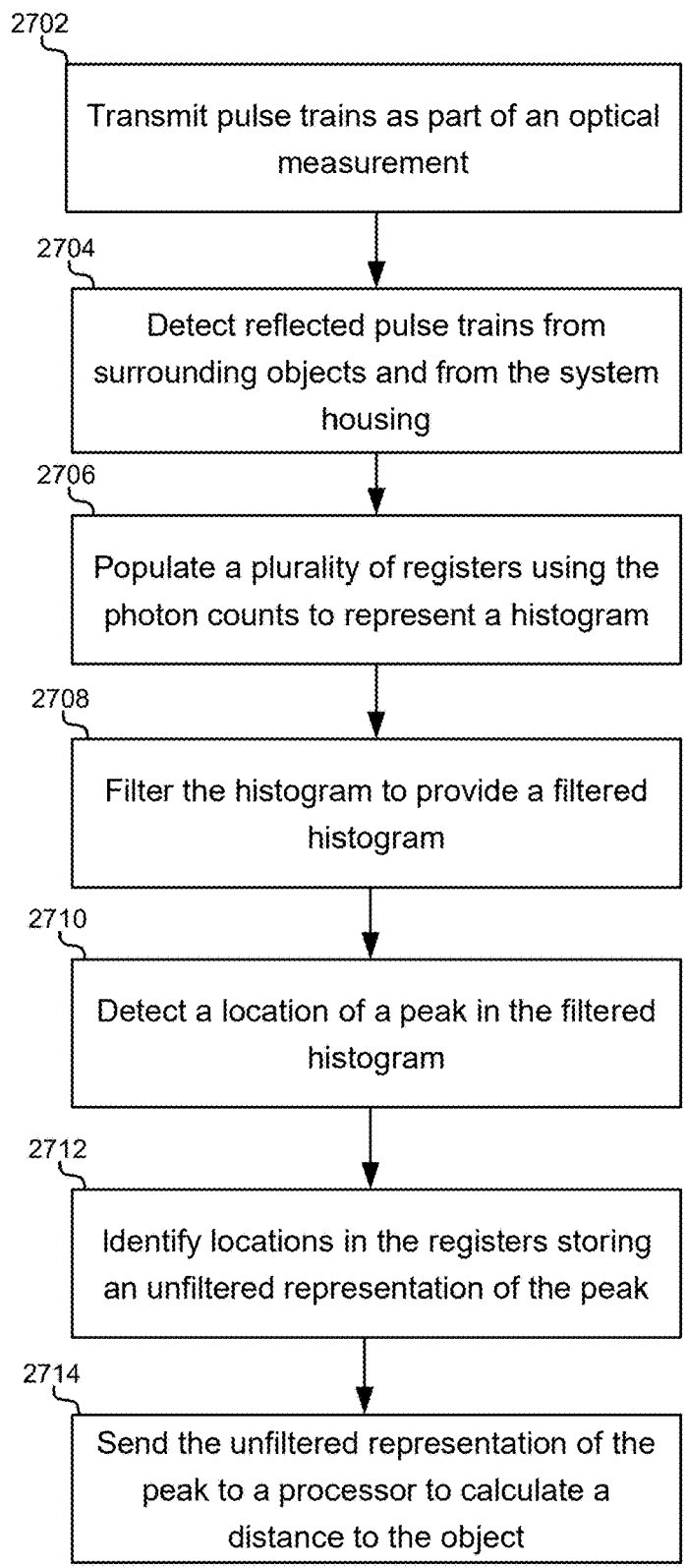
FIG. 27 illustrates a flowchart of a method for analyzing filtered and unfiltered data in an optical measurement system, according to some embodiments.

FIG. 27 illustrates a flowchart of a method for analyzing filtered and unfiltered data in an optical measurement system, according to some embodiments. The method below describes a process for a single photosensor in the optical measurement system. However, as described above, the optical measurement system may include many photosensors or "pixels," and this method may be carried out for each photosensor in the optical measurement system At step 2702, the method may include transmitting one or more pulse trains from a light source over one or more first time intervals as a part of an optical measurement. Each of the one or more first time intervals may represent a "shot" that is repeated multiple times in the measurement. Each of the first time intervals may include one or more pulse trains that are encoded and transmitted by the light sources such that the pulse trains can be recognized as they are reflected off of objects in the surrounding environment. Each of the time intervals may be subdivided into a plurality of time bins such that each of the time bins represents a bin in a histogram of received photon counts during the optical measurement. An example of how a single measurement may include multiple shots subdivided into time bins that aggregate photon counts is described above in relation to FIG. 9.

At step 2704, the method may also include detecting photons from the one or more pulse trains using a photosensor. As described in detail above, the photosensor may include a plurality of photodetectors, such as a plurality of SPADs. The photosensor may receive reflected light as well as ambient background noise received from the surrounding environment. The reflected light received by the photosensor may include light reflected off of objects of interest in the surrounding environment. For example, these objects of interest may be at least 30 cm away from the photosensor, and may represent surrounding vehicles, buildings, pedestrians, and/or any other object that may be encountered around the optical measurement system during use. These objects of interest may be distinguished from objects that are part of the optical measurement system itself, such as a housing. In some embodiments, reflected light received by the photosensor may also include light reflected off of the housing or other parts of the optical measurement system. These reflections may include primary reflections directly off the window or housing of the optical measurement system, as well as secondary reflections that are reflected around an interior of the optical measurement system. The photosensor may also be coupled to threshold detection circuitry and/or to arithmetic logic circuitry that accumulates photon counts. This combination may be referred to above as a "pixel." FIG. 5 illustrates an example of how photon counts may be received from photosensors and counted using threshold circuitry and pixel counters (e.g., arithmetic logic circuits).

At step 2706, the method may also include accumulating photon counts from the photosensor into a plurality of registers to represent a histogram of photon counts received during the current measurement. These photon counts may be accumulated in a plurality of registers in a memory block corresponding to the photosensor. The plurality of registers may be implemented using the registers in an SRAM of a histogram data path as described above in FIGS. 8-9. Each of the time intervals may be subdivided into a plurality of first time bins for the histogram. Corresponding time bins in each of the one or more time intervals may be accumulated in single registers in the plurality of registers. Each of the time intervals may represent a shot, and together the one or more time intervals may represent a measurement for the optical measurement system. Each of the time intervals may be defined by a start signal or shot signal that resets the memory representing the histogram back to the first register in the histogram. The received photons that are reflected from the housing of the optical measurement system may be stored in the histogram memory in the same manner as the other received photons reflected off of surrounding objects outside of the optical measurement system.

At step 2708, the method may additionally include filtering the histogram in the plurality of registers to provide a filtered histogram of the photon counts from the plurality of registers. The filter may include a matched filter that is based on a shape of the one or more pulse trains transmitted from the optical measurement system. The filter may be convolved with the unfiltered histogram in the plurality of registers and may be stored in a separate buffer. The filter may be comprised of a square pulse of repeated non-zero values. The filter may also be comprised of a single non-zero value followed by a plurality of approximately zero values. The filter may operate as described above in relation to FIG. 19, FIG. 24, and/or FIG. 26.

At step 2710, the method may further include detecting a location of a peak in the filtered histogram. Detecting this peak may be performed using a number of different techniques, depending on the particular embodiment. In some embodiments, a pass may be made through the filtered histogram to identify a peak. The system may sequentially access values in the filtered histogram, starting at the beginning of the measurement to identify a peak. A peak may be identified by identifying increasing values followed by decreasing values in the filtered histogram. Similarly, a center of a peak may be identified by identifying values in the histogram with smaller values in time bins on either side.

At step 2712, the method may also include identifying locations in the plurality of registers storing and unfiltered representation of the peak. These locations may be identified using the location of the peak in the filtered histogram. Thus, the filtered histogram data may be used to identify the location of a peak in the unfiltered histogram data. Identifying the peak in the unfiltered histogram may involve locating window of time bins that occurs around the center of the peak. This process may involve expanding outwards from the peak location to determine a range of registers in the histogram memory that include the entire peak. For example, some embodiments may identify a predetermined number of time bins around the location of the maximum value in the unfiltered histogram that may be designated as a peak. For example, a predetermined number of time bins, such as 3 time bins, 5 time bins, 9 time bins, 15 time bins, 17 time bins, and so forth, maybe identified and centered around the maximum value to represent the whole peak. Some embodiments may identify surrounding time bins with values within a percentage of the maximum value in the peak register. This may result in a variable number of time bins that may be used to represent a peak depending on the width of the peak. For example, time bins surrounding the maximum value may be included in the peak when their values are within 25% of the maximum value. This process of identifying a representation of the peak in the unfiltered histogram is described above in relation to FIGS. 22A-22B.

At step 2714, the method may also include sending the unfiltered representation of the peak to a processor to calculate a distance the object. The distance to the object may represent a distance between the optical measurement system and the object in the surrounding environment. This calculation may be performed using the unfiltered representation of the peak sent to the processor. The processor may be physically separate and distinct from an integrated circuit on which the histogram memory is implemented. Thus, the histogram memory may represent a first integrated circuit, and the processor may represent a second integrated circuit that communicate with each other through a printed circuit board. An example of this circuitry is described above in relation to FIG. 23.

It should be appreciated that the specific steps illustrated in FIG. 27 provide particular methods of using filtered histogram data to identify the location of a peak in unfiltered histogram data and passing the unfiltered data to a separate processor, according to various embodiments. Other sequences of steps may also be performed according to alternative embodiments. For example, alternative embodiments of the present invention may perform the steps outlined above in a different order. Moreover, the individual steps illustrated in FIG. 27 may include multiple sub-steps that may be performed in various sequences as appropriate to the individual step. Furthermore, additional steps may be added or removed depending on the particular applications. One of ordinary skill in the art would recognize many variations, modifications, and alternatives.

XII. Combining Spatially Adjacent Pixels

In some environmental conditions, the optical measurement system may have difficulty providing a reliable response above a predetermined confidence level when measuring distances to some objects. These environmental conditions may include weather phenomena, such as rain, mist, fog, etc. These conditions may also include objects that are simply too far away from the optical measurement system to generate a reliable measurement based on the number of photons that are accurately reflected by objects in the environment and received by the photosensors. Any of these situations, the optical measurement system may use a detection threshold to prevent false positives from being detected by the system.

To improve the confidence level of some measurement conditions, some embodiments may use a form of spatial filtering. These embodiments may assume that there is a spatial correlation between photons received by spatially adjacent photosensors. For example, physically adjacent photosensors are likely to receive photons reflected off of a same object in the surrounding environment. Even if the responses of these individual photosensors fall below a detection threshold, techniques are described below for combining the responses of these adjacent photosensors to increase the confidence of the distance calculation such that the combined response is above the detection threshold.

Figure 28:
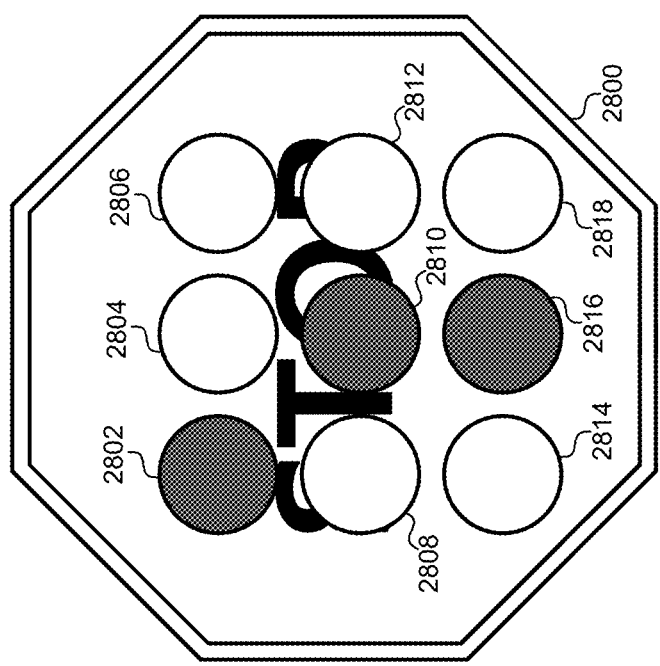
FIG. 28 illustrates an example of an object that may provide reflected photons to adjacent photosensors, according to some embodiments.

FIG. 28 illustrates an example of an object that may provide reflected photons to adjacent photosensors, according to some embodiments. In this example, the object 2800 in the surrounding environment may include a stop sign as illustrated in FIG. 28. Other example objects may include other street signs, buildings, vehicles, pedestrians, and so forth. Depending on the distance of the object 2800 from the optical measurement system, the object 2800 may be large enough that photons from multiple light sources are reflected back onto corresponding photosensors in the optical measurement system. Thus, more than one adjacent photosensor may receive photons reflected from the object 2800, and therefore multiple photosensors may independently use photon counts reflected from the object 2800 to calculate the distance to the object 2800. For example, each of these photosensors may be associated with an independent histogram data path and histogram memory as described above in relation to FIG. 8.

FIG. 28 illustrates how multiple photosensors may "see" different portions of the same object 2800. In this example, nine photosensors may have a view of the object 2800. These views are represented by the circles illustrated on the stop sign object 2800. The circles may be referred to herein as "photosensor views" to distinguish what is viewed by the photosensor from the photosensor itself. Note that additional photosensors may also have views of the object 2800 besides the nine photosensor views explicitly illustrated in FIG. 28.

Based on environmental conditions or the distance to the object 2800, some of the photosensor views may fail to generate results that meet or exceed a detection threshold. The detection threshold may be implemented in different ways depending on the embodiment. For example, the detection threshold may be based on receiving at least a threshold number of photon counts reflected from the objects 2800. The detection threshold may be based on a distance calculated to the object 2800. The detection threshold may be based on a confidence level in distinguishing peaks in the corresponding histogram from noise in the histogram. For example, particularly noisy environments with a low SNR may fail to generate results that meet or exceed the detection threshold. The detection threshold may also be implemented as a peak detection threshold for detecting peaks in a histogram.

In the example of FIG. 28, photosensor views 2802, 2810, 2816 may generate results that exceed a detection threshold. These photosensor views 2802, 2810, 2816 are shaded in a darker color to distinguish them from the other photosensor views 2804, 2806, 2808, 2812, 2814, 2818 of the object 2800 that generate results that do not exceed the detection threshold. Note that photosensors with adjacent photosensor views may generate different results. This difference may be due to slightly different environmental conditions for each photosensor and/or slightly different reflective properties at different areas of the object 2800. This situation may be more likely at the detection limits of the optical measurement system. For example, as the object 2800 begins to be obscured or move out of range of the optical measurement system, photosensors in the array may begin to "drop out" for detecting the object 2800 as their results begin to fall below the detection limit.

Some embodiments may disregard any photosensors that fall below the detection limit. However, other embodiments may leverage the spatial correlation of adjacent pixels. An assumption may be made that more often than not, adjacent photosensor views are spatially correlated. In the example of FIG. 28, each of the photosensor views are spatially correlated because they reflect off the same object 2800. Because of this spatial correlation, neighboring photosensors can be considered together when assessing an optical measurement. Instead of relying only on a single photosensor in isolation, these embodiments may instead consider a combination of photosensor responses to characterize and/or generate a distance measurement for each photosensor.

In the example of FIG. 28, the central photosensor view 2810 may be spatially adjacent to eight additional photosensor views 2802, 2804, 2806, 2808, 2812, 2814, 2816, 2818. These additional photosensor views may be considered spatially adjacent when they are diagonally adjacent, such as photosensor views 2802, 2806, 2814, 2818, as well as orthogonally adjacent, such as photosensor views 2804, 2808, 2012, 2816. The characterization and/or calculation of a distance measurement for the central photosensor view 2810 may utilize information derived from the histograms of each of these other spatially adjacent photosensors.

A. Combining Distance Measurements

Figure 29:
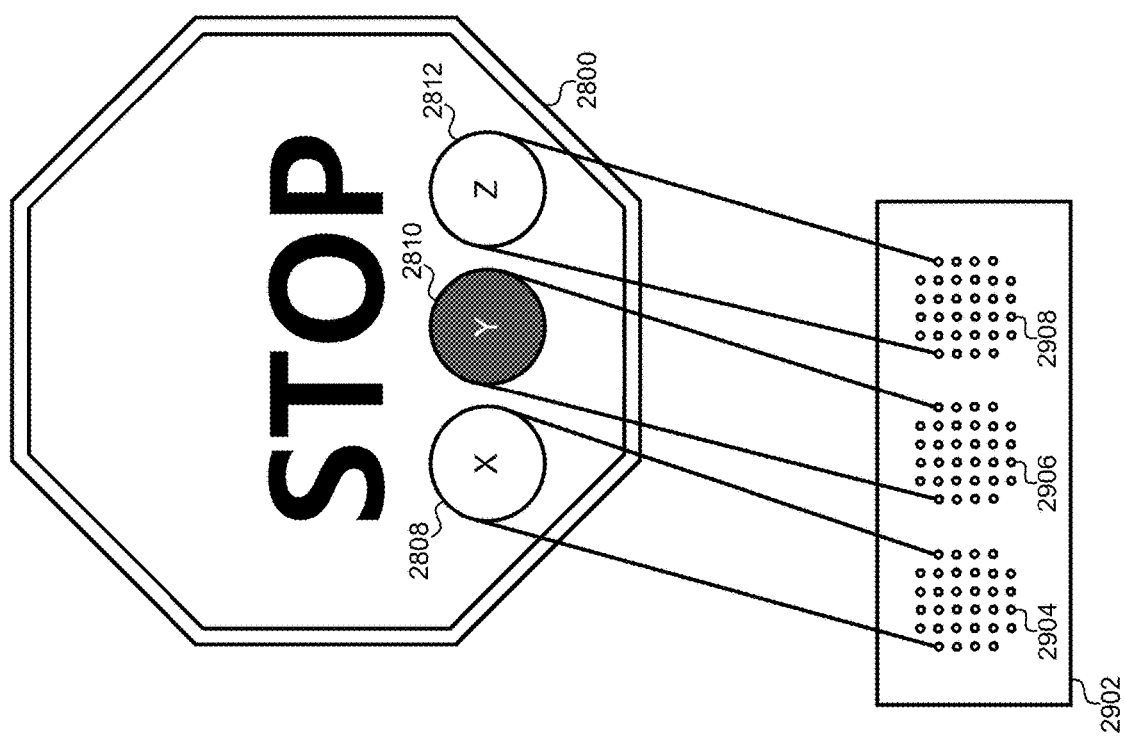
FIG. 29 illustrates an example of how spatially adjacent photosensor views may be used to calculated distance measurement for one of the corresponding photosensors, according to some embodiments.

FIG. 29 illustrates an example of how spatially adjacent photosensor views 2808, 2812 may be used to calculated distance measurement for one of the corresponding photosensors 2810, according to some embodiments. FIG. 29 may be a simplified view of FIG. 28, focusing on how a photosensor can use spatially adjacent views from two other photosensors for clarity. However, as described below, these techniques may be applied to any number of adjacent photosensor views.

In this example, a photosensor array may include a photosensor 2906 comprising one or more individual photodetectors as illustrated in FIG. 29. The photosensor 2906 may be physically positioned next to two orthogonally adjacent photosensors 2904, 2908 in a photosensor array 2902 of the optical measurement system. Because the photosensors 2904, 2906, 2908 are physically adjacent in the photosensor array 2902, the corresponding photosensor views 2808, 2810, 2012 may also be considered to be spatially adjacent in the surrounding environment. However, this need not always be the case. Some embodiments described below may use a spinning photosensor array where the spatial adjacency of photosensor views is not necessarily dependent on physical adjacency of the corresponding photosensors.

To calculate or characterize a distance measurement for the photosensor 2906, some embodiments may rely solely on the photon counts that are reflected off the object 2800 from the photosensor view 2810. In cases where the resulting histogram and/or distance calculation meet or exceed the detection threshold, relying on the response of the photosensor 2906 by itself may be sufficient. However, in some cases, the resulting histogram for the photosensor 2906 and/or the resulting distance calculation may fall below a detection threshold based on various factors described above (e.g., environmental conditions, distance to the object 2800, ambient noise, etc.). In these situations, the optical measurement system may utilize the responses from the neighboring photosensors 2904, 2908 to increase the confidence of the measurement obtained by the photosensor 2906 such that the resulting peaks or calculations meet or exceed the detection threshold.

Some embodiments may be configured to combine information from a histogram associated with photosensor 2906 with information from histograms of neighboring photosensors, such as photosensors 2904, 2908. In some embodiments, this process may share data from adjacent photosensors with each other. For example, the photon counts from the histograms of photosensors 2904, 2908 can be added to the histogram of photosensor 2906. Since the photons are all reflecting off the same object 2800, this may have the effect of boosting the reflected signal in the histogram of photosensor 2906. Note that if the photosensor views 2808, 2810, 2012 are not spatially adjacent as assumed, then accumulating photons from photosensors 2904, 2908 likely will not have a negative effect on the histogram of photosensor 2906, since there would not be any reflections at that distance. In effect, this may approximate a spatial matched filter across the histograms of neighboring photosensors. If two peaks coincide in time, then the photosensor responses may be assumed to be spatially correlated, and the two signals can be combined to generate a larger resulting peak in the histogram.

To combine the information from the histograms, the outputs of the arithmetic logic circuits for each of the neighboring photosensors 2904, 2908 may be sent to the arithmetic logic circuit for photosensor 2906. This may accumulate photons received by any of the photosensors 2904, 2906, 2908 into a single histogram to boost the return signal. In some embodiments, this accumulation calculation may be augmented to use a weighted summation that applies a weight to the responses of various photosensors. Using weights may allow greater accuracy in determining how much a neighboring photosensor should influence the response of another photosensor. For example, since the neighboring photosensors that are orthogonally adjacent may have photosensor views that are closer to the central photosensor view than photosensors that are diagonally adjacent, these orthogonally adjacent photosensors may have higher weights applied than the diagonally adjacent photosensors when their photon counts are added to the histogram of the central photosensor. Using weights may also allow the optical measurement system to use photosensor responses that are not directly adjacent. As described above, the object 2800 may include more photosensor views than the nine photosensor views illustrated in FIG. 28. These additional photosensor views that are not necessarily directly adjacent to the central photosensor may also be considered. For example, the photon count from these non-adjacent photosensors may also be added to the histogram of the central photosensor with weights that are smaller than the weights assigned for directly adjacent photosensor responses.

B. Combining Histograms/Peaks

Figure 30:
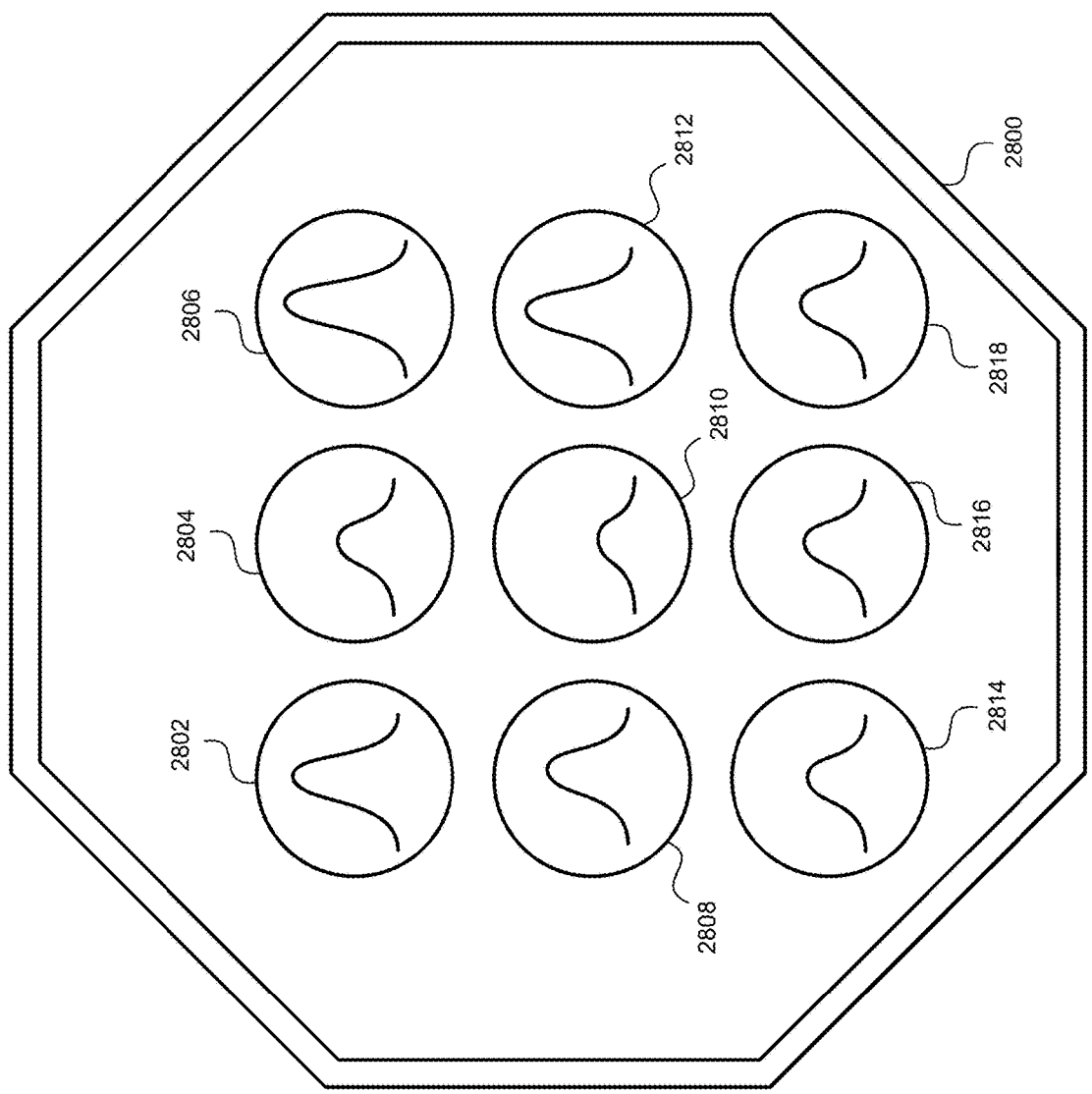
FIG. 30 illustrates how histograms can be combined for adjacent photosensors, according to some embodiments.

FIG. 30 illustrates how histograms can be combined for adjacent photosensors, according to some embodiments. In this example, the histograms of each photosensor in an array of at least nine adjacent photosensors are illustrated with the photosensor views on the object 2800. Note that the actual histograms may be stored in memory blocks representing histogram memories in the optical measurement system. They are displayed in the photosensor views on the object 2800 for illustrative purposes only.

Instead of simply generating a weighted summation of surrounding photosensor responses, some embodiments may use more complex methods of combining information from histograms of surrounding photosensor views into a histogram for a central photosensor view. In this example, the photosensor view 2810 may be surrounded by eight orthogonally/diagonally adjacent photosensor views as illustrated in FIG. 30. Because these photosensor views are spatially adjacent and receive reflected photons from the same object 2800, each of the histograms associated with these views may include a peak corresponding to a distance between the object 2800 and the optical measurement system. These peaks are represented graphically in FIG. 30 in each of the corresponding photosensor views. Note that some peaks are stronger than others, with the peak in the central photosensor view 2810 being small enough that it may not pass the detection threshold.

Some embodiments may combine information from the histograms of the surrounding photosensors to improve the detection of the central photosensor. The information from the histograms may be specific peaks in the histogram memories. For example, when peaks are located at the same distance in multiple adjacent photosensors, the system may determine that the corresponding photosensor views are spatially correlated and cause the associated histograms to be combined. Some embodiments may combine the entire histograms for each photosensor, while other embodiments may execute a peak detection circuit/algorithm, and then only combine specific peak locations. Therefore, the information that is combined from the histograms may include histogram values themselves, portions of histograms representing peaks, and/or additional values derived from the histograms.

Instead of simply generating a weighted sum of surrounding histograms, some embodiments may use a Gaussian combination of the adjacent histograms combined with a convolution process. For example, each of the histograms that are spatially adjacent to the histogram of the central photosensor view 2810 may have a Gaussian function applied before the combination. Instead of summing the resulting histogram values together, they may be convolved together in the same way that a matched filter would be convolved with a single histogram. As described above, this may approximate a spatial convolution between spatially adjacent photosensor responses.

XIII. Photosensor Array Configurations

The examples described above use a rectangular photosensor array pattern with photosensors arranged in a grid layout. However, not all embodiments are limited to rectangular grids. Other embodiments may use different photosensor array patterns that may result in higher photosensor density. Other layout patterns may also be more amenable to spinning photosensor arrays. In any of these layout patterns, the techniques described above may be used to combine data from spatially adjacent photosensor views.

A. Solid State Array Configurations

Figure 31:
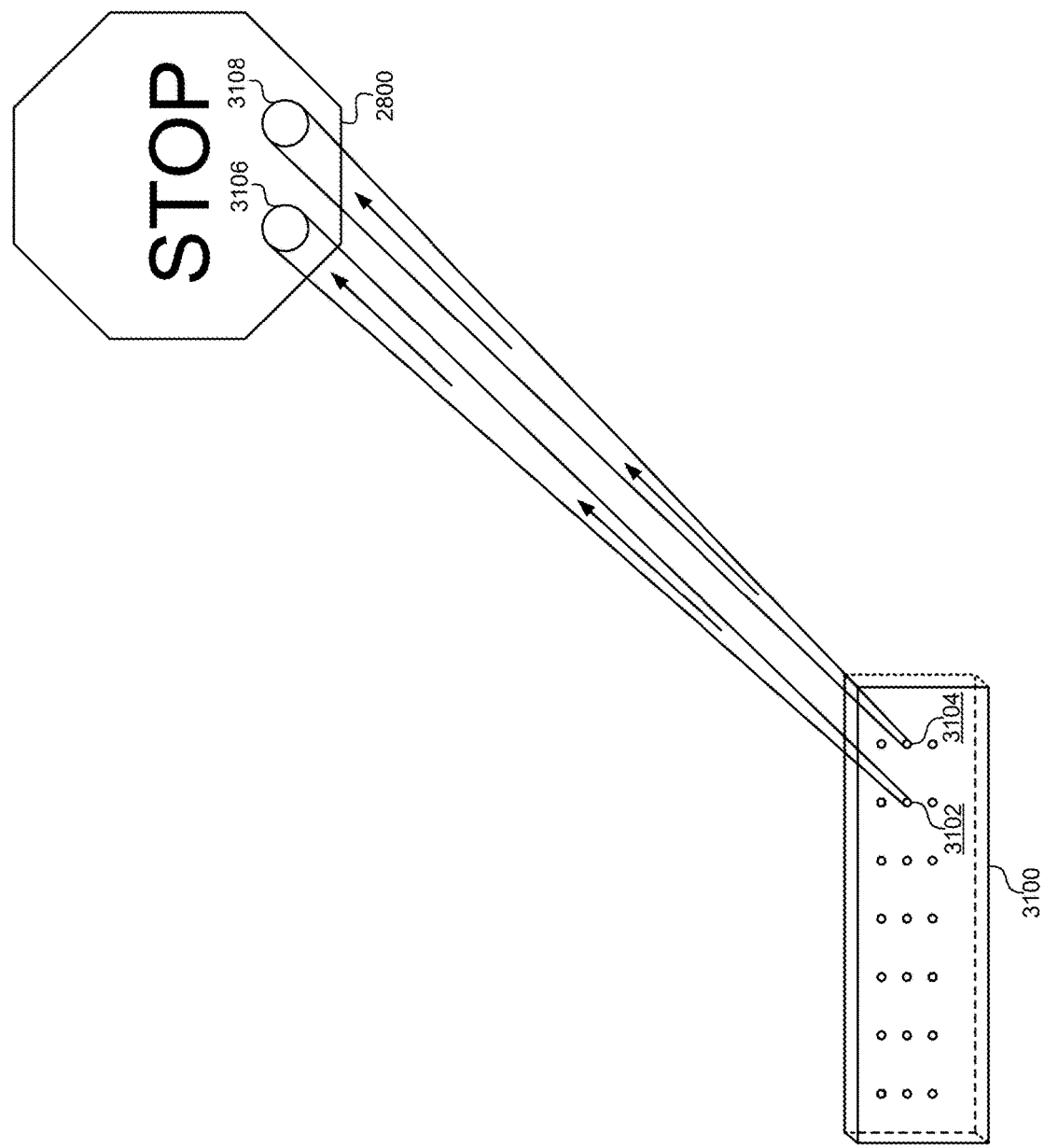
FIG. 31 illustrates an example of a rectangular photosensor layout, according to some embodiments.

FIG. 31 illustrates an example of a rectangular photosensor layout, according to some embodiments. This rectangular photosensor layout is similar to the rectangular grid pattern of photosensors illustrated in the examples above. The photosensor array 3100 may be implemented as a solid-state array with photosensors 3102, 3104, etc., that are stationary relative to the rest of the optical measurement system. Each of the photosensors in the photosensor array 3100 may be scanned by a processor as measurements are made.

To use the algorithms for spatial correlation described above with the rectangular photosensor array 3100, the histograms for adjacent photosensors may be assumed to be spatially adjacent or spatially correlated. For example, photosensor 3102 and photosensor 3104 are physically adjacent in the photosensor array 3100. Consequently, the corresponding photosensor views 3106, 3108 in the surrounding environment may also be adjacent.

B. Rotating Array Configurations

Figure 32:
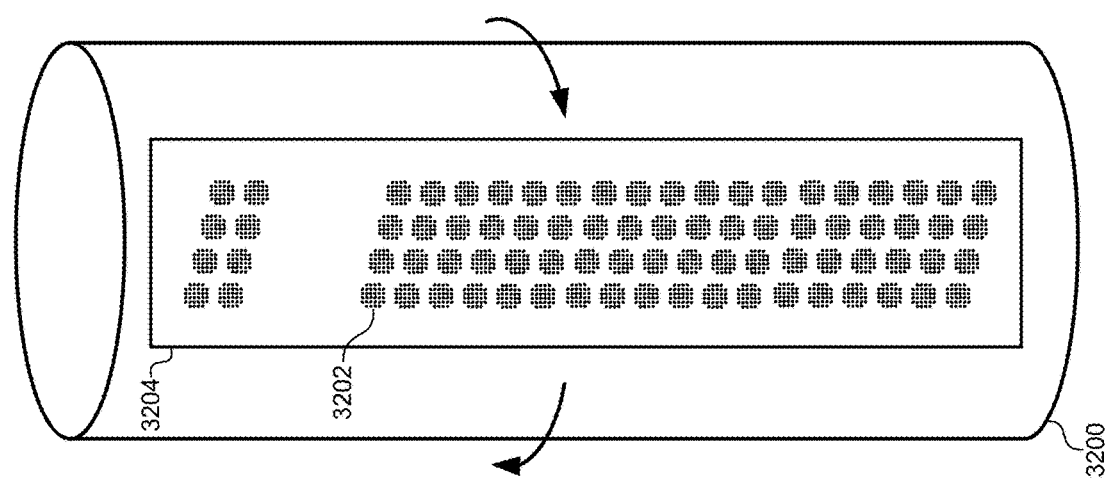
FIG. 32 illustrates a configuration for a rotating optical measurement system, according to some embodiments.

FIG. 32 illustrates a configuration for a rotating optical measurement system, according to some embodiments. This optical measurement system may include one or more photosensor arrays 3204 that are physically coupled to a rotating member 3200. As the optical measurement system operates, the rotating member 200 may rotate, and the photosensor array 3204 may continuously scan the surrounding area as it is rotated about a central axis.

In contrast to the non-rotating photosensor array in FIG. 31, the physical adjacency of photosensors in the photosensor array 3204 need not necessarily imply that the photosensor views are spatially adjacent in the surrounding environment. For example, the photosensor 3202 may execute an optical measurement at a position as the optical measurement system rotates. During a subsequent optical measurement, the photosensor 3202 will be at a different rotational angle than it was during the previous optical measurement, and may thus view different objects and different areas in the surrounding environment. Therefore, the histogram for a previous measurement for the photosensor 3202 may be "spatially adjacent" to the histogram for a subsequent measurement for the same photosensor 3202 during a subsequent time interval as the photosensor 3202 rotates. Therefore, some embodiments may buffer previous histograms on-chip to use as spatially adjacent histograms for the methods described above.

Another difference between the photosensor array 3204 of FIG. 32 and the photosensor array of FIG. 31 is the pattern in which the photosensors are arranged in the photosensor array 3204. Instead of being arranged in a rectangular grid, the columns of photosensors in the photosensor array 3204 are offset slightly from each other. This allows the photosensors in the array 3204 to be positioned closer to each other such that the photosensor density is increased. Additionally, by offsetting photosensors by less than the width of the photosensor, the spatial resolution of the photosensor array 3204 can be increased.

This alternate pattern for the photosensor arrangement in the array 3204 may affect which photosensors are considered spatially adjacent to other photosensors in the array 3204. Physical adjacency need not necessarily imply spatial adjacency from the view of the photosensors in the surrounding environment. As the optical measurement system rotates, photosensors that are spatially adjacent to the photosensor 3202 may include photosensors on other photosensor arrays on other sides of the rotating member 3200 (not shown), as well as histograms from previous measurements that have been buffered and have not yet been overwritten. Spatial adjacency can accommodate any geometric arrangement of photosensors in an array configuration. Instead of relying on physical adjacency, embodiments can instead determine adjacent photosensor views in the surrounding environment during multiple measurements to perform the operations described above.

XIV. Circuit Implementations for Combining Pixels

Figure 33:
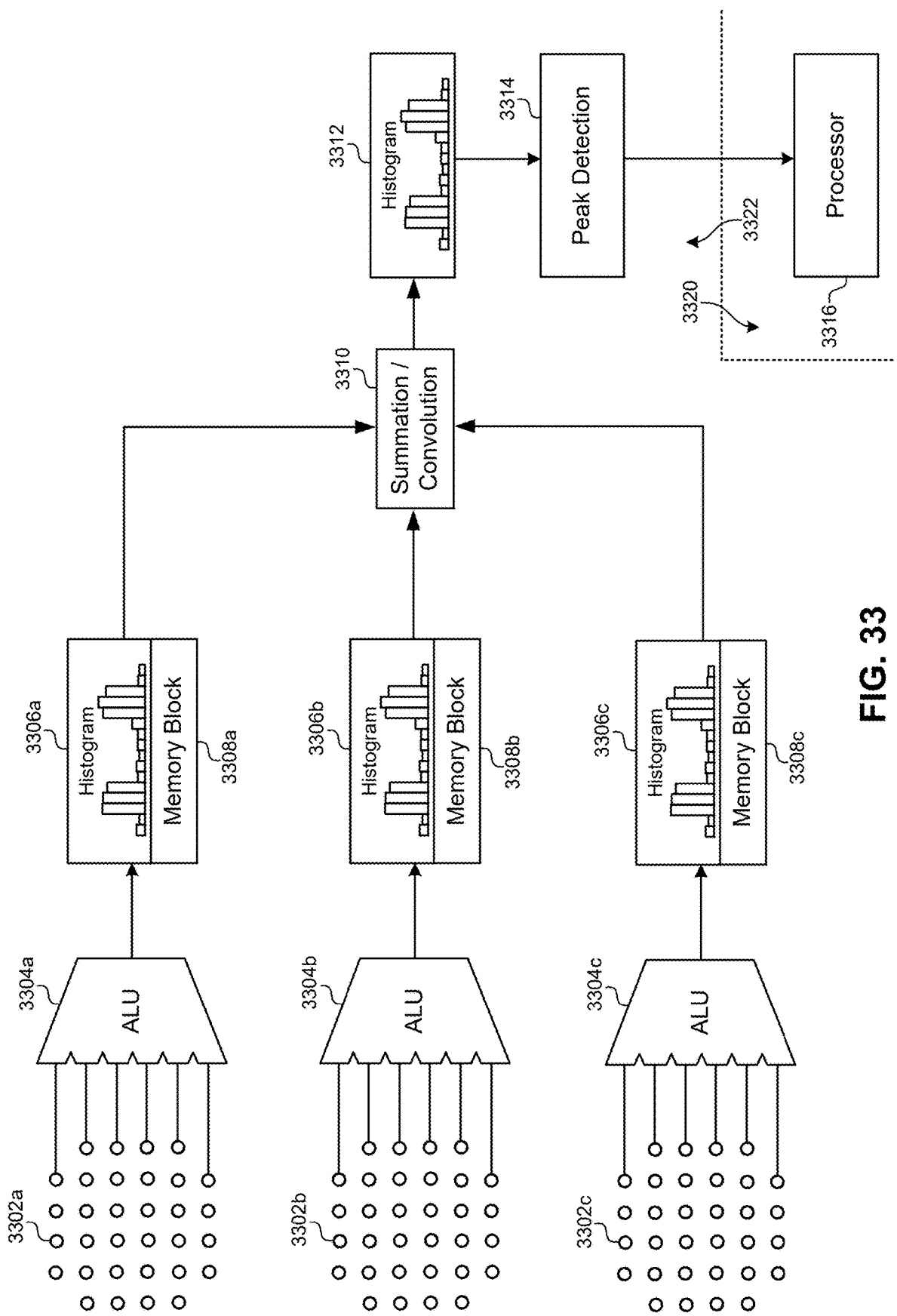
FIG. 33 illustrates a circuit for combining information from spatially adjacent histograms, according to some embodiments.

FIG. 33 illustrates a circuit for combining information from spatially adjacent histograms, according to some embodiments. As described in detail above, each photosensor 3202 may be coupled with an arithmetic logic circuit 3304 and a histogram memory 3308. The histogram memory 3308 for each photosensor 3302 may also be referred to as a memory block. Each memory block 3308 may store photon counts that are aggregated during a measurement to form a histogram 3306 of photon counts. This combination of a photosensor 3302, an arithmetic logic circuit 3304, and a memory block 3308 may be referred to as a "pixel." Each pixel may operate independently to perform optical measurements such that each pixel may receive its own start signal and aggregate photon counts independently of timing signals used to control other pixels.

To combine information from histograms as described above, the optical measurement system may include a summation/convolution circuit 3310 that combines the histograms together using mathematical operations. The summation/convolution circuit 3310 may be configured to scan or receive individual time bins from each of the memory blocks 3308 for a number of spatially adjacent photosensors. Each time bin from multiple histograms may be combined together into a time bin in a single histogram 3312 representing a single photosensor, such as photosensor 3302b. This circuit may use an arithmetic logic unit to add values together. This circuit may also use a multiplier to apply weights to each of the histograms 3306 as they are combined together. The final histogram 3312 can be passed through a peak detection circuit 3314 as described above to locate peaks in the histogram. Because the histograms 3306 have been combined from spatially adjacent photosensors, the resulting histogram 3312 is more likely to provide one or more peaks that exceed a detection threshold.

Any identified peaks can be sent to a processor 3316 for distance calculations as described above. The processor 3316 may be implemented on an integrated circuit 3320 that is physically separate and distinct from an integrated circuit 3322 on which the arithmetic logic circuits 3304 and/or memory blocks 3308 are implemented.

In FIG. 33, multiple elements may combine to form a circuit configured to combine information from a first histogram with information from one or more spatially adjacent histograms to generate a distance measurement for a photosensor. In this embodiment, the information from the histograms may comprise data values from the histograms themselves, and the circuit may include the summation/convolution circuit 3310. In some embodiments, the circuit may also include the processor 3316 that actually generates the distance measurement.

Figure 34:
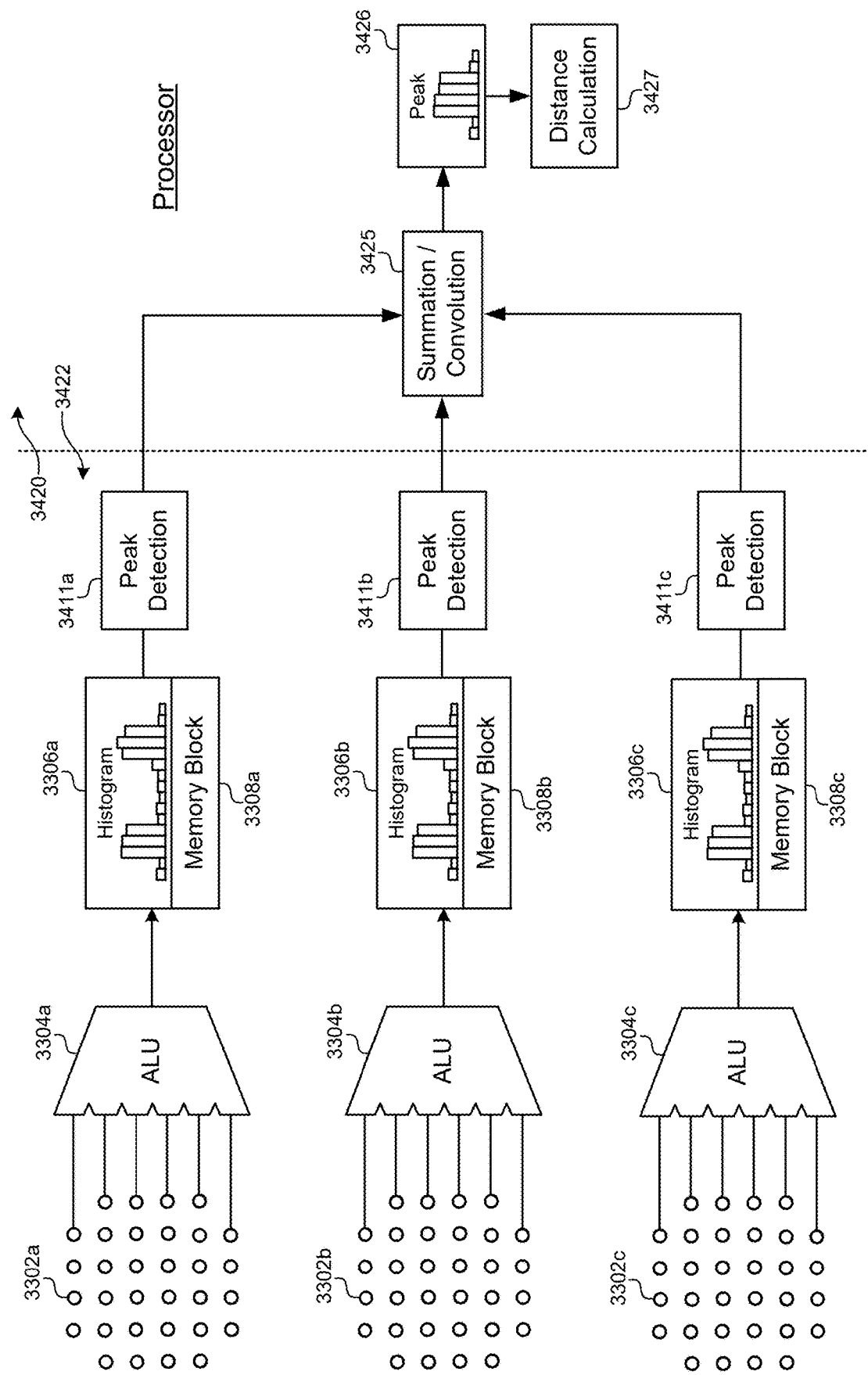
FIG. 34 illustrates an alternate circuit for combining information from histograms, according to some embodiments.

FIG. 34 illustrates an alternate circuit for combining information from histograms, according to some embodiments. This circuit is similar to the circuit in FIG. 33, except that in this case peaks may be detected by peak detection circuits 3411 for each individual histogram 3306 before they are combined. Instead of combining all of the histograms, this example may combine only identified peaks in the histograms. Some embodiments may also determine whether peaks identified in each of the histograms 3306 are spatially correlated before combining information from the histograms. For example, if a number of spatially adjacent histograms illustrate peaks at similar location. If so, then a determination may be made that the peaks are resultant from the same object in the surrounding environment and the histograms may be treated as being spatially correlated at that location. This may also be used to identify outliers. For example, if eight of nine adjacent histograms indicate a peak at a location, the ninth histogram may be excluded as an outlier from the calculations.

In the example of FIG. 34, the combination of spatially adjacent histograms may be carried out for a central pixel, such as the pixel for histogram 3306b. In some embodiments, histograms that are combined with histogram 3306b may be multiplied by weighting factors before they are combined with a central pixel.

In this example, the circuit for combining information from the histograms may be implemented in the processor in the second integrated circuit 3420 that is different from an integrated circuit 3422 where the peaks are detected. As described in detail above, peaks can be detected on-chip, and windows of time bins can be passed to the processor for distance measurements. The processor may also execute a summation/convolution circuit 3425 to combine individual peaks to form a single peak 3426 representation for the photosensor 3302*b*. This single peak 3426 may exceed a detection threshold and may be used by a distance calculation algorithm 3427 on the processor.

Figure 35:
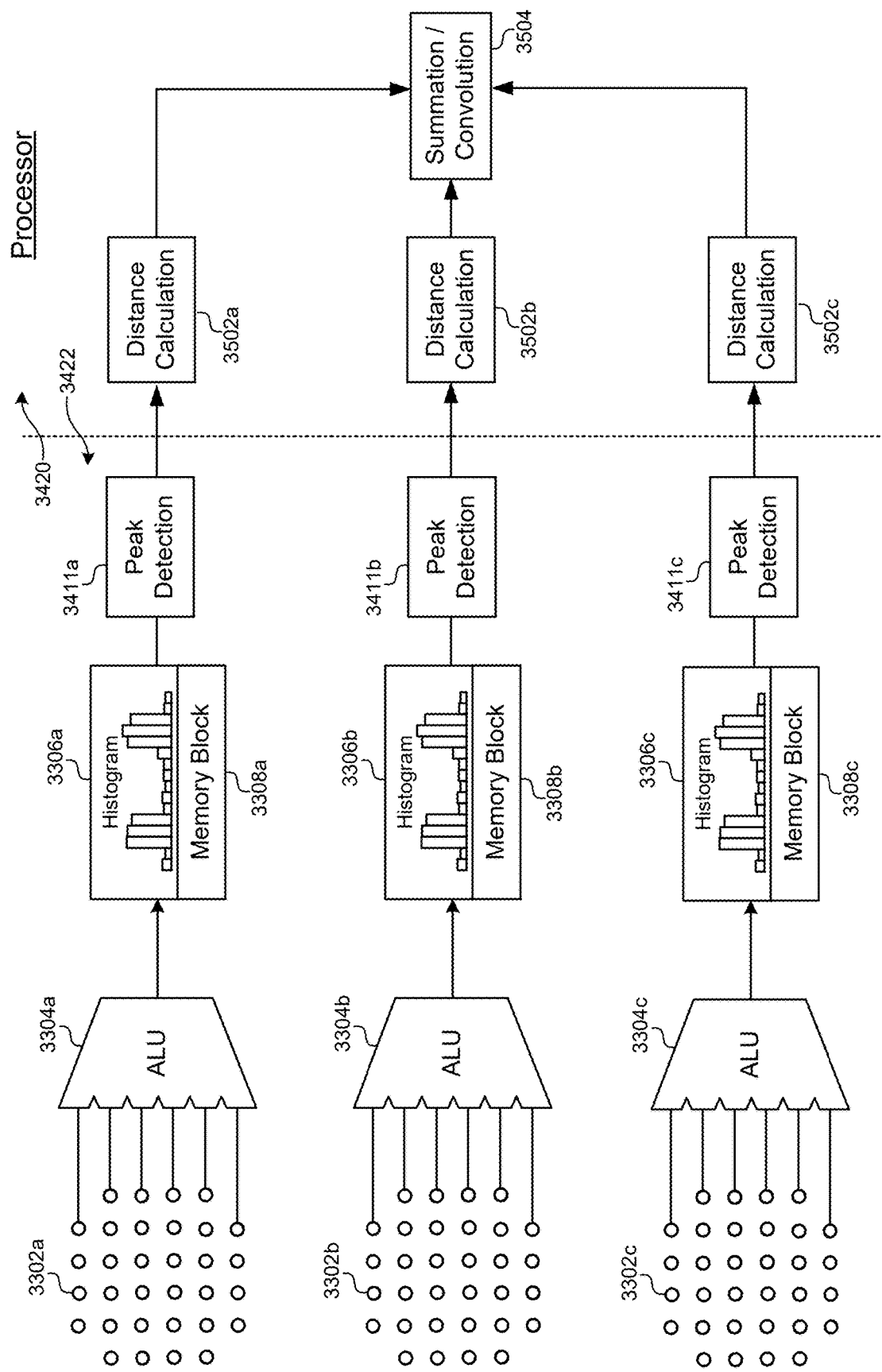
FIG. 35 illustrates another circuit for combining information from histograms, according to some embodiments.

FIG. 35 illustrates another circuit for combining information from histograms, according to some embodiments. In this example, the processor may calculate distances for each photosensor based on their individual histograms without any combination of histogram information. After distances are calculated, information from each pixel may be combined through a summation/convolution process 3504 on the processor. This operation may be significantly simpler than combining information from raw histograms, and may be performed comparatively faster than the examples described above. For example, if distances have been calculated for a number of adjacent pixels, these distances may be compared to each other. Some embodiments may average these distances for surrounding pixels to determine a distance for a central pixel. This may improve the accuracy of each distance measurement for each pixel as they are based on a number of different pixel measurements rather than only a single pixel. Some embodiments may also use surrounding pixels to calculate a confidence value. If the surrounding pixels include distance measurements that are similar to a central pixel, the confidence value of the central pixel may be relatively high.

XV. Method for Combining Spatially Adjacent Data

Figure 36:
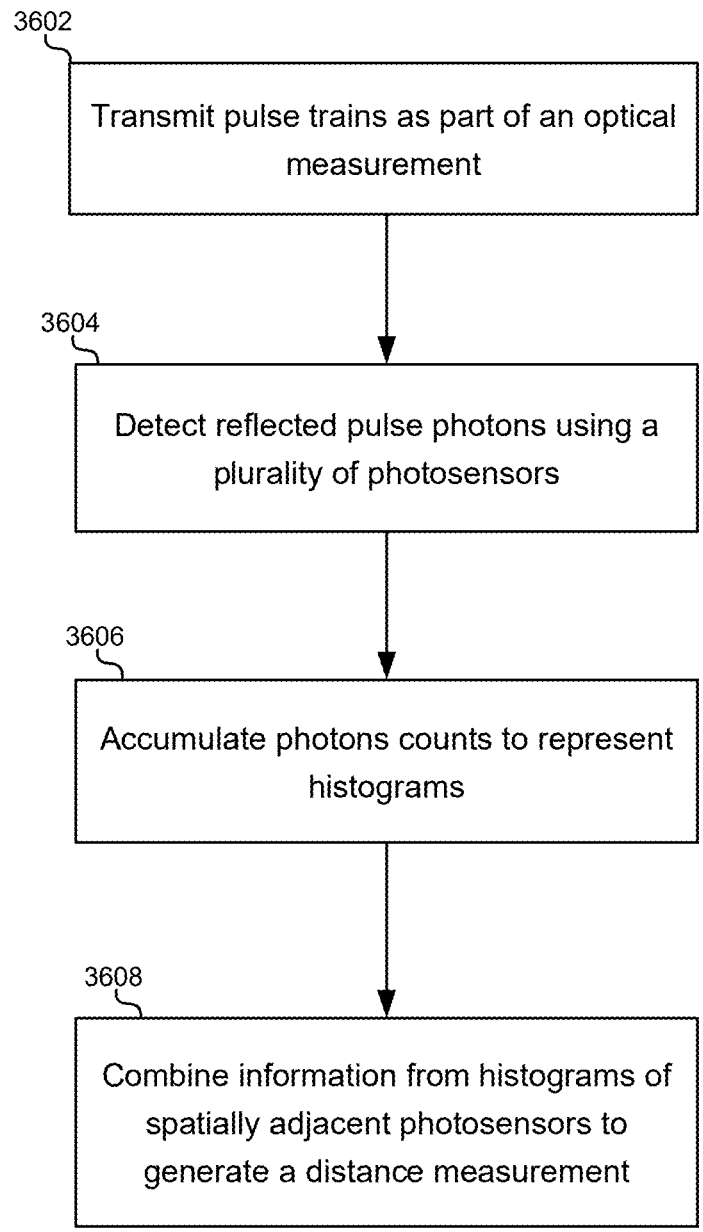
FIG. 36 illustrates a flowchart of a method for using spatially adjacent pixel information in an optical measurement system.

FIG. 36 illustrates a flowchart of a method for using spatially adjacent pixel information in an optical measurement system. The method below describes a process for a single photosensor combined with one or more spatially adjacent photosensors in the optical measurement system. Specifically, information from the one or more spatially adjacent photosensors may be combined with the histogram information from the single photosensor to be used in calculating a distance measurement. However, as described above, the optical measurement system may include many photosensors or "pixels," and this method may be carried out for each photosensor in the optical measurement system. Thus, this method may be executed multiple times for each photosensor, once when considered the single photosensor for which the histogram information is being combined, and multiple times as a spatially adjacent photosensor for other photosensors in the array.

At step 3602, the method may include transmitting one or more pulse trains over one or more first time intervals as part of an optical measurement. Each of the one or more time intervals may represent a "shot" that is repeated multiple times in the measurement. Each of the time intervals may include one or more pulse trains that are encoded and transmitted by the light sources such that the pulse trains can be recognized as they are reflected off of objects in the surrounding environment. Each of the time intervals may be subdivided into a plurality of time bins such that each of the time bins represents a bin in a histogram of received photon counts during the optical measurement. An example of how a single measurement may include multiple shots subdivided into time bins that aggregate photon counts is described above in relation to FIG. 9.

At step 3604, the method may include detecting reflected photons from the one or more pulse trains. These reflected photons may be detected using a plurality of photosensors. The plurality of photosensors may include a first photosensor, along with one or more photosensors that are spatially adjacent to the first photosensor. As described above, a photosensor may be "spatially adjacent" to the first photosensor when the views of the two photosensors are adjacent in the environment surrounding the optical measurement system. In some configurations, this may include photosensors that are physically adjacent on the optical measurement system, while other configurations (e.g., spinning configurations) need not require physical adjacency. As described in detail above, each photosensor may include a plurality of photodetectors, such as a plurality of SPADs. The photosensors may receive reflected light as well as ambient background noise received from the surrounding environment. The reflected light received by the photosensor may include light reflected off of objects of interest in the surrounding environment. For example, these objects of interest may be at least 30 cm away from the photosensor, and may represent surrounding vehicles, buildings, pedestrians, and/or any other object that may be encountered around the optical measurement system during use. These objects of interest may be distinguished from objects that are part of the optical measurement system itself, such as a housing. The photosensor may also be coupled to threshold detection circuitry and/or to arithmetic logic circuitry that accumulates photon counts. FIG. 5 illustrates an example of how photon counts may be received from photosensors and counted using threshold circuitry and pixel counters (e.g., arithmetic logic circuits).

At step 3606, the method may include accumulating photon counts received during the one or more time intervals. The photons may be accumulated using an arithmetic logic circuit and maybe accumulated into one or more memory blocks, such as the histogram memories described above. The memory blocks may be implemented using the registers in an SRAM of a histogram data path as described above in FIGS. 8-9. Each of the time intervals may be subdivided into a plurality of first time bins for the histogram. Corresponding time bins in each of the one or more time intervals may be accumulated in single registers in the memory blocks. Each of the time intervals may represent a shot, and together the one or more time intervals may represent a measurement for the optical measurement system. Each of the time intervals may be defined by a start signal or shot signal that resets the memory representing the histogram back to the first register in the histogram.

At step 3608, the method may include combining information from the first histogram with information from the one or more histograms to generate a distance measurement for the photosensor. As described above, the information from the first histogram may include raw data from the histogram itself, identified peaks in the histogram, calculations or statistics derived from the histogram, distance measurements calculated based on the histogram, and/or any other information that may be calculated or derived from the photon counts in the histogram. Similarly, the information from the one or more histograms of the spatially adjacent photosensors may also include any of these types of information. Combining the information may include summoning the histogram information, applying numerical weights to the histogram information, convolving the histogram information, applying Gaussian functions to the histogram information, and/or any other mathematical operation that may combine information from the different histogram information. The combination may result in a new histogram, a new peak in a histogram, a new distance measurement, and/or another numerical value. A circuit for performing this combination and/or generating the distance measurement for the first photosensor may include on-chip circuits for summing/convolving histogram information, as well as all or part of a separate processor configured to calculate distance measurements.

It should be appreciated that the specific steps illustrated in FIG. 36 provide particular methods of using spatially adjacent pixel information in an optical measurement system, according to various embodiments. Other sequences of steps may also be performed according to alternative embodiments. For example, alternative embodiments of the present invention may perform the steps outlined above in a different order. Moreover, the individual steps illustrated in FIG. 36 may include multiple sub-steps that may be performed in various sequences as appropriate to the individual step. Furthermore, additional steps may be added or removed depending on the particular applications. One of ordinary skill in the art would recognize many variations, modifications, and alternatives.

XVI. Additional Embodiments

While some embodiments disclosed herein have focused on the application of light ranging within the context of 3D sensing for automotive use cases, systems disclosed herein can be used in any application without departing from the scope of the present disclosure. For example, systems can have a small, or even miniature, form factors that enable a number of additional use cases, e.g., for solid-state light ranging systems. For example, systems can be used in 3D cameras and/or depth sensors within devices, such as mobile phones, tablet PCs, laptops, desktop PCs, or within other peripherals and/or user-interface devices. For example, one or more embodiments could be employed within a mobile device to support facial recognition and facial tracking capabilities, eye tracking capabilities, and/or for 3D scanning of objects. Other use cases include forward-facing depth cameras for augmented and virtual reality applications in mobile devices.

Other applications include deployment of one or more systems on airborne vehicles, such as airplanes, helicopters, drones, and the like. Such examples could provide 3D sensing and depth imaging to assist with navigation (autonomous or otherwise) and/or to generate 3D maps for later analysis, e.g., to support geophysical, architectural, and/or archeological analyses.

Systems can also be mounted to stationary objects and structures, such as buildings, walls, poles, bridges, scaffolding, and the like. In such cases, the systems can be used to monitor outdoor areas, such as manufacturing facilities, assembly lines, industrial facilities, construction sites, excavation sites, roadways, railways, bridges, etc. Furthermore, systems can be mounted indoors and used to monitor movement of persons and or objects within a building, such as the movement of inventory within a warehouse or the movement of people, luggage, or goods within an office building, airport, train station, etc. As would be appreciated by one of ordinary skill in the art with the benefit of this disclosure, many different applications of light ranging systems are possible and, as such, the examples provided herein are provided for illustrative purposes only and shall not be construed to limit the uses of such systems to only the examples explicitly disclosed.

XVII. Computer System

Any of the computer systems or circuits mentioned herein may utilize any suitable number of subsystems. The subsystems can be connected via a system bus 75. As examples, subsystems can include input/output (I/O) devices, system memory, storage device(s), and network adapter(s) (e.g. Ethernet, Wi-Fi, etc.), which can be used to connect a computer system other devices (e.g., an engine control unit). System memory and/or storage device(s) may embody a computer readable medium.

A computer system can include a plurality of the same components or subsystems, e.g., connected together by external interface, by an internal interface, or via removable storage devices that can be connected and removed from one component to another component. In some embodiments, computer systems, subsystem, or apparatuses can communicate over a network.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. An optical measurement system comprising:
  a housing of the optical measurement system;
  a light source configured to transmit one or more pulse trains over one or more time intervals as part of an optical measurement, wherein each of the one or more first time intervals includes one of the one or more pulse trains;
  a photosensor configured to detect photons from the one or more pulse trains that are reflected off of a housing of the optical measurement system, and to detect photons from the one or more pulse trains that are reflected off of objects in an environment surrounding the optical measurement system, wherein the housing is a known distance from the photosensor and the light source;
  a plurality of registers configured to accumulate photon counts from the photosensor received during the one or more time intervals, wherein each of the one or more time intervals is subdivided into a plurality of time bins representing a predicted time window based on an assumed clock cycle, and each of the plurality of registers is configured to accumulate photon counts received during a corresponding one of the plurality of time bins in each of the one or more time intervals to represent a histogram of photon counts received during the one or more time intervals; and
  a circuit configured to:
    identify an initial peak in the histogram of photon counts, wherein the initial peak represents the photons reflected from the housing of the optical measurement system;
    calibrate a time window represented by each of the plurality of time bins based on the known distance of the housing from the light source and the photo sensor,
    performing a distance measurement of a subsequent peak using the calibrated time window represented by each of the plurality of time bins, instead of using the assumed time window based on the assumed clock cycle.

2. The system of claim 1, wherein the circuit is configured to identify the initial peak by identifying a predetermined number of registers in the plurality of registers that occur first in the plurality of registers.

3. The system of claim 1, wherein the circuit is configured to identify the initial peak by identifying one or more registers in the plurality of registers storing a highest number of photon counts.

4. The system of claim 1 wherein the circuit is configured to identify the initial peak by identifying registers in the plurality of registers with time bins that correspond to a distance between the light source and the housing of the optical measurement system.

5. The system of claim 1, wherein the circuit is further configured to identify a subset of the plurality of registers that represents the initial peak.

6. The system of claim 5, wherein the subset of the plurality of registers is identified by selecting a predetermined number of registers around a register storing a maximum value of the initial peak.

7. The system of claim 5, wherein the subset of the plurality of registers is identified by selecting registers around a register storing a maximum value of the initial peak that store values that are within a predetermined percentage of the maximum value.

8. The system of claim 1, wherein the circuit is further configured to estimate a distance between the light source and the housing of the optical measurement system based on a location of the initial peak in the plurality of registers.

9. The system of claim 1, further comprising a processor configured to receive additional peaks in the histogram stored in the plurality of registers to calculate distances to objects in the surrounding environment corresponding to the additional peaks, wherein the initial peak is excluded from the additional peaks received by the processor.

10. The system of claim 9, wherein the processor is implemented in an integrated circuit that is separate and distinct from an integrated circuit in which the plurality of registers is implemented.

11. A method of detecting a peak reflected from a housing in an optical measurement system, the method comprising:
  transmitting one or more pulse trains over one or more time intervals as part of an optical measurement, wherein each of the one or more first time intervals includes one of the one or more pulse trains;
  detecting photons from the one or more pulse trains that are reflected off of the housing of the optical measurement system, and detecting photons from the one or more pulse trains that are reflected off of objects in an environment surrounding the optical measurement system;
  accumulating counts of the photons received during the one or more time intervals into a plurality of registers, wherein each of the one or more time intervals is subdivided into a plurality of time bins representing a predicted time window based on an assumed clock cycle, and each of the plurality of registers accumulates photon counts received during a corresponding one of the plurality of time bins in each of the one or more time intervals to represent a histogram of photon counts received during the one or more time intervals; and identifying an initial peak in the histogram of photon counts, wherein the initial peak represents the photons reflected from the housing of the optical measurement system; and determining a calibrated time window represented by each of the plurality of time bins based at least in part on a known distance between the housing and optical measurement system instead of using an assumed time value of the assumed clock cycle; and performing a distance measurement on a subsequent peak using the calibrated time window.

12. The method of claim 11, further comprising:

identifying a second initial peak as part of a second optical measurement; and comparing the second initial peak the initial peak.

13. The method of claim 12, further comprising:

characterizing a change in transparency of a window in a housing of the optical measurement system based on comparing the second initial peak to the initial peak.

14. The method of claim 11, further comprising:

identifying a plurality of initial peaks detected by a plurality of different photosensors in the optical measurement system; and determining a level of transparency for corresponding sections of a window in a housing of the optical measurement system in front of each of the plurality of photosensors based on the plurality of initial peaks.

15. The method of claim 11, further comprising:

comparing a maximum value of the initial peak to a threshold; and determining whether a blockage is located external to the optical measurement system based on comparing the maximum value of the initial peak to the threshold.

16. The method of claim 11, further comprising:

identifying a plurality of initial peaks over a plurality of measurements; and storing a baseline initial peak based on a combination of the plurality of initial peaks over the plurality of measurements for comparison to future optical measurements.

17. The method of claim 16, further comprising:

subtracting the baseline initial peak from the plurality of registers.

18. The method of claim 17, wherein a second peak at least partially overlaps with the initial peak, and wherein subtracting the baseline initial peak causes the second peak to be detectable by a peak detection circuit.

19. The method of claim 18, wherein the second peak corresponds to an object in environment surrounding the optical measurement system that is within two feet of the optical measurement system.

* * * * *